US007181438B1

(12) United States Patent
Szabo

(10) Patent No.: US 7,181,438 B1
(45) Date of Patent: Feb. 20, 2007

(54) DATABASE ACCESS SYSTEM

(75) Inventor: Andrew Szabo, Cos Cob, CT (US)

(73) Assignee: Alberti Anemometer, LLC, Los Altos, CA (US)

( * ) Notice: Subject to any disclaimer, the term of this patent is extended or adjusted under 35 U.S.C. 154(b) by 1306 days.

(21) Appl. No.: 09/583,048

(22) Filed: May 30, 2000

(51) Int. Cl.
G06F 17/30 (2006.01)
(52) U.S. Cl. .................................. 707/2; 707/3; 705/14
(58) Field of Classification Search .................... 707/2, 707/3; 705/14
See application file for complete search history.

(56) References Cited

U.S. PATENT DOCUMENTS

| 5,021,976 | A | 6/1991 | Wexelblat et al. | 364/521 |
|---|---|---|---|---|
| 5,278,979 | A | 1/1994 | Foster et al. | 395/600 |
| 5,297,253 | A | 3/1994 | Meisel | 395/160 |
| 5,313,646 | A | 5/1994 | Hendricks et al. | 395/600 |
| 5,615,341 | A | 3/1997 | Agrawal et al. | 395/210 |
| 5,634,051 | A | 5/1997 | Thomson | 395/605 |
| 5,640,553 | A | 6/1997 | Schultz | 395/605 |
| 5,659,732 | A | 8/1997 | Kirsch | 395/605 |
| 5,717,914 | A | 2/1998 | Husick et al. | 395/605 |
| 5,724,521 | A | 3/1998 | Dedrick | 395/226 |
| 5,724,573 | A | 3/1998 | Agrawal et al. | 375/606 |
| 5,737,734 | A | 4/1998 | Schultz | 707/5 |
| 5,742,816 | A | 4/1998 | Barr et al. | 395/615 |
| 5,758,259 | A | 5/1998 | Lawler | 455/51 |
| 5,774,357 | A | 6/1998 | Hoffberg et al. | 364/188 |
| 5,774,870 | A | 6/1998 | Storey | 705/14 |
| 5,796,209 | A | 8/1998 | Khan et al. | 313/493 |
| 5,801,747 | A | 9/1998 | Bedard | 348/1 |
| 5,812,134 | A | 9/1998 | Pooser et al. | 345/356 |
| 5,812,997 | A | 9/1998 | Morimoto et al. | 707/2 |
| 5,844,305 | A | 12/1998 | Shin et al. | 257/676 |
| 5,845,278 | A | 12/1998 | Kirsch et al. | 707/3 |
| 5,855,015 | A | 12/1998 | Shoham | 707/5 |
| 5,878,423 | A | 3/1999 | Anderson et al. | 707/100 |
| 5,886,698 | A | 3/1999 | Sciammarella | 345/349 |
| 5,890,152 | A | 3/1999 | Rapaport et al. | 707/6 |
| 5,895,471 | A | 4/1999 | King et al. | 707/104 |
| 5,918,236 | A | 6/1999 | Wical | 707/560 |
| 5,920,477 | A | 7/1999 | Hoffberg et al. | 364/143 |

(Continued)

OTHER PUBLICATIONS

Gaines, et al, Concept Maps as Hypermedia Comp (Internet).

(Continued)

Primary Examiner—Leslie Wong
(74) Attorney, Agent, or Firm—Milde & Hoffberg LLP

(57) ABSTRACT

An improved human user computer interface system, wherein a user characteristic or set of characteristics, such as demographic profile or societal "role", is employed to define a scope or domain of operation. The operation itself may be a database search, to interactively define a taxonomic context for the operation, a business negotiation, or other activity. After retrieval of results, a scoring or ranking may be applied according to user define criteria, which are, for example, commensurate with the relevance to the context, but may be, for example, by date, source, or other secondary criteria. A user profile is preferably stored in a computer accessible form, and may be used to provide a history of use, persistent customization, collaborative filtering and demographic information for the user. Advantageously, user privacy and anonymity is maintained by physical and algorithmic controls over access to the personal profiles, and releasing only aggregate data without personally identifying information or of small groups.

35 Claims, 27 Drawing Sheets

U.S. PATENT DOCUMENTS

| | | | | |
|---|---|---|---|---|
| 5,920,854 | A | 7/1999 | Kirsch et al. | 707/3 |
| 5,920,859 | A | 7/1999 | Li | 707/5 |
| 5,924,090 | A | 7/1999 | Krellenstein | 202/5 |
| 5,933,811 | A | 8/1999 | Angles et al. | 705/14 |
| 5,945,988 | A | 8/1999 | Williams et al. | 345/327 |
| 5,946,490 | A | 8/1999 | Lieberherr et al. | 395/707 |
| 5,963,645 | A | 10/1999 | Kigawa et al. | 330/10 |
| 5,963,965 | A | 10/1999 | Vogel | 707/501 |
| 5,964,836 | A | 10/1999 | Rowe et al. | 709/221 |
| 5,966,126 | A | 10/1999 | Szabo | 345/348 |
| 5,966,533 | A | 10/1999 | Moody | 395/702 |
| 5,966,705 | A | 10/1999 | Koneru et al. | 707/9 |
| 5,970,486 | A | 10/1999 | Yoshida et al. | 707/4 |
| 5,973,683 | A | 10/1999 | Cragun et al. | 345/327 |
| 5,974,398 | A * | 10/1999 | Hanson et al. | 705/14 |
| 5,974,412 | A * | 10/1999 | Hazlehurst et al. | 707/3 |
| 5,977,964 | A | 11/1999 | Williams et al. | 345/327 |
| 5,978,766 | A | 11/1999 | Luciw | 705/1 |
| 5,991,735 | A | 11/1999 | Gerace | 705/10 |
| 6,005,597 | A | 12/1999 | Barrett et al. | 348/1 |
| 6,006,218 | A | 12/1999 | Breese et al. | 707/3 |
| 6,012,051 | A | 1/2000 | Sammon et al. | 706/52 |
| 6,012,052 | A | 1/2000 | Altschuler et al. | 707/2 |
| 6,014,634 | A | 1/2000 | Scroggie et al. | 705/14 |
| 6,014,638 | A | 1/2000 | Burge et al. | 705/27 |
| 6,014,671 | A | 1/2000 | Castelli et al. | 707/101 |
| 6,018,738 | A | 1/2000 | Breese et al. | 707/100 |
| 6,018,748 | A | 1/2000 | Smith | 707/501 |
| 6,137,499 | A | 10/2000 | Tesler | 345/440 |
| 6,377,287 | B1 * | 4/2002 | Hao et al. | 715/853 |
| 6,470,383 | B1 * | 10/2002 | Leshem et al. | 709/223 |

OTHER PUBLICATIONS

Agrawal: "Mining Ass'n Rules . . . "; Proc of ACM SigMod Conf on Management: May 1993 p. 207-216.

Akoulchina, et al, "SATELIT-Agent . . . " User Modeling Proc of Sixth Intl Conf um97, Vienna, NY (1997).

Benaki, et al, "Integrating User Modeling . . . ", User Modeling. Proc of Sixth Conf. um97, Vienna, NY (1997).

Lamping; "A Focus+Context Technique . . . " CHI 95; http://www.acm.org/sigchi/chi95/proceedings/papers/jl_lody.htm.

wwwinxight.com.http://www.inxight.com/News/Research_Papers_Files/Z-Gui_Article.pdf?

www.thebrain.com.

Orwant, "For want of a bit, user was lost . . . " mit Media Lab, vol. 35, No. 3 & 4 (1996).

"W@P White Paper", Wireless Internet Today, Oct. 1999, WAP Forum www.links2mobile.com/wp/wp4.htm.

Fink; "Personalized hypermedia . . . " http://zeus.gmd.de/un97/Fink.

www.bacardi.com.

www.thinkmap.com.

Wong, et al; "Incremental Document Clustering for Web Page Classification".

Waterworth, "A Pattern of Islands: Exploring Public Information Space in a Private Vehicle".

Schafer, et al, "E-Commerce Recommendation Applications".

Schafer, et al, "Recommender Systems in E-Commerce".

Sebastiani, "A Tutorial on Automated Text Categorisation".

Sarwar, et al, "Analysis of Recommendation Algorithms for E-Commerce".

Rafter, et al, "Automated Collaborative Filtering Applications for Online Recruitment Services".

Resnick, et al, "Grouplens: An Open Architecture for Collaborative Filtering of Netnews".

Paliouras, et al, "Exploiting Learning Techniques for the Acquisition of User Stereotypes and Communities".

O'Connor, et al, "Clustering Items for Collaborative Filtering".

Makoto, et al, Cluster-Based Text Categorization: A Comparison of Category Search Strategies.

Leong, et al, "Text Summarisation for Knowledge Filtering Agents in Distributed Heterogeneous Environments".

Krichel, et al, Cit Ec: an Autonomous Citation Index for Economics.

Karypis, "Evaluation of Item-Based Top-$N$ Recommendation Algorithms".

Han, et al, Centroid-Based Document Classification: Analysis & Experimental Results.

Boley, et al, "An Unsupervised Clustering Tool for Unstructured Data".

Bishop, et al, "A Hierarchial Latent Variable Model for Data Visualization".

* cited by examiner

Figure 4

Relative Importance of Terms

User's Inputs

A. _____  Users enter a word or
   _____  phrase on each line,
   _____  up to as many lines as
   _____  needed, to specify
                              relative importance of
                              the search term B. _____ _____ _____ _____   The most important
                              term is on the left User's Questions C. What's a good place to buy a Nikon
   camera?

Relative         # 1 Nikon           keyword
   importance       # 2 Camera          keyword Domain importance # 1 [shopping      domain
                      engine]

User confirms or modifies computer's
   parsing

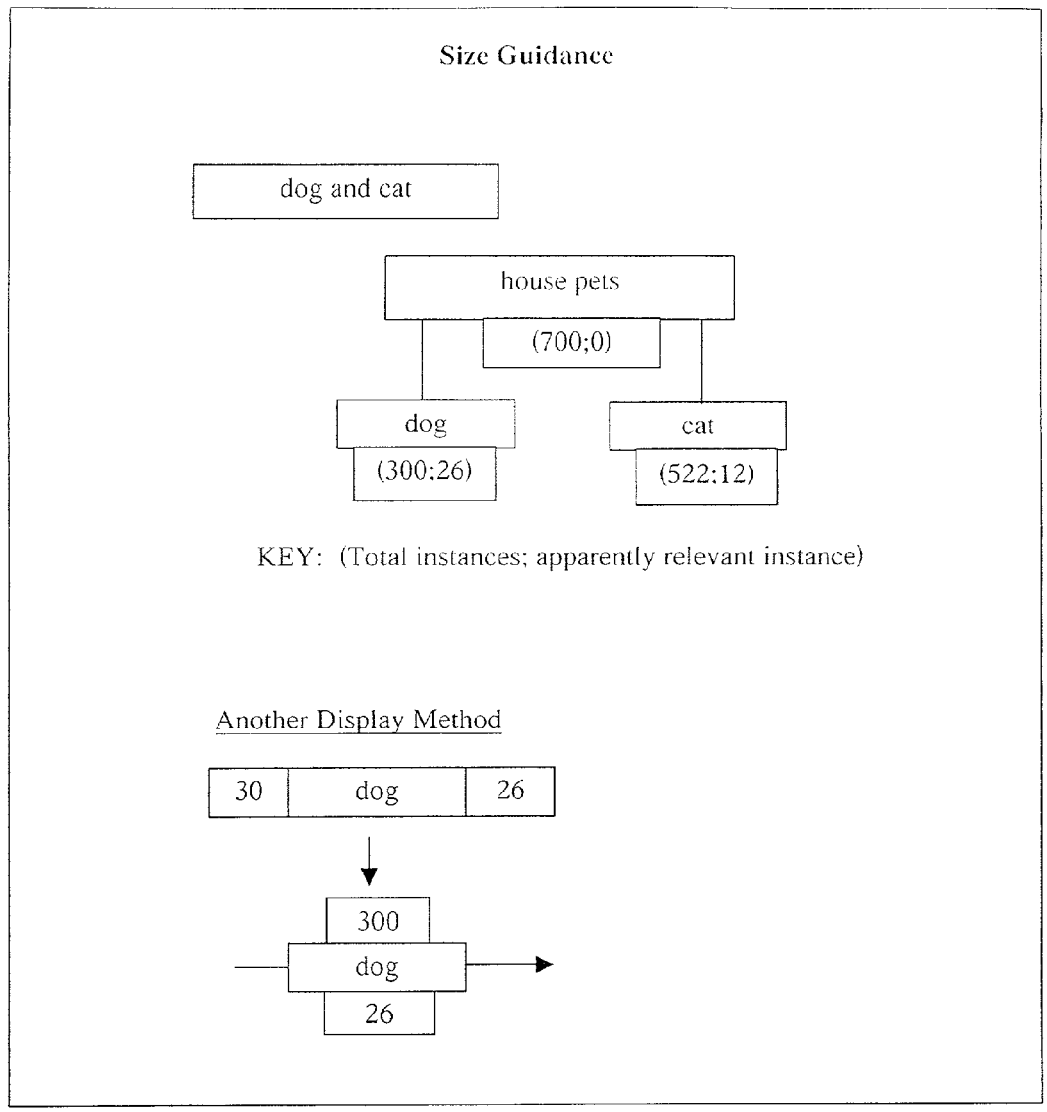

DATABASE ACCESS SYSTEM

FIELD OF THE INVENTION

The present invention relates to the field of human computer interface systems, and more particularly to the field of improved user interfaces for database systems containing a variety of data types and used under a variety of circumstances, especially databases indexing full text records and indexes or Internet or Intranet data.

BACKGROUND OF THE INVENTION

For almost as long as computers have existed, their designers and users have sought improvements to the user interface. Especially as computing power has increased, a greater portion of the available processing capacity has been devoted to improved interface design. Recent examples have been Microsoft Windows variants and Internet web browsers. Graphic interfaces provide significant flexibility to present data using various paradigms, and modern examples support use of data objects and applets. Traditional human computer interfaces have emphasized uniformity and consistency; thus, experienced users had a shortened learning curve for use of software and systems, while novice users often required extensive instruction before profitable use of a system. More recently, intuitive, adaptable and adaptive software interfaces have been proposed, which potentially allow faster adoption of the system by new users but which requires continued attention by experienced users due to the possibility of interface transformation.

While many computer applications are used both on personal computers and networked systems, the field of information retrieval and database access for casual users has garnered considerable interest. The Internet presents a vast relatively unstructured repository for information, leading to a need for Internet search engines and access portals based on Internet navigation. At this time, the Internet is gaining popularity because of its "universal" access, low access and information distribution costs, and suitability for conducting commercial transactions. However, this popularity, in conjunction with the non-standardized methods of presenting data and fantastic growth rate, have made locating desired information and navigation through the vast space difficult. Thus, improvements in human consumer interfaces for relatively unstructured data sets are desirable, wherein subjective improvements and wholesale adoption of new paradigms may both be valuable, including improved methods for searching and navigating the Internet.

Generally speaking, search engines for the World Wide Web (WWW, or simply "Web") aid users in locating resources among the estimated present one billion addressable sites on the Web. Search engines for the web generally employ a type of computer software called a "spider" to scan a proprietary database that is a subset of the resources available on the Web. Major known commercial search engines include such names as Yahoo, Excite, and Infoseek. Also known in the field are "metasearch engines," such as Dogpile and Metasearch, which compile and summarize the results of other search engines without generally themselves controlling an underlying database or using their own spider. All the search engines and metasearch engines, which are servers, operate with the aid of a browser, which are clients, and deliver to the client a dynamically generated web page which includes a list of hyperlinked universal resource locators (URLs) for directly accessing the referenced documents themselves by the web browser.

A Uniform Resource Identifier (RFC 1630) is the name for the standard generic object in the World Wide Web. Internet space is inhabited by many points of content. A URI (Uniform Resource Identifier is the way you identify any of those points of content, whether it be a page of text, a video or sound clip, a still or animated image, or a program. The most common form of URI is the Web page address, which is a particular form or subset of URI called a Uniform Resource Locator (URL). A URI typically describes: the mechanism used to access the resource; the specific computer that the resource is housed in; and the specific name of the resource (a file name) on the computer. Another kind of URI is the Uniform Resource Name (URN). A URN is a form of URI that has "institutional persistence," which means that its exact location may change from time to time, but some agency will be able to find it.

The structure of the World Wide Web includes multiple servers at distinct nodes of the Internet, each of which hosts a web server which transmits a web page in hypertext markup language (HTML) or extensible markup language (XML) (or a similar scheme) using the hypertext transport protocol (http). Each web page may include embedded hypertext linkages, which direct the client browser to other web pages, which may be hosted within any server on the network. A domain name server translates a top-level domain (TLD) name into an Internet protocol (IP) address, which identifies the appropriate server. Thus, Internet web resources, which are typically the aforementioned web pages, are thus typically referenced with a URL, which provides the TLD or IP address of the server, as well a hierarchal address for defining a resource of the server, e.g., a directory path on a server system.

A hypermedia collection may be represented by a directed graph having nodes that represent resources and arcs that represent embedded links between resources. Typically, a user interface, such as a browser, is utilized to access hyperlinked information resources. The user interface displays information "pages" or segments and provides a mechanism by which that user may follow the embedded hyperlinks. Many user interfaces allow selection of hyperlinked information via a pointing device, such as a mouse. Once selected, the system retrieves the information resource corresponding to the embedded hyperlink. As hyperlinked information networks become more ubiquitous, they continue to grow in complexity and magnitude, often containing hundreds of thousands of hyperlinked resources. Hyperlinked networks may be centralized, i.e. exist within a single computer or application, or distributed, existing over many computers separated by thousands of kilometers. These networks are typically dynamic and evolve over time in two dimensions. First, the information content of some resources may change over time, so that following the same link at different times may lead to a resource with slightly different, or entirely different information. Second, the very structure of the networked information resources may change over time, the typical change being the addition of documents and links. The dynamic nature of these networks has significant ramifications in the design and implementation of modern information retrieval systems.

One approach to assisting users in locating information of interest within a collection is to add structure to the collection. For example, information is often sorted and classified so that a large portion of the collection need not be searched. However, this type of structure often requires some familiarity with the classification system, to avoid elimination of relevant resources by improperly limiting the search to a particular classification or group of classifications.

Another approach used to locate information of interest to a user, is to couple resources through cross-referencing. Conventional cross-referencing of publications using citations provides the user enough information to retrieve a related publication, such as the author, title of publication, date of publication, and the like. However, the retrieval process is often time-consuming and cumbersome. A more convenient, automated method of cross-referencing related documents utilizes hypertext or hyperlinks. Hyperlink systems allow authors or editors to embed links within their resources to other portions of those resources or to related resources in one or more collections that may be locally accessed, or remotely accessed via a network. Users of hypermedia systems can then browse through the resources by following the various links embedded by the authors or editors. These systems greatly simplify the task of locating and retrieving the documents when compared to a traditional citation, since the hyperlink is usually transparent to the user. Once selected, the system utilizes the embedded hyperlink to retrieve the associated resource and present it to the user, typically in a matter of seconds. The retrieved resource may contain additional hyperlinks to other related information that can be retrieved in a similar manner.

It is well known to provide search engines for text records which are distributed over a number of record sets. For example, the Internet presently exists as literally millions of web servers and tens of millions or more of distinct web page uniform resource locators (URLs). A growing trend is to provide web servers as appliances or control devices, and thus without "content" of general interest. On the other hand, the traditional hypertext transport protocol (HTTP) servers, or "web servers", include text records of interest to a variety of potential users. Also, by tradition, the web pages, and particularly those with human readable text, are indexed by Internet search engines, thereby making this vast library available to the public.

Recently, the number and variety of Internet web pages have continued to grow at a high rate, resulting in a potentially large number of records that meet any reasonably broad or important search criteria. Likewise, even with this large number of records available, it can be difficult to locate certain types of information for which records do in fact exist, because of the limits of natural language parsers or Boolean text searches, as well as the generic ranking algorithms employed.

The proliferation of resources on the Web presents a major challenge to search engines, all of which employ proprietary tools to sift the enormous document load to find materials and sites relevant to a user's needs. Generally speaking, the procedure followed in making a search is as follows. User enters a string of words onto a character-based "edit line" and then strikes the "enter" key on user's keyboard or selects a search button using a pointing device. The string of words may be fashioned by a user into a Boolean logical sentence, employing the words "AND," "OR," and "NOT," but more typically the user enters a set of words in so-called "natural language" that lack logical connectors, and software called a "parser" takes user's natural language query and estimates which logical connections exist among the words. Such parsers have improved markedly in recent years through employment of techniques of artificial intelligence and semantic analysis. Having parsed the phrase, the search engine then uses its database, derived from a spider that has previously scanned the Web, for materials relevant to the query. This process entails a latency period while user waits for the search engine to return results. The search engine then returns, it is hoped, references to relevant web pages or documents, identified by their URLs or a hypertext linkage to title information as a set of hits, to the user, often parceled out at the rate of ten per request. If further hits are desired, there is a wait while a request for further hits is processed, and this typically entails another, fresh search and another latency period, wherein the search engine is instructed to return ten hits starting at the next, previously undisplayed, record. Often, each return hypertext markup language (HTML) page is accompanied by advertising information, which subsidized the cost of the search engine and search process. This advertising information is often called a "banner ad", and may be targeted to the particular user based on an identification of the user by a login procedure, an Internet cookie, or based on a prior search strategy. Other times, the banner ads are static or simply cycle between a few options.

A well-recognized problem with existing search engines is the tendency to return hits for a query that are so incredibly numerous, sometimes in the hundreds, thousands, or even millions, that it is impractical for user to wade through them and find relevant results. Many users, probably the majority, would say that the existing technology returns far too much "garbage" in relation to pertinent results. This has lead to the desire among many users for an improved search engine, and in particular an improved Internet search engine.

In response the garbage problem, search engines have sought to develop unique proprietary approaches to gauging the relevance of results in relation to a user's query. Such technologies employ algorithms for either limiting the records returned in the selection process (the search) and/or by sorting selected results from the database according to a rank or weighting, which may be predetermined or computed on the fly. The known techniques include counting the frequency or proximity of keywords, measuring the frequency of user visits to a site or the persistence of users on that site, using human librarians to estimate the value of a site and to quantify or rank it, measuring the extent to which the site is linked to other sites through ties called "hyperlinks" (see, Google.com and Clever.com), measuring how much economic investment is going into a site (Thunderstone.com), taking polls of users, or even ranking relevance in certain cases according to advertiser's willingness to bid the highest price for good position within ranked lists. As a result of relevance testing procedures, many search engines return hits in presumed rank order or relevance, and some place a percentage next to each hit which is said to represent the probability that the hit is relevant to the query, with the hits arranged in descending percentage order.

However, despite the apparent sophistication of many of the relevance testing techniques employed, the results typically fall short of the promise. Thus, there remains a need for a search engine for uncontrolled databases that provides to the user results, which accurately correspond the desired information sought.

Advertisers are generally willing to pay more to deliver an impression (e.g., a banner ad or other type of advertisement) to users who are especially sensitive to advertisements for their products or are seeking to purchase products corresponding to those sold by the advertisers, and the economic model often provides greater compensation in the event of a "click through", which is a positive action taken by the user to interact with the ad to receive further information.

This principle, of course, actually operates correspondingly in traditional media. For example, a bicycle manufacturer in generally is willing to pay more per subscriber to place advertisements in a magazine having content directed to bicycle buffs than in a general interest publication. However, this principle has not operated very extensively in the search engine marketplace, partly because there is little differentiation among the known characteristics of the users of particular search engines, and because, even after a search inquiry in submitted, there may be little basis on which to judge what user's intention or interest really is, owing to the generality or ambiguity of user's request, so that even after a search request is processed, it may be impossible to estimate the salient economic, demographic, purchasing or interest characteristics of the user in the context of a particular search. In fact, some "cookie" based mechanisms provide long-term persistence of presumed characteristics even when these might be determined to be clearly erroneous. Thus, the existing techniques tend to exaggerate short term, ignorance based or antithetical interests of the user, since these represent the available data set. For example, if a child seeks to research the evils of cigar smoking for a school class project, a search engine might classify the user as a person interested in cigar smoking and cigar paraphernalia, which is clearly not the case. Further, the demographics of a cigar aficionado might tempt an advertiser of distilled liquors to solicit this person as a potential client. The presumed interest in cigars and liquor might then result in adult-oriented materials being presented. Clearly, the simple presumptions that are behind this parade of horribles may often result in erroneous conclusions.

Another inherent problem with the present technology of search engines is that the user, to make a request for information, must use words from natural language, and such words are inherently ambiguous. For example, suppose user enters the word "bat" as a search query to a search engine to search the database generated by its associated spider, and produce a set of ranked results according to the relevance algorithms. The word bat, however, has several possible meanings. The user could mean a "baseball bat", or the mammalian bat, or maybe even a third or forth meaning. Because the technology of existing search engines cannot generally distinguish various users intentions, typically such engines will return results for all possible meanings, resulting in many irrelevant or even ludicrous or offensive results.

Yet another problem with existing search engine technologies relates to the problem of organizing results of a search for future use. Internet browsers, which are presently complex software applications that remain operative during the course of a search, can be used to store a particular URL for future use, but the lists of URLs created in this way tend to become very long and are difficult to organize. Therefore, if a user cannot remember a pertinent URL (many of which are long or obscure), the user may be forced to go search again for resources that user might wish were ready at hand for another use. On the other hand, in some instances, it may be more efficient to conduct a new search rather than recalling a saved search.

Although a few search engines for the mass market exist that charge a fee for use, this model has not been popular or successful. Instead, most search engines offer free access, subject to user tolerating background advertising or pitches for electronic commerce sales or paid links to sites that offer goods and services, including the aforementioned banner ads. These advertisements are typically paid for by sponsors on a per impression basis (each time a user opens the page on which the banner ad appears) or on a "click-through basis" (normally a higher charge, because user has decided to select the ad and "open it up" by activating an underlying hyper-link). In addition, most search engines seek "partners" with whom they mutually share hyperlinks to each other's sites. Finally, the search engines may seek to offer shopping services or merchandise opportunities, and the engines may offer these either globally to all users, or on a context sensitive basis responsive to a user's particular search.

Therefore, the art requires improved searching strategies and tools to provide increased efficiency in locating a user's desired content, while preventing dilution of the best records with those that are redundant, off-topic or irrelevant, or directed to a different audience.

The art also requires an improved user interface for accessing advanced search functionality from massive database engines.

Definition of Search Domain

Multiple database search systems are well known. For example, Dialog Information Services (now known as Knight-Ridder Information, Inc.), provides several hundred databases (also known as "collections") available to searchers. In this case, each collection is a separate accounting unit. Some of these databases contain bibliographic abstracts, while others contain full-text documents. In use, a user is able to define a search query, which can be executed against a single or a plurality of databases. While tools are available to assist the user in defining the database(s) against which to search, fundamentally, the user manually selects individual databases which are of interest, for example based on his past experience, or manually selects a group of databases, selected by the information provider and related to a particular topic. When a query is applied to the group of databases, the information service retrieves the number of hits in each database, and often collates them to avoid duplication and to rank them according to a single criterion. The user then accesses databases of interest to view individual records.

As vast public networks, such as the Internet, become available, new opportunities in searching have become available, not only to searching professionals, but to lay users. New types of information providers are arising who use public, as well as private, databases to provide bibliographic research data and documents to users. When a user has an interest in a topic, he may not know what resources can be assembled for a search, nor the location of the resources. Since the resources frequently change, a user will have less interest in the source of the reply compared to the relevance of the reply. It is well known that distributed collections can be treated as a single collection. Typically, each sub-collection is searched individually, and the reports of all components are combined in a single list. The single list can then be ranked by search engines in accordance with an algorithm and given a weight, taking into account the nature of a particular collection, the determined relevance to the search query, and searcher-entered parameters. Methods are also available for normalizing document scores to obtain scores that would be obtained if individual document collections were merged into a single, unified collection.

One existing problem in the prior art is that the scores for each document are not absolute, but dependent on the statistics of each collection and on the algorithms associated with the search engines. A second existing problem is that the standard prior art procedure requires two passes. In a first pass, statistics are collected from each search engine in order to compute the weight for each query term. In a second step, the information from the first step is passed back to the search engine for each collection, which then assigns a particular weight or score to each hit or identified document. A third problem that exists is that the prior art requires that all collections use the same type search engine, or at least a bridge component to translate into a common format.

U.S. Pat. No. 5,659,732, expressly incorporated herein by reference, proposes a method for searching multiple collections on a single pass, with ranking of documents on a consistent basis so that if the same document appears in two different databases, it would be scored the same when the results are merged. In this system, it is not required that the same search engine be used for all collections. Each participating search engine server returns statistics about each query term in each of the documents returned. A final relevance score is then computed at the client end, rather than in the respective server. In this manner, all relevance scores are processed at the client in the same manner regardless of differences in the search engines.

U.S. Pat. No. 5,634,051, expressly incorporated herein by reference, proposes an information storage, searching and retrieval system for a large domain of archived data of various types, in which the results of a search are organized into discrete types of documents and groups of document types so that users may easily identify relevant information. The system includes means for storing a large domain of data contained in multiple source records, at least some of the source records comprising individual documents of multiple document types; means for searching substantially all of the domain with a single search query to identify documents responsive to the query; and means for categorizing documents responsive to the query based on document type, including means for generating a summary of the number of documents responsive to the query which fall within various predetermined categories of document types. The means for categorizing documents and generating the summary preferably includes a plurality of predetermined sets of categories of document types, and further includes means for automatically customizing the summary by automatically selecting one of the sets of categories, based on the identity of the user or a characteristic of the user (such as the user's professional position, technical discipline, industry identity, etc.), for use in preparing the summary. In this way, the summary for an individual user is automatically customized to a format that is more easily and efficiently utilized and assimilated. Alternately, the set of categories selected may be set up to allow the user to select a desired set of categories for use in summarizing the search results.

According to U.S. Pat. No. 5,634,051, expressly incorporated herein by reference, a process of storing, searching and retrieving information for use with a large domain of archived data of various types involves storing in electronically retrievable form a large domain of data contained in documents obtained from multiple source records, at least some of the source records containing documents of multiple types; generating an electronically executable search query; electronically searching at least a substantial portion of such data based on the query to identify documents responsive to the query; and organizing documents responsive to the query and presenting a summary of the number of documents responsive to the query by type of document independently of the source record from which such documents were obtained. According to a preferred embodiment thereof, the method also involves defining one or more sets of categories of document types, each category corresponding to one or more document types, selecting one of the sets of categories for use in presenting a summary of the results of the search, and then sorting documents responsive to the query by document type utilizing the selected set of categories, facilitating the presentation of a summary of the number of documents responsive to the query which fall within each category in the selected set of categories. The selection of the set of categories to be utilized may be performed automatically based on predetermined criteria relating to the identity of or a personal characteristic of the user (such as the user's professional background, etc.), or the user may be allowed to select the set of categories to be used. The query generation process may contain a knowledge base including a thesaurus that has predetermined and embedded complex search queries, or use natural language processing, or fuzzy logic, or tree structures, or hierarchical relationship or a set of commands that allow persons seeking information to formulate their queries. The search process can utilize any available index and search engine techniques including Boolean, vector, and probabilistic, as long as a substantial portion of the entire domain of archived textual data is searched for each query and all documents found are returned to the organizing process. The sorting/categorization process prepares the search results for presentation by assembling the various document types retrieved by the search engine and then arranging these basic document types into sometimes-broader categories that are readily understood by and relevant to the user. The search results are then presented to the user and arranged by category along with an indication as to the number of relevant documents found in each category. The user may then examine search results in multiple formats, allowing the user to view as much of the document as the user deems necessary. According to the present invention, the self-expressed limits of this patent may be relaxed, allowing use in conjunction with other techniques to achieve a useful result.

Information retrieval systems are designed to store and retrieve information provided by publishers covering different subjects. Both static information, such as works of literature and reference books, and dynamic information, such as newspapers and periodicals, are stored in these systems. Information retrieval engines are provided within prior art information retrieval systems in order to receive search queries from users and perform searches through the stored information. Most information retrieval systems seek to provide the user with all stored information relevant to the query. However, many existing searching/retrieval systems are not adapted to identify the best or most relevant information yielded by the query search. Such systems typically return query results to the user in such a way that the user must retrieve and examine every document returned by the query in order to determine which documents are most relevant. It is therefore desirable to have a document searching system which not only returns a list of relevant information to the user based on a search query, but also returns the list to the user in such a form that the user can readily identify which information returned from the search is most relevant to the query topic. The system may also provide a ranking or sorting algorithm over which the user may exert control, top assist in defining relevancy.

Existing systems for searching and retrieving files from databases, based on user queries, are directed primarily to the searching and retrieval of textual documents. However, there is a growing volume of multi-media information being published that is not primarily textual. Such multi-media information corresponds, for example, to still images, motion video sequences and digital audio sequences, which may be stored and retrieved by digital computers. It would be desirable from the point of view of an individual using an information searching/retrieval system to be able to be able to query a library or database and identify not only text documents, but also multi-media files that are responsive and relevant to the user's query. Moreover, it would be desirable if the searching system could return to the user not only a single list identifying both text and multi-media information responsive to the query search, but also enables the user to readily identify which of the text and multi-media files were most relevant to the query topic.

It is well known in the prior art of information retrieval systems to permit a user to specify a selected subject within a larger group of subjects for searching. For example, a user may wish to search only sports literature, medical literature or art literature. This avoids unnecessary searching through database documents that are not relevant to the user's subject of interest. In order to provide this capability, information retrieval systems must generally categorize documents received from publishers (or drawn from accessible databases) according to their subject, prior to adding them to the database. By seeking to perform this analysis after receiving a search query, the query response would be slowed and the same analysis potentially performed many times. However, present techniques for topically analyzing incoming documents often requires a human individual to read each incoming and make a determination regarding its subject. This process is very time consuming and expensive, as there is often a large number of incoming documents to be processed. The subjecting process may be further complicated if certain documents should properly be categorized in more than one subject. Automated systems for categorizing documents have been developed, for example based on semantic structures; however, these may be of variable quality or make erroneous conclusions.

Many publishers that provide documents to proprietary information retrieval systems require record keeping in order to ensure accurate royalty payments. Record keeping permits the publishers to determine the interest level in various documents produced by the publisher, and potentially the demographics of users retrieving such documents. Thus, it would be desirable to have a searching/retrieval system that tracked not only how often each document stored in the system database was retrieved by users, but also the demographics or respective user profile of the users retrieving the documents and the query searches used to identify and retrieve such documents.

U.S. Pat. Nos. 5,640,553, 5,717,914, 5,737,734, and 5,742,816, expressly incorporated herein by reference, are directed to a method and apparatus for identifying textual documents and multi-media files corresponding to a search topic. A plurality of document records, each of which is representative of at least one textual document, are stored, and a plurality of multi-media records, each of which is representative of at least one of multi-media file, are also stored. The document records have associated text information fields from one of the textual documents. The multi-media records have multi-media information fields for representing only digital images (i.e., still images or motion video image sequences), digital audio or graphics information, and associated text fields associated with the multi-media information fields. A single search query corresponding to the search topic is received, preferably in a natural language format, and an index database is searched in accordance therewith to simultaneously identify document and multi-media records. The index database has a plurality of search terms corresponding to terms represented by the text information fields and the associated text fields, as well as a table for associating each of the document and multi-media records with one or more of the search terms. A search result list having entries representative of both textual documents and multi-media files related to the single search query is generated, with links to the underlying data files.

The Collection Selection Problem

In order to maximize the desirability for users to access a particular private document collection, and preferably related sets of private collections, a collection access provider may acquire licensed rights to make available a wide variety of individual collections of content related documents as discrete databases that can be manually selected for search by a user. Typically, searches and retrievals of information from the discrete databases are subject to specific access fees determined based on the relative commercial worth of the information maintained in the individual databases. Consequently, access fees are typically calculated on the number of documents that are variously searched, reviewed, and/or retrieved in preparation of a search report from a particular database. A known problem in providing access to multiple databases is the relative difficulty or inefficiency in identifying an optimal database or set of databases that should be searched to obtain the best search report for some particular unstructured, or ad hoc, database query. In order to support even the possibility of ad hoc queries, the database search must be conducted on a full text or content established basis.

Existing full text search engines typically allow a user to search many databases simultaneously. For example, commercial private collection access providers, such as Dialog, allow a user to search some 500 or more different databases either individually or in manually selected sets. Consequently, the selection of a most appropriate set of databases to search may place a substantial burden on the user for each query. The user must manually determine and select a particular set of databases that must, by definition, contain the desired results to a query. Such a database set selection is difficult since the selection is made preemptively and independent of the query. This burden may be even more of an issue where access fees are charged for conducting a search against a database even where no search responsive documents are found or examined. In the aggregate, this problem is typically referred to as the "collection selection problem." The collection selection problem is complicated further when the opportunity and desire exists to search any combination of public and private document collections. The Internet effectively provides the opportunity to access many, quite disparately located and maintained, databases. The importance of solving the selection collection problem thus derives from the user's desire to ensure that, for a given ad hoc query, the best and most comprehensive set of possible documents will be returned for examination and potential use at minimum cost. The collection selection problem is formidable even when dealing with a single collection provider. Dialog, an exemplary collection access provider, alone provides access to over 500 separate databases, many with indistinct summary statements of scope and overlapping coverage of topics. With over 50,000 major databases estimated presently available on the Internet, the collection selection problem is therefore impractical to solve reliably and efficiently by a user.

Some approaches to providing automated or at least semi-automated solutions to the collection selection problem have been developed. Known techniques, such as WAIS (wide area information server), utilize a "server of servers" approach. A "master" database is created to contain documents that describe the contents of other "client" databases, as may be potentially available on the Internet. A user first selects and searches the master database to identify a set of client databases that can then be searched for the best results for a given query. In many instances, a master WAIS database is constructed and updated manually. The master database can also be generated at least semi-automatically through the use of automatons (similar to spiders, but which must probe database servers, rather than available, typically non-dynamically generated web pages) that collect information freely from the Internet. The performance of such automatons, however, is often imperfect, if not simply incorrect, in their assessments of client databases. Even at best, certain client databases, including typically private and proprietary document collections, may block access by the automatons and are thus completely unrepresented in the master database. Even where database access can be obtained and document summaries automatically generated, the scaling of the master database becomes problematic if only due to the incomplete, summary, and mischaracterization of document summary entries in the master database. Manual intervention to prepare and improve automaton generated document summaries may enhance the usefulness of the master database, but at great cost. When any manual intervention is required, however, the scaling of the master database comes at least at the expense of the useful content of the master database document summary entries. With greatly increased scale, often only abbreviated document titles or small fractions of the client database documents can be collected as summaries into the master database. As scale increases, succinct manually generated summaries of client database documents become increasingly desired, if not required, to provide any adequate content for the master database document entries. Unfortunately, even at only a modest scale, a master database of manually generated or modified document summaries becomes an impracticable construct to build or maintain.

Perhaps one of the most advanced scalable approaches to constructing and using a meaningful master database is a system known as GLOSS (Glossary-of-Servers Server). An automaton is typically used to prepare a master database document for each client database that is to be included within GLOSS. Each master database document effectively stores the frequency of whatever potential query terms occur within the corresponding client collection of documents. The master database documents are then stored as the master records that collectively form the master database. In response to a user query, GLOSS operates against the master database documents to estimate the number of relevant client collection documents that exist in the respective client collections. These relevant document estimates are determined from a calculation based on the combined query term frequencies within each of the master database documents. GLOSS then assumes that client databases ranked as having the greatest number of combined query term occurrences are the most relevant databases to then search. Utilizing a relevance system based on term frequency inherently constrains the type and effectiveness of queries that can be meaningfully directed against the master database. In addition, the estimator used by GLOSS is by definition nonspecific to any client document. The GLOSS system is therefore highly subject to failures to identify client databases that may contain only a relatively few instances of the query terms, yet may contain relevant documents.

Other approaches to establishing a quantitative basis for selecting client database sets include the use of comprehensive indexing strategies, ranking systems based on training queries, expert systems using rule-based deduction methodologies, and inference networks. These approaches are used to examine knowledge base descriptions of client document collections. Indexing and ranking systems both operate typically against the client databases directly to, in effect, create categorizations of the client databases against search term occurrences. All possible query terms are indexed in the case of comprehensive indexing, while a limited set of predefined or static query terms are used in the case of simple ranking. Indexing thus generates a master database of selectable completeness that is nonetheless useable for selecting a most likely relevant set of client databases for a particular query. Ranking also generates a master database, though based on the results of a limited set of broad test queries intended to collectively categorize subsets of the available client databases. In effect, categorization by fixed query term results in generally orthogonal lists of ranked client database sets. Expert system approaches typically operate on client database scope and content descriptions to deduce or establish a basis for subsequently deducing a most likely set of databases that will likely contain the most relevant documents for a particular query. Finally, inference networks utilize a term-frequency based probabilistic approach to estimating the relevance of a particular client database as against other client databases. The known implementations of inference networks are unable to accurately rank the potential relevance of client databases of diverse size and differences in the generation of summaries for each of the client databases considered. Thus, the known approaches to solving the client database collection selection problem are generally viewed as inefficient in the assembly, construction, and maintenance of a master document database. These known systems are also viewed as often ineffective in identifying the likely most relevant documents within entire sets of collections because real world collections are often highly variable in size, scope, and content or cannot be uniformly characterized by existing quantitative approaches.

Another and perhaps practically most significant limitation of these known systems is that each must be self-contained in order to operate. This is a direct result of each system utilizing a proprietary algorithm, whether implemented as a manual operation or through the operation of an automaton, to universally assemble the information necessary to create or populate the master database documents from the raw collection documents. As such, these known systems cannot depend on one-another or on any other indexing systems; each must be responsible for both the total generation and subsequent exclusive utilization of their master database summary record documents. Consequently, there remains a need for an enhanced system of handling the collection selection problem in view of the ever-increasing number and scale of collections available on the Internet and the increasing variety of the collections, both in terms of existing organization and informational content.

U.S. Pat. Nos. 5,640,553, 5,717,914, 5,737,734, and 5,742,816, expressly incorporated herein by reference, are directed to a computer-implemented method and apparatus for composing a composite document on a selected topic from a plurality of information sources by searching the plurality of information sources and identifying, displaying and copying files corresponding to the selected topic. A plurality of records, each of which is representative of at least one information file, are stored in a database. A single search query corresponding to the search topic is received. The database is searched in accordance with the single search query to identify records related to the single search query. A search result list is then generated having entries representative of information files identified during the database search, and the search result list is displayed in a first display window open on a user display. Inputs representative of at least first and second selected entries from the search result list are received from the user, the first and second selected entries respectively corresponding to first and second information files. A second display window for displaying at least a portion of the first information file is opened on the user display, a third display window for displaying at least a portion of the second information file is opened on the user display, and a document composition window for receiving portions of the and second first information files is opened on the user display. The composite document is then composed by copying portions of the first and second information files from the second and third display windows, respectively, to the document composition window. The system also supports user accounting for system use.

U.S. Pat. No. 5,845,278, expressly incorporated herein by reference, provides a method of selecting a subset of a plurality of document collections for searching, in response to a predetermined query, based on accessing a meta-information data file that correlates the query significant search terms present in a particular document collection with normalized document usage frequencies of such terms within the documents of each document collection and a normalized document collection frequency of documents that include the search significant terms within the set of document collections. By access to the meta-information data file, a relevance score for each of the document collections is determined. The method then returns an identification of the subset of the plurality of document collections having the highest relevance scores for use in evaluating the predetermined query. The meta-information data file may be constructed to include document normalized term frequencies and other contextual information that can be evaluated in the application of a query against a particular document collection. This contextual information may include term proximity, capitalization, and phraseology as well as document specific information such as, but not limited to collection name, document type, authors, date of publication, publisher, keywords, summary description of contents, price, language, country of publication, number of documents included in collection, and publication name. An advantage of this type of system is that the method provides for both automated and manual description to be used in selecting collections that contain the most likely relevant documents in relation to an ad hoc query.

U.S. Pat. No. 5,845,278 thus relates to a method of selecting a subset of a plurality of document collections for searching in response to a predetermined query, based on accessing a meta-information data file that describes the query significant search terms that are present in a particular document collection correlated to normalized document usage frequencies of such terms within the documents of each document collection. By access to the meta-information data file, a relevance score for each of the document collections is determined, and an identification of the subset of the plurality of document collections returned having the highest relevance scores for use in evaluating the predetermined query. The meta-information data file may be constructed to include document normalized term frequencies and other contextual information that can be evaluated in the application of a query against a particular document collection. This other contextual information may include term proximity, capitalization, and phraseology as well as document specific information such as, but not limited to collection name, document type, document title, authors, date of publication, publisher, keywords, summary description of contents, price, language, country of publication, publication name. Statistical data for the collection may include information such as the number of documents in the collection, the total size of the collection, the average document size and average number of words in the base document collection.

U.S. Pat. No. 5,878,423, expressly incorporated herein by reference, relates to an index associated with a database that is dynamically processed in an information retrieval system to create a set of questions for use when processing a data inquiry from a user. The index, a structured guide used when searching the database, has different information domains. After one of these domains is selected, a particular order of the index categories within the selected domain is determined, typically by referring to the order lookup table within the index. A script corresponds to the selected domain. Within the script, there are questions corresponding to each index category within the selected domain. These questions are dynamically used to prompt the user. Only the questions corresponding to active index categories are arranged into the set of questions having a question set order corresponding to the particular order of the index categories. In an iterative process, the first question is identified and used to prompt the user to select a term from a scaled down vocabulary of terms (i.e., only those terms associated with the first question and corresponding first index category). Upon selecting the term, a search of the database is performed by the search engine module based upon the selected term. If there is too much information returned from the search, the next question is identified and the iterative process is repeated. Thus, this general technique may be used to iteratively select appropriate collections.

The index is provided having a variety of domains and a variety of terms. In addition to the previous description of an index, an index may be generally described as a data structure which maintains terms associated with information in a database, index categories associated with the terms, domains of particular index categories, and group headings. Each of the group headings may be hierarchically related to each other and correspond to information in the database in a vertical fashion. In other words, a hierarchical relationship between each of the group headings creates a vertical hierarchy with one or more levels. One of the domains is selected from the index. The selected domain has a variety of index categories, and is associated with a portion of the terms in the index. Each of the index categories is associated with a question so as to provide a set of questions for the selected domain. Next, the particular order of index categories in the selected domain is determined, corresponding to the particular order associated with the index categories in the selected domain. Generally, if any of the index categories are inactive (or the proposed question appears to have no discriminating power), the question corresponding to the inactive index category is deleted from the set. Deleting such questions from the set dynamically adapts the set to include only questions related to available information within the database. This, in turn, allows for a more contextual and appropriate response to selections made by a user and permits the data inquiry to be processed more intelligently. Furthermore, deleting such questions from the set avoids wasting valuable transaction processing time and the users time. Next, the first question in the set is identified from the remaining questions in the set. Typically, the terms of the index are scaled to include only those terms associated with the index category corresponding to the identified question. The user is then prompted to select one of the scaled terms. The database is searched for information associated with the selected term. If the amount of information retrieved from the database during the search exceeds a predetermined threshold, the method identifies the next question in the question set order and repeats the above-described steps. However, if the amount of information does not exceed the predetermined threshold, then the information is delivered to the user. Delivery is typically accomplished by transmitting a signal having the information back to the user. From these described steps, the set of questions is dynamically created for use when processing the inquiry from the user. According to the present invention, the user may be provided with a query status with each successive screen, to allow him to determine an appropriate threshold or determine when to examine the search results manually.

Targeted Advertising

The current wide-ranging use of computer systems provides a relatively large potential market to providers of electronic content or information. These providers may include, for example, advertisers and other information publishers such as newspaper and magazine publishers. A cost, however, is involved with providing electronic information to individual consumers. For example, hardware and maintenance costs are involved in establishing and maintaining information servers and networks. One source that can be secured to provide the monetary resources necessary to establish and maintain such an electronic information distribution network includes commercial advertisers. These advertisers provide electronic information to end users of the system by way of electronically delivered advertisements, in an attempt to sell products and services to the end users. The value of a group of end users, however, may be different for each of the respective advertisers, based on the product or services each advertiser is trying to sell and the class or classification of the user. Thus, it would be beneficial to provide a system, which allows individual advertisers to pay all, or part of the cost of such a network, based on the value each advertiser places on the end users the advertiser is given access to. In addition, advertisers often desire to target particular audiences for their advertisements. These targeted audiences are the audiences that an advertiser believes is most likely to be influenced by the advertisement or otherwise provide revenues or profits. By selectively targeting particular audiences the advertiser is able to expend his or her advertising resources in an efficient manner. Thus, it would be beneficial to provide a system that allows electronic advertisers to target specific audiences, and thus not require advertisers to provide an single advertisement to the entire population, the majority of which may have no interest whatsoever in the product or service being advertised or susceptibility to the advertisement.

U.S. Pat. No. 5,724,521, expressly incorporated herein by reference, provides a method and apparatus for providing electronic advertisements to end users in a consumer best-fit pricing manner, which includes an index database, a user profile database, and a consumer scale matching process. The index database provides storage space for the titles of electronic advertisements. The user profile database provides storage for a set of characteristics that corresponds to individual end users of the apparatus. The consumer scale matching process is coupled to the content database and the user profile database and compares the characteristics of the individual end users with a consumer scale associated with the electronic advertisement. The apparatus then charges a fee to the advertiser, based on the comparison by the matching process. In one embodiment, a consumer scale is generated for each of multiple electronic advertisements. These advertisements are then transferred to multiple yellow page servers, and the titles associated with the advertisements are subsequently transferred to multiple metering servers. At the metering servers, a determination is made as to where the characteristics of the end users served by each of the metering servers fall on the consumer scale. The higher the characteristics of the end users served by a particular metering server fall, the higher the fee charged to the advertiser.

Each client system is provided with an interface, such as a graphic user interface (GUI), that allows the end user to participate in the system. The GUI contains fields that receive or correspond to inputs entered by the end user. The fields may include the user's name and possibly a password. The GUI may also have hidden fields relating to "consumer variables." Consumer variables refer to demographic, psychographic and other profile information. Demographic information refers to the vital statistics of individuals, such as age, sex, income and marital status. Psychographic information refers to the lifestyle and behavioral characteristics of individuals, such as likes and dislikes, color preferences and personality traits that show consumer behavioral characteristics. Thus, the consumer variables, or user profile data, refer to information such as marital status, color preferences, favorite sizes and shapes, preferred learning modes, employer, job title, mailing address, phone number, personal and business areas of interest, the willingness to participate in a survey, along with various lifestyle information. The end user initially enters the requested data and the non-identifying information is transferred to the metering server. That is, the information associated with the end user is compiled and transferred to the metering server without any indication of the identity of the user (for example, the name and phone number are not included in the computation). The GUI also allows the user to receive inquiries, request information and consume information by viewing, storing, printing, etc. The client system may also be provided with tools to create content, advertisements, etc. in the same manner as a publisher/advertiser.

Structured Information Presentation

As the amount of information available to a computer user increases, the problem of coherently presenting the range of available information to the computer user in a manner which allows the user to comprehend the overall scope of the available information becomes more significant. Furthermore, coherent presentation of the relationship between a chosen data unit of the available information to the rest of the available information also becomes more significant with the increase of information available to the user. Most of the existing methods utilize lists (e.g., fundamentally formatted character-based output), not graphic models, to indicate the structure of the available information. The main problem associated with the use of lists is the difficulty of indicating the size and complexity of the database containing the available information. In addition, because the lists are presented in a two-dimensional format, the manner of indicating the relationship between various data units of the available information is restricted to the two-dimensional space. Furthermore, because presentation of the lists normally requires a significant part of the screen, the user is forced to reduce the amount of screen occupied by the list when textual and visual information contained in the database is sought to be viewed. When this occurs, the user's current "position" relative to other data units of the available information is lost. Subsequently, when the user desires to reposition to some other data unit (topic), the screen space occupied by the lists must be enlarged. The repeated sequence of adjusting the screen space occupied by the lists tends to distract the user, thereby reducing productivity.

One attempt to alleviate the above-described problem is illustrated by U.S. Pat. No. 5,021,976, expressly incorporated herein by reference, which discloses a system for enabling a user to interact with visual representations of information structures stored in a computer. In a system of this type, a set of mathematical relationships is provided in the computer to define a plurality of parameters which may be of interest to the user, which mathematical relationships are also capable of indicating a degree of correlation between the defined parameters and segments of information contained in a defined information system. In addition, an "automatic icon" with multiple visual features is provided to enable the user to visualize the degree of correlation between the parameters of interest to the user and the particular data unit stored in the computer that is being examined by computer. As the degree of correlation for a given parameter changes, the visual feature representing that parameter will change its appearance.

Another attempt to coherently present a large body of information to a computer user is illustrated by U.S. Pat. No. 5,297,253, expressly incorporated herein by reference, which discloses a computer-user-interface navigational system for examining data units stored in the memory of a computer system. In this navigational system, the user interface shows a continuous and automatically updated visual representations of the hierarchical structure of the information accessed. By using an input/output device to manipulate icons that appear in a navigational panel, the user can navigate through the information hierarchy. As the user traverses the information hierarchy, a node icon representing each level in the hierarchy accessed by the user is displayed. The user is also able to directly select any level in the information hierarchy between the entry point and the level at which the user is currently located.

Yet another approach to coherently presenting a large body of information to a computer user is "SEMNET," described in: Raymonde Guindon, ed., Cognitive Science and Its Applications for Human-Computer Interaction, (Hillsdale, N.J.: Lawrence Erlbaum Associates, Inc., 1988), 201–232. SEMNET is a three-dimensional graphical interface system that allows the users to examine specific data units of an information base while maintaining the global perspective of the entire information base. The SEMNET developers propose organizing component data units of an information base into various levels of hierarchy. At the lowest level of hierarchy, the most basic data units are organized into various sets, or cluster-objects of related information. At the next level of hierarchy, related cluster-objects from the lower hierarchical level are organized into a higher-level cluster-object. Continuing in this manner, SEMNET achieves a hierarchical organization of the information base. In the graphic display, related data units within a cluster-object are connected by lines, or arcs. In addition, using a "fisheye view" graphic presentation, SEMNET displays the most basic data units near the chosen data unit but only cluster-objects of increasing hierarchy as the distance increases from the chosen data unit. In this manner, the user is able to visualize the organization of the information base relative to the chosen data unit. See, U.S. Pat. No. 5,963,965, expressly incorporated herein by reference.

U.S. Pat. No. 5,812,134, expressly incorporated herein by reference, relates to a system for interactive, dynamic, three-dimensional presentation of a database structure, seeking to allows the user to efficiently navigate through the database to examine the desired information. The system graphically depicts the organization of the information base as "molecules" consisting of structured parallel "threads" of connected nodes, each encompassing a specific aspect of the overall database. Within a given thread, the component nodes, which share a commonality of subject, are arranged in a natural, linear progression that reflects the organizational structure of the information subject represented by the thread, thereby providing the user with a visual guide suggesting the appropriate sequence of nodes to be viewed. By providing a hierarchical representation of the organizational structure of the entire database, the navigational system provides the user with both the "position" of the information unit being currently examined relative to the remainder of the database, as well as the information regarding the overall size and complexity of the database. The system also provides the user with the capability to define one or more "customized" navigation "paths" over the database, as well as copy and modify existing units of information. The system therefore provides an interface system for presenting on a monitor of a computer system a dynamic, graphic representation of organization of one of a portion of information and entire information within an information base, the entire information within the information base being organized into at least first hierarchical level having at least a plurality of first-sublevel information units, a plurality of second-sublevel information units, and at least one third-sublevel information unit, each of the first-sublevel, second-sublevel and third-sublevel information units having an identifier, each of the second-sublevel information units comprising at least one first-sublevel information unit, the at least one third-sublevel information unit comprising a plurality of the second-sublevel information units, the dynamic, graphic representation implying a specific search path that a user may take in examining the available information, the interface system comprising means for generating a coded data map reflecting the organization of the entire information within the information base based at least on the identifiers for each of the first-sublevel, second-sublevel and third-sublevel information units; and means for presenting on the monitor the dynamic, graphic representation of the organization of the one of the portion of information and the entire information within the information base, the graphic presentation means generating the dynamic graphic representation based on the data map, the dynamic graphic representation comprising at least one molecule for the first hierarchical level of organization, the at least one first-hierarchical-level molecule having at least one first-hierarchical-level thread of multiple first-hierarchical-level nodes connected in sequence, each of the multiple first-hierarchical-level nodes representing one of the plurality of second-sublevel information units, and the at least one first-hierarchical-level thread representing the at least one third-sublevel information unit; wherein the sequence of first-hierarchical-level nodes in the at least one first-hierarchical-level thread corresponds to an organization of the at least one third-sublevel information unit. Thus, a taxonomy is constructed and employed to assist the user.

U.S. Pat. No. 5,774,357, expressly incorporated herein by reference, relates to a system that is adaptive to either or both of a user input and a data environment. Therefore, the user interface itself and/or the data presented through the user interface, such as a web browser, may vary in dependence on a user characteristic and the content of the data.

U.S. Pat. No. 5,886,698, expressly incorporated herein by reference, relates to a system wherein images representing search results are displayed on a screen of a computer system. The search results are responsive to a search in a database initiated by a user by entering a keyword or keywords via an input device. The images are displayed in such a way that an image corresponding to the highest matching value is the largest is size, while remaining matches are represented by images in direct proportion to their relevance to the keyword. In addition, the relevance of an image is indicated by its proximity to the keyword displayed on the screen: the closer the displayed image to the keyword, the more relevant the match represented by that image is to that keyword. This display operation is equivalent to two simultaneous searches with Boolean operators "OR" and "AND". A graphical squeegee may be dragged across images representing search results in order to filter the results based on a keyword. The squeegee is displayed as a vertical bar and is associated with a keyword. As the squeegee is moved across the screen, images relevant to the keyword are moved while remaining images are not moved.

U.S. Pat. No. 5,918,236, expressly incorporated herein by reference, relates to system for generating and displaying point of view and generic "gists" for use in a document browsing system. Each point of view gist provides a synopsis or abstract that reflects the content of a document from a predetermined point of view or slant. A content processing system analyzes documents to generate a thematic profile for use by the point of view gist processing. The point of view gist processing generates point of view gists based on the different themes or topics contained in a document by identifying paragraphs from the document that include content relating to a theme for which the point of view gist is based. In one embodiment, the user of a document browsing system inputs topics to select a particular point of view gist for a document. A document browsing system may also display point of view gists based on a navigation history of categories selected by a user though use of a document browsing system. In another embodiment, a document browsing system generates and displays generic gists, which include content relating to the document themes.

Intelligent Searching

When a user of an information searching/retrieval system enters a search query into the system, the query must be parsed. Based on the parsed query, a listing of stored documents relevant to the query is provided to the user for review. In the prior art, it is known to use semantic networks when parsing a query. Semantic networks make it possible to identify words not appearing in the query, but which logically correspond to or are associated with the words used in the query. The number of words used to search the database is then expanded by including the corresponding words or associated words identified by the semantic network in the search instructions. This procedure is used to increase the number of relevant documents located by the information searching/retrieval system. Although semantic networks may be useful for finding additional relevant documents responsive to a query, this technique also tends to increase the number of irrelevant documents located by the search, unless other techniques are also used.

U.S. Pat. No. 5,855,015, expressly incorporated herein by reference, relates to a system and method for adaptively traversing a network of linked textual or multi-media information, which utilizes one or more heuristics to explore the network and present information to a user. An exploration or search heuristic governs activity while examining and exploring the linked information resources, while a presentation heuristic controls presentation of a manageable amount of information resources to the user. The system and method accept relevance feedback from the user, which is used to refine future search, retrieval, and presentation of information resources. The user may present an information query of various degrees of specificity or the system and method may search and present information resources based entirely on relevance feedback from the user.

Many information retrieval systems and methods focus primarily on selecting information based on a formatted query. The particular format often varies significantly from one system to the next depending upon the particular type of information and the structure of the information database. These approaches assume the existence of a collection of information and a user-specified query, with the task of the search engine being to find those documents that satisfy the query. A significant amount of research and development relating to information retrieval has focused on techniques for determining the degree of similarity between "information units", i.e. a sentence, document, file, graphic, image, sound bite, or the like, or between the user query and an information unit. As the amount of information in the collection grows, the number of information units that correspond to the query will likely grow as well. As a result, it becomes necessary to make queries increasingly more precise so that the system will return a manageable number of results. It is therefore desirable for a system and method to facilitate sophisticated query construction without requiring an unreasonable amount of time or effort to be expended by the user.

One powerful approach to this problem utilizes a technique referred to as relevance feedback. In a system employing relevance feedback, a few resources that are determined to be interesting, or similar to a user query, are presented to the user who provides feedback to the system pertaining to the relevance of the resources. The user feedback is used to update the query, in an attempt to generate increasingly more precise queries resulting in retrieval of increasingly more relevant resources. A variety of implementations of the general technique of relevance feedback are possible, depending upon the particular structure of the query, the structure of the information, and the method for updating the query based on the feedback.

Traditional information search and retrieval techniques have been applied to hyperlinked information networks. One direct approach utilizing standard information retrieval techniques consists of systematically exploring the network and generating a catalog, index, or map of links associated with documents containing information of interest. This index is then used to retrieve the relevant information based on a user query without employing the hyperlinked structure. This approach is difficult to apply to large, dynamic hyperlinked information networks that may be too large to search exhaustively. Furthermore, the dynamic nature of such networks requires repetitively searching and updating the hyperlink index. This task involves continually accessing various network server locations, which requires a significant amount of network bandwidth, computing resources, and time. In addition, standard information retrieval techniques require the user to articulate or characterize information of interest. Frequently, however, users may be able to easily recognize a document meeting their information need, but may have difficulty expressing that need explicitly in a format appropriate for the information retrieval system. In these cases, the manual examination of search results is a critical part of the search process.

U.S. Pat. No. 5,855,015, expressly incorporated herein by reference, proposes a system for retrieval of hyperlinked information resources which does not require a specific user query to locate information resources of interest, and which actively explores a hyperlinked network to present interesting resources to a user. Heuristics and relevance feedback may be used to refine an exploration technique, or to present resources of interest to a user. The proposed system continually adapts to changing user interests. A system for retrieval of hyperlinked information resources is provided which includes a user interface connected to a programmed microprocessor which is operative to explore the hyperlinked information resources using a first heuristic to select at least one information resource, to present the at least one information resource to the user via the user interface based on a second heuristic, to accept feedback from the user via the user interface, the feedback being indicative of relevance of the at least one information resource, and to modify the first and second heuristics based on the feedback. The patent also proposes a method for retrieval of hyperlinked information resources that includes exploring the hyperlinked information resources using a first heuristic to select at least one information resource, presenting the at least one information resource to the user via a user interface based on a second heuristic, accepting feedback from the user via the user interface indicative of relevance of the at least one information resource, and modifying the first and second heuristics based on the feedback. In one embodiment, the system utilizes a series of training examples, each having an associated ranking, to develop the first and second heuristics that may be the same, similar, or distinct. The heuristics utilize a metric indicative of the relevance of a particular resource to select and present the most relevant information to the user. The user provides feedback, such as a score or rating, for each information resource presented. This feedback is utilized to modify the heuristics so that subsequent exploration will be guided toward more desirable information resources.

The system actively explores a hyperlinked network and presents a manageable amount (controllable by the user) of information to the user without a specific information query. (Of course, the present invention permits such a specific information query, and thus is not limited in this way). Thus, the method allows selection of information of interest that may have been excluded by a precisely articulated query. Furthermore, rather than inundating the user with information selected from a general, broad query, the amount of information presented to the user is limited so as to minimize the time and effort required to review the information. This system provides ability to automatically learn the interests of the user based on a number of ranked training examples. Once exploration and presentation heuristics are developed, a hyperlinked network may be explored, retrieving and presenting information resources based upon the heuristics established by the training examples. The system is capable of continually adapting the exploration and presentation heuristics so as to accommodate changing user interests in addition to facilitating operation in a dynamic hyperlinked information environment.

U.S. Pat. No. 5,890,152, expressly incorporated herein by reference, relates to a Personal Feedback browser and Personal Profile database for obtaining media files from the Internet. A Personal Feedback browser selects media files based on user-specified information stored in the Personal Profile database. The Personal Profile database includes Profile Objects that represent the interests, attitude/aptitude, reading comprehension and tastes of a user. Profile Objects are bundles of key words/key phrases having assigned weight values. Profile Objects can be positioned a specified distance from a Self Object. The distance from the Profile Object to the Self Object represents the effect the Profile Object has in filtering and/or selecting media files for that user. The Personal Feedback browser includes a media evaluation software program for evaluating media files based on a personal profile database. The Personal Profile database is also adjusted based upon user selection and absorption of media files.

U.S. Pat. No. 5,920,854, expressly incorporated herein by reference, establishes a collection search system that is responsive to a user query applied against a collection of documents to provide a search report. The collection search system includes a collection index including first predetermined single word and multiple word phrases as indexed terms occurring in the collection of documents, a linguistic parser that identifies a list of search terms from a user query, the linguistic parser identifying the list from second predetermined single words and multiple word phrases, and a search engine coupled to receive the list from the linguistic parser. The search engine operates to intersect the list with the collection index to identify a predetermined document from the collection of documents. The search engine includes an accumulator for summing a relevancy score for the predetermined document that is then related to the intersection of the predetermined document with the list. An advantage of this system is that the search engine utilizes selective multi-word indexing to speed the search by the effective inclusion of proximity relations as part of the document index retrieval. Furthermore, multiple identifications of a document, both on the basis of single word and phrase index identifications, results in a desirable bias of the search report score towards most relevant documents. Another advantage of this system is that the index database utilized handles both word and phrase terms as a single data type, with correspondingly simplified merge and join relational database operators. Through the combined handling of both words and phrases, the system usually requires only a single disk access to retrieve a term list from a collection index. The index database operations needed to support term searching and combination can be effectively achieved utilizing just merge and join relational operators, further simplifying and enhancing the intrinsic speed of the index database management system.

U.S. Pat. No. 5,920,859, expressly incorporated herein by reference, relates to a search engine for retrieving documents pertinent to a query that indexes documents in accordance with hyperlinks pointing to those documents. The indexer traverses the hypertext database and finds hypertext information including the address of the document the hyperlinks point to and the anchor text of each hyperlink. The information is stored in an inverted index file, which may also be used to calculate document link vectors for each hyperlink pointing to a particular document. When a query is entered, the search engine finds all document vectors for documents having the query terms in their anchor text. A query vector is also calculated, and the dot product of the query vector and each document link vector is calculated. The dot products relating to a particular document are summed to determine the relevance ranking for each document.

Use of Transactional Data for Marketing

In recent years, the field of data mining, or extracting useful information from bodies of accumulated raw data, has provided a fertile new frontier for database and software technologies. While numerous types of data may make use of data mining technology, a few particularly illuminating examples have been those of mining information, useful to retail merchants, from databases of customer sales transactions, and mining information from databases of commercial passenger airline travel. Customer purchasing patterns over time can provide invaluable marketing information for a wide variety of applications. For example, retailers can create more effective store displays, and can more effectively control inventory, than otherwise would be possible, if they know that, given a consumer's purchase of a first set of items, the same consumer can be expected, with some degree of probability, to purchase a particular second set of items along with the first set. In other words, it would be helpful from a marketing standpoint to know association rules between item-sets (different products) in a transaction (a customer shopping transaction). To illustrate, it would be helpful for a retailer of automotive parts and supplies to be aware of an association rule expressing the fact that 90% of the consumers who purchase automobile batteries and battery cables also purchase battery post brushes and battery post cleanser. (In the terminology of the data mining field, the latter are referred to as the "consequent.") It will be appreciated that advertisers, too, can benefit from a thorough knowledge of such consumer purchasing tendencies. Still further, catalogue companies can conduct more effective mass mailings if they know the tendencies of consumers to purchase particular sets of items with other sets of items.

It is possible to build large databases of consumer transactions. The ubiquitous bar-code reader can almost instantaneously read so-called basket data, i.e., when a particular item from a particular lot was purchased by a consumer, how many items the consumer purchased, and so on, for automatic electronic storage of the basket data. Further, when the purchase is made with, for example, a credit card, the identity of the purchaser can be almost instantaneously known, recorded, and stored along with the basket data. As alluded to above, however, building a transaction database is only part of the marketing challenge. Another important part is the mining of the database for useful information. Such database mining becomes increasingly problematic as the size of databases expands into the gigabyte, and indeed the terabyte, range. Much work, in the data mining field, has gone to the task of finding patterns of measurable levels of consistency or predictability, in the accumulated data. For instance, where the data documents retail customer purchase transactions, purchasing tendencies, and, hence, particular regimes of data mining can be classified many ways. One type of purchasing tendency has been called an "association rule." In a conventional data mining system, working on a database of supermarket customer purchase records, there might be an association rule that, to a given percent certainty, a customer buying a first product (say, Brie cheese) will also buy a second product (say, Chardonnay wine). It thus may generally be stated that a conventional association rule states a condition precedent (purchase of the first product) and a condition subsequent or "consequent" (purchase of the second product), and declares that, with, say 80% certainty, if the condition precedent is satisfied, the consequent will be satisfied, also. Methods for mining transaction databases to discover association rules have been disclosed in Agrawal et al., "Mining Association Rules Between Sets of Items in Large Databases", Proc. of the ACM SigMod Conf. on Management of Data, May 1993, pp. 207–216, and in Houtsma et al., "Set-Oriented Mining of Association Rules", IBM Research Report RJ 9567, October, 1993. See also, Agrawal et al., U.S. Pat. Nos. 5,615,341, 5,796,209, 5,724,573 and 5,812,997. However, association rules have been limited in scope, in the sense that the conditions precedent and subsequent fall within the same column or field of the database. In the above example, for instance, cheese and wine both fall within the category of supermarket items purchased.

U.S. Pat. No. 5,844,305, expressly incorporated herein by reference, relates to a system and method for extracting highly correlated elements (a "categorical cluster") from a body of data. It is generally understood that the data includes a plurality of records, the records contain elements from among a set of common fields, the elements have respective values, and some of the values are common to different ones of the records. In an initialization step, for each of the elements in the records, an associated value, having an initial value, is assigned. Then, a computation is performed, to update the associated values based on the associated values of other elements. The computation is preferably iteratively to produce the next set of updated values. After the computation is completed, or after all the desired iterations are completed, the final results, i.e., the updated associated values are used to derive a categorical cluster rule. The categorical cluster rule provides the owner of the data with advantageously useful information from the data.

Tracking of User Activity

Frequency programs have been developed by the travel industry to promote customer loyalty. An example of such a program is a "frequent flyer" program. According to such a program, when a traveler books a flight, a certain amount of "mileage points" is calculated by a formula using the distance of the destination as a parameter. However, the mileage points are not awarded until the traveler actually takes the flight. When a traveler has accumulated a sufficient number of mileage points, he may redeem these points for an award chosen from a specific list of awards specified by the program. Thus, for example, the traveler may redeem the points for a free flight ticket or a free rental car. In order to redeem the accumulated points, the traveler generally needs to request a certificate, and use the issued certificate as payment for the free travel. While the above program may induce customer loyalty, it has the disadvantage that the selection of prizes can be made only from the limited list of awards provided by the company. For example, a traveler may redeem the certificate for flights between only those destinations to which the carrier has a regular service. Another disadvantage is that the customer generally needs to plan ahead in sufficient time to order and receive the award certificate. According to another type of frequency and award program, a credit instrument is provided and credit points are accumulated instead of the mileage points. In such programs, bonus points are awarded by using a formula in which the price paid for merchandise is a parameter. Thus, upon each purchase a certain number of bonus points are awarded, which translate to dollar credit amount. According to these programs, the customer receives a credit instrument that may be acceptable by many enrolled retailers, so that the selection of prizes available is enhanced. An example of such a program is disclosed in E.P.A. 308,224. However, while such programs may enhance the selection of prizes, there is still the problem of obtaining the credit instrument for redeeming the awarded points. In addition, the enrollee must allow for processing time before the bonus points are recorded and made available as redeemable credit. Thus, the immediacy effect of the reward is lacking in these conventional incentive programs. U.S. Pat. No. 5,774,870, expressly incorporated herein by reference, provides an on-line access to product information, product purchases using an on-line electronic order form, award catalogs, and award redemption using an on-line electronic redemption form. Bonus points are awarded immediately upon purchase of the merchandise, and are immediately made available for redemption.

These reward programs have the direct consequence that the user has an incentive to uniquely identify himself in order to be able to collect the reward after a number of uses, and to use the services associated with the reward program in distinction to similar services provided by others. Therefore, by providing a reward program, the value of personalization is increased for the user, thereby incentivizing the user to comply with the acquisition of personal information by the system.

Relevance Ranking

Web search services typically need to support a number of specific search capabilities to be at least perceived as a useful document locator service within the Web community. These capabilities include performing relatively complete searches of all of the available Web information, providing fast user-query response times, and developing an appropriate relevance ranking of the documents identified through the index search, among others. In order to support a relatively complete search over any collection of documents, the derived document collection index managed by a Web search service may store a list of the terms, or individual words, that occur within the indexed document collection. Words, particularly simple verbs, conjunctions and prepositions are often preemptively excluded from the term index as presumptively carrying no significant informational weight. Various heuristics can be employed to identify other words that appear too frequently within a document collection to likely serve to contextually differentiate the various documents of the collection. As can be expected, these heuristics are often complex and difficult to implement without losing substantive information from the index. Furthermore, as these heuristics generally operate on a collection-wide basis to minimize unbalanced loss of information, a distributed database architecture for storing the document collection variously becomes prohibitively complex to implement, slow in terms of query response time and quite limited in providing global relevancy ranking.

In order to improve query response time, conventional Web search services often strive to minimize the size of their indexes. A minimum index format provides identifications of any number of documents against particular indexed terms. Thus, word terms of a client query can be matched against the collection index terms to identify documents within the collection that have at least one occurrence of the query terms. A conventional relevancy score can be based on the combined frequency of occurrence of the query terms on a per document basis. Other weighing heuristics, such as the number of times that any of the query terms occur within a document, can also be used. These relevance-ranking systems typically presume that increasing occurrences of specific query terms within a document means that the document is more likely relevant and responsive to the query. A query report listing the identified documents ranked according to relevancy score is then presented to the client user. Simple occurrence indexes as described above are, nonetheless, quite large. In general, a term occurrence index maintained in a conventional relational database management system will be approximately 30% of the total size of the entire collection. At the expense of index size, proximity information is conventionally utilized to improve document relevancy scoring. The basic occurrence index is expanded into a proximity index by storing location-of-occurrence information with the document identifications for each of the indexed terms in a document collection. Storing the expanded term-proximity information results in the size of the index typically being on the order of 60 to 70 percent of the total size of the document collection. The term-proximity information provides an additional basis for evaluating the relevancy of the various documents responsive to a particular client query. Conventional search engines can post-process the client query identified documents to take into account the relative proximity of the search terms in individual documents. In effect, a revised relevancy ranking of the documents is generated based on whether, and to what degree, query terms are grouped in close proximity to one another within the identified document. Again, the conventional presumption is that the closer the proximity of the terms, the more likely the document will be particularly relevant and responsive to the client query.

Various schemes can be utilized to further weight and balance the relevancy scores derived from term frequency and term proximity. While a number of such schemes are known, the schemes operate on the reasonable and necessary premise that all relevant documents need to be initially identified from the collection before a final relative relevancy score can be computed. The relative relevancy is then calculated based on the full set of query-identified documents. Thus, existing search systems cannot effectively operate against a document collection index that, due perhaps to size or to support parallel access, is fragmented over multiple server systems or against multiple collection indexes that are served from multiple distributed servers. Furthermore, to determine if the proper, consistent ranking of the full set of query identified documents produce the ranking scores, conventionally they must be calculated over the full set of identified documents. Large amounts of information must therefore be pooled from the potentially multiple index servers in order to perform the aggregate relevancy scoring. Consequently, the convenience, as well as capacity and performance, potentially realized by use of distributed servers is not generally realized in the implementation of conventional search systems.

Another significant limitation of conventional search systems relates to the need to ensure the timeliness of the information maintained in the collection indexes. For large collections, the collection indexes need to be rebuilt to add or remove individual document-to-term relations. The process of building and rebuilding a collection index is quite time consuming. The rapid rate of document collection content changes however, requires that the indexes be updated frequently to include new index references to added or exchanged documents. Known index preparation functions and procedures are unfortunately one, if not many orders of magnitude slower than the typical rate of document collection content change. Ever larger and faster monolithic computer systems are therefore required to reduce the document collection indexing time. While computer performance continues to steadily increase, the rate of document additions and changes appears to be far greater. Furthermore, any increase in computer performance comes at a much-increased cost. Thus, practical considerations have generally become limiting factors on the performance, size and assured timeliness in searching collections for query identified documents. Consequently, there is a clear and present need for a collection search system that is scalable without loss of performance or repeatable accuracy and that can be actively maintained current substantially in real-time.

U.S. Pat. No. 5,924,090, expressly incorporated herein by reference, relates to a system for searching a database of records that organizes results of the search into a set of most relevant categories enabling a user to obtain with a few mouse clicks only those records that are most relevant. In response to a search instruction from the user, the search apparatus searches the database, which can include Internet records and premium content records, to generate a search result list corresponding to a selected set of the records. The search apparatus processes the search result list to dynamically create a set of search result categories. Each search result category is associated with a subset of the records within the search result list having one or more common characteristics. The categories can be displayed as a plurality of folders on the user's display. For the foregoing categorization method and apparatus to work, each record within the database is classified according to various meta-data attributes (e.g., subject, type, source, and language characteristics). Because such a task is too much to do manually, substantially all of the records are automatically classified by a classification system into the proper categories. The classification system automatically determines the various meta-data attributes when such attributes are not editorially available from source. If the number of retrieved records is less than a particular value (e.g., 20), a grouping processor is bypassed. Otherwise, the grouping processor processes a portion of the search result list to dynamically create a set of search result categories, wherein each search result category is associated with a subset of the records in the search result list.

For example, the portion of the search result list processed can be the first two-hundred (or one-hundred) most relevant records within the selected set of records. The grouping processor performs a plurality of processing steps to dynamically create the set of search result categories. A record processor identifies various characteristics (e.g., subject, type, source and language) associated with each record in the search result list. The candidate generator identifies common characteristics associated with the records in the search result list and compiles a list of candidate categories. The candidate generator utilizes various rules, which are described below, to compile the list. The weighting processor weights each candidate category as a function of the identified common characteristics of the records within the candidate category. Also, the weighting processor utilizes various weighting rules, which are described below, to weight the candidate categories. The display processor selects a plurality of search result categories (e.g., 5 to 10) corresponding to the candidate categories having the highest weight and provides a graphical representation of the search result categories for display on the user's monitor. The search result categories can be displayed as a plurality of icons on the monitor (e.g. folders). When a particular search result category is selected by the user, the display processor also can provide a graphical representation of the number of records in the search result category, additional search result categories and a list of the most relevant records for display. The user can select a search result category and view additional search result categories (if the number of records is greater than a particular value) along with the list of records included in that category. To narrow the search, the user can provide an additional search terms (i.e., a refine instruction). Upon receiving the additional terms, the search processor searches the database and generates another search result list corresponding to a refined set of the records. Alternatively, the user can (effectively) refine the search simply by successively opening up additional search result categories. See, www.northernlight.com.

SUMMARY OF THE INVENTION

The present invention therefore seeks to provide improved human computer user interfaces, as well as supporting infrastructures. The present invention particularly improves existing massive unstructured database search and retrieval technologies, by providing specific improvements in various aspects and at various levels of analysis. These include, for example, the structuring of hierarchal organizational sets of information, providing an interactive search definition and ranking process, improved formatting of presented information, as well as use of applets to define and extend functionality of computer systems.

The present invention is preferably implemented using a web browser, such as Netscape Navigator or Microsoft Internet Explorer, using hypertext markup language (HTML) and/or extensible markup language (XML), and optionally helper applications, JAVA applets, Visual Basic applets or programs (e.g., OCX), or other known program constructs.

The browser typically resides on a client system, having a user interface, processor, storage, and a connection to a communications network. The database server is typically remote from the user, and services a large number of users. See, "The Java™ Language Environment: A White Paper", James Gosling & Henry McGilton, www.quant.ecol.klte.hu/java/java_whitepaper_1.html (et seq.). The client system is typically capable of storing and processing information locally, while the communications network connection may prove rate limiting. Therefore, it is preferred to employ the storage and processing capacity of the client system to reduce the information that must be transmitted. Further, the browser typically provides a document page model for information display, which may be quite limiting. The present invention therefore preferably provides an application or applet for providing advanced display and interaction facilities for interfacing the user with the information from the server.

An applet is a program designed to be executed from within another application, for example a JAVA applet executing within the JAVA Virtual Machine (JVM). Unlike an application, applets typically cannot be executed directly from the operating system; in other words, the applet typically relies on resources that are not native to the operating system, but rather are supplied by the host application. When OLE (object linking and embedding) techniques are employed, an appropriately designed applet can be invoked from many different applications. According to a preferred embodiment of the invention, enhanced functionality is provided by a downloadable applet that does not require a user-install process or lengthy download times.

Zoomable Nested Nodal Hierarchies

The system according to the present invention preferably provides an improved user interface which may include the visual presentation of information in a form that is (a) hierarchal, that is, organized in levels of generality according to a scheme, (b) nested, that is set together in groups depending upon associated characteristics, (c) zoomable, in the sense that a user, in varying by at least one degree the level of generality, also varies the view (not necessarily continuously zoomable, like a lens, but sometimes stepwise zoomable), and/or (d) nodal, in the sense that points are presented to user as hyperlinks to a particular level of generality. Such representations including all these characteristics are called zoomable nested nodal networks. A nodal network consists of a set of "nodes", or discrete and defined objects, connected by links, each link typically having two ends and defining relationship between the linked objects. The term zoomable infers that the nodal network may be examined and convey useful information on a plurality of different scales, and thus may be represented to the user at such different scales. These elements define a hyperlink tree, i.e., a nodal network wherein each node represents and identifies an object, the object being generally accessible by selecting a respective node, and wherein the zoom provides a selective disclosure of underlying nodes based on a degree of scrutiny or "zoom". Such zoomable nested nodal networks resemble a traditional botanical taxonomic tree, and thus these networks may be called "trees". According to the present invention, however, the rules and tenets of taxonomy are not absolute, allowing a greater degree of flexibility for display, representation and manipulation of the objects and information represented. Of course, a formal taxonomy may be adopted.

One hyperlink tree, a Hyperbolic Tree™ (Inxight Software Inc., Palo Alto Calif.), developed at Xerox PARC, is disclosed in John Lamping, Ramana Rao, and Peter Pirolli, "A Focus+Context Technique Based on Hyperbolic Geometry for Visualizing Large Hierarchies", CHI 95, www.acm.org/sigchi/chi95/proceedings/papers/jl_bdy.htm. See also, www.inxight.com, www.inxight.com/News/Research-_Papers_Files/Z-GUI_Article.pdf?.

An alternate hierarchal representation of information is provided by TheBrain.com, Santa Monica, Calif. 90404, www.thebrain.com, which has developed a dynamic information presentation applet showing hierarchal links between data elements, which may include hyperlinks to associated resources. More recently, TheBrain.com has developed an open directory search service for presenting search results within their applet framework. This is not believed to be prior art to the present invention.

In additional to multiresolution representation and analysis (e.g., zoomable viewing), there are other options that may be predefined or defined by the user with respect to information or organizational display. For example, the tree structures may be represented as horizontally or vertically oriented taxonomic trees, a radially oriented tree, an outline with indentations, a conceptual map, a 3D conceptual map, with a virtual third dimension, such as "height", added to the image, an n-space map, with multiple degrees of freedom represented in various visual or other sensory means, or the like.

According to the present invention, a set of information may be transmitted from the server to the client, for presentation to the user. The information may be classified according to the ultimate taxonomy, regardless of the level of analysis employed by the user, or may be classified only to a lesser level of granularity, for example a level specified by the user or adaptively determined based on the user query, user profile, and the information content retrieved.

U.S. Pat. No. 6,014,671 (Castelli, et al.), expressly incorporated herein by reference, relates to an interactive retrieval and caching of multi-dimensional data using view elements. According to this patent, view elements include node elements and transition elements between nodes.

Interactive Query Definition

The present invention also, according to one embodiment, preferably provides that the user, rather than being involved in a single input or query followed by the guessing game described above for determining user's true interest, is instead engaged in a "dialogue" with the computer system. This dialogue helps to dramatically narrow the focus of investigation and analysis, by defining a subset of the domain of web documents, before the search begins. Such selection, it is anticipated, will frequently bypass the vast majority of all existing web resources (before applying the particular restrictive semantic query). As a result of this winnowing, a greater proportion of relevant results can be returned to the user; indeed, such omitted documents will typically number in the hundreds of millions. Second, a smaller number of hits, and probably subjectively a less discouraging number, will be returned. Third, the perceived quality and relevance of those results will be vastly improved.

It is noted that, by analysis of the index alone, and without reference to the entire document content, the context and nature of a document may be analyzed. Thus, by conducting multiple queries of the index for qualitative features of the documents, documents of presumed low quality may be excluded or receive low ranking. This qualitative analysis may involve analysis for inclusion of terms semantically related to the context of the search, analysis for exclusion of terms indicative of unrelatedness to the context of the search, and/or inclusion of content correlated to low quality, e.g., salacious terms, pornographic references, advertising content, etc.

User Modeling

User modeling means to create a model of the user that contains information about the user that is relevant for a particular system. Thus, the user modeling system seeks to define sufficient characteristics of the user to determine the prospective actions or preferences of the user, and employ these characteristics to make predictions. Often, the user modeling system is used interactively with the user, facilitating the use of the system by intelligently predicting the user's inputs. On the other hand, a sufficiently accurate and constrained user model may also be used as part of an autonomous intelligent agent, i.e. a system that acts on behalf of the user to interact with other systems or persons.

The scope of the user model may include, for example, characteristics of the user which are independent of content, such as language, reading level, fields of expertise, physical impairments, and the like, as well as content specific characteristics, such as the user's taste and interests for motion picture entertainment, for example as part of a film recommending system, or the user's knowledge of a given academic subject, for an educational or testing system.

User preferences may be time dependent, and therefore diurnal or seasonal variations may be important factors in defining an accurate model of the user, i.e., the predicting the intent and/or desires of the user in a respective context. Linear predictions, based on correlations, may be useful for extracting these patterns from observed sequences. More complex models, such as Markov models, may also be employed as appropriate. Often, the decision space is segmented into multiple operating regions, each defined so that the associated model is linear, e.g., MARS. Alternately, a nonlinear model, such as a neural network, may be implemented. Further, a combination of arbitrary type models and segmented decision space may be employed. A particular advantage of a segmented space is that the model for each respective segment is comparatively simpler, and may often be updated separately from other segments. The segmented architecture is especially advantageous where such models are implemented in applets, wherein the respective applet is simplified, and its execution speeded, by providing a narrower scope. Another advantage of a segmented user model architecture is that, when employed in conjunction with a collaborative filtering scheme, may facilitate accounting for a greater range of user characteristics, while providing specific preferences.

It is also noted that at a plurality of user models may be employed, for example a content-independent and a content dependent type, with the outputs combined. These models may be segmented along common boundaries, or segmented independently.

Different systems use different techniques for constructing and implementing a user model. The simplest and most straightforward is a technique of a user survey, requiring some dedicated activity of the user toward defining the user model. A second technique monitors the activities of the user to detect patterns and actions indicative of user characteristics.

Intelligent agents can be constructed by monitoring or observing the user's actions with the system, and thereby determining characteristics, habits, tendencies or features of the user. Frequently visited pages, a request for an explanation of a technical term, often or seldom used links and functions are examples of things that can be examined. This is closely associated with machine learning, which means that the system learns the common actions and preferences of the user. Intelligent agents are often used for machine learning and this is a topic of artificial intelligence. This often requires the user to give the system some initial values about his or her knowledge, goals, experience etc. The initial values, or default values if not explicitly given by the user, are used for building a user model that will be altered when the agent discovers new things about the user.

Another way of creating a user model is through the use of collaborative filtering. In this case, the user provides some initial information as well. For a collaborative filter, the user typically identifies himself or herself with a class of users, wither by predefined or adaptive categories. Thus, the emphasis of information gathering is not on the user's own knowledge or goals, but rather personal data such as age, profession or interests. The system then compares this user to other users and looks for users with similar answers to these questions. A user model is then created based on the profiles of similar users. Thus, collaborative filtering techniques typically require that a broad range of user characteristics be acquired and stored without aggregation, for later analysis and correlation to a given pattern.

According to one embodiment, during user interaction with the system, either including an explicit programming step such as a user survey, or through observation of the user's, a user's characteristics are determined. Typically, it is too much of a burden on the user to explicitly obtain a complete profile. Therefore, any such profile is acquired in a goal-dependent or context sensitive manner. For example, a set of profiles are related by a decision tree. The user then explicitly or implicitly defines the necessary characteristics to traverse the decision tree to define an unambiguous profile, or to arrive at a set of compromises to define a hybrid profile. Since these profiles are goal-directed, the process of defining the profile is inherent in achieving the goal.

The particular profiles are, for example, defined by a logical analysis of the decision space, or defined by an analysis of a population of users, with each profile representing a cluster within the scope of the decision space. In the former case, it is often difficult to make presumptions about the user outside of the particular decision process; in the later case, by identifying a set of individuals within the population with broadly correlated characteristics with the user, it may be possible to infer user characteristics unrelated to the decision process.

Typically, after an explicit process of defining user characteristics, the system evolves into an adaptive mode of operation wherein the profiles are modified or updated to more accurately correspond to the specific user. Further, as the characteristics of the user become more fully available, collaborative filtering may be employed to make better presumptions regarding unknown characteristics of the user. It is also noted that the system preferably does not presume that the user has a consistent set of characteristics, and thus allows for changes over time and cyclic variations. Preferably, these changes or cyclic variations are analyzed and employed to extrapolate a future state.

A users' knowledge of the subject represented in the hypermedia is a particularly important user feature for adaptive hypermedia systems. Many adaptive presentation techniques rely on a model of the users' knowledge of the subject area as basis for adaptation. This means that an adaptive hypermedia system that relies on an estimate of the users' knowledge should update the user model when the user has presumably learned new things. Further, a preferred user model according to the present invention preferably also models decay of memory.

There are two common ways of representing users' knowledge in an adaptive hypermedia system. The most often used model is the overlay model that divides the hypermedia universe into different subject domains. For each subject domain in the hypermedia universe, the user's knowledge is specified in some way. The user's knowledge of a particular subject domain can be given the value known or unknown, or for instance a fuzzy semantic variable such as good, average or poor. On the other hand, a numeric or continuous metric may be provided. The user's knowledge may also be represented as a value of the probability that the user knows the subject. An overlay model of the user's knowledge can then be represented as a set of concept-value pairs, one pair for each subject. Overlay models were originally developed in the area of intelligent tutoring systems and student modeling, Greer, J. E., & McCalla, G. I. (Eds.): "Student Modeling: The Key to Individualized Knowledge-Based Instruction" NATO ASI Series F Vol. 125 (1993) Berlin: Springer-Verlag, but are also very useful for adaptive hypermedia systems. The main advantage of the overlay model is that users' knowledge on different topics can be measured independently. See, also Gaines, Brian R., and Shaw, Mildred L. G., "Concept Maps as Hypermedia Components", (Internet); Akoulchina, Irina, and Ganascia, Jean-Gabriel, "SATELIT-Agent: An Adaptive Interface Based on Learning Agents Interface Technology", In Anthony Jameson, Cecile Paris and Carlo Tasso (Eds), User Modeling: Proc. Of the Sixth Intl. Conf. UM97, Vienna, N.Y.: Springer Wein, New York (1997); Benaki, Eftihia, Karkaletis, Vangelis A., Spyropoulos, Constantine D, "Integrating User Modeling Into Information Extraction: The UMIE Prototype", In Anthony Jameson, Cecile Paris and Carlo Tasso (Eds), User Modeling: Proc. Of the Sixth Intl. Conf. UM97, Vienna, N.Y.: Springer Wein, New York (1997); Maglio, Paul P., and Barret, Rob, "How To Build Modeling Agents to Support Web Searchers" In Anthony Jameson, Cecile Paris and Carlo Tasso (Eds), User Modeling: Proc. Of the Sixth Intl. Conf. UM97, Vienna, N.Y.: Springer Wein, New York (1997).

The other approach, apart from the overlay model, is the stereotype user model, in which every user is classified as one of a number of stereotypes concerning a particular subject or area. There can be several subareas or subjects, so one user can be classified as a different stereotype for different subjects. For instance, a novice stereotype, an intermediate stereotype and an expert stereotype can be defined for one subject in a system, and every user is therefore classified as one of an expert, novice or intermediate on that particular subject. This scheme is much simpler to implement, but caries the disadvantage of not being able to tailor the appearance of the system to every individual user. Hohl, H., Bocker, H., Gunzenhauser R.: "Hypadapter: An adaptive hypertext system for exploratory learning and programming", User Modeling and user adapted Interaction 6, 2–3, (1996) 131–156, have shown that overlay modeling and stereotype modeling can be combined in a successful way. The stereotype model is used for new users to quickly create a reasonably good user model. Then the overlay model is used with initial values set by the stereotype model.

Users' goals often change from system usage session to session or even within a single session. The user's goal is often highly dependent on the kind of system employed. In educational hypermedia systems, the goal is often to learn a particular subject, or to solve a problem. In information retrieval systems, the goal can be to find a particular piece of information. In an institutional hypermedia system, the goal can be simply to do everyday work, which may be less easily described in generic terms. In systems where the set of goals is relatively small are unrelated to each other, Höök, K., Karlgren, J., Waern, A., Dahlbäck, N., Jansson, C. G., Karlgren, K. and Lemaire, B.: "A glassbox approach to adaptive hypermedia"; User Modeling and User-Adapted Interaction, 6, 2–3, (1996) 157–184, the system simply includes this goal in the user model. More complex and advanced systems, where goals cannot be separated distinctly, require more advanced inclusion and distinction of goals in the user model. One way of dealing with this is to create goal-value pairs for every possible goal in the user model, where the value is the probability that the user has this particular goal.

In some adaptive hypermedia systems, the user's background is considered relevant. The user's background means all information related to the user's previous experience, generally excluding the subject of the hypermedia system, although this exclusion is not necessary in all cases. This background includes the user's profession, experience of work in related areas and also the user's point of view and perspective.

The user's experience in the given hypermedia system means how familiar the user is with the appearance and structure of the hyperspace, and how easy the user can navigate in it. The user may have used the system before, but does not have deep knowledge of the subject. On the other hand, the user can know a lot about the subject, but have little experience of the hypermedia system. Therefore it is wise to distinguish between the user's knowledge and the user's experience, since optimal adaptations for each factor may differ.

The user's preferences are used in adaptive information retrieval systems mostly where they are the only stored data in the user model. Users' preferences are considered special among user modeling components, since they cannot be deducted by the system itself. The user has to inform the system directly, or by giving simple feedback to the system's actions. This suggests that users' preferences are more useful in adaptable systems than in adaptive systems. However, users' preferences can be used by adaptive hypermedia systems as well, as shown by Höök, K., Karlgren, J., Waem, A., Dahlbäck, N., Jansson, C. G., Karlgren, K. and Lemaire, B.: "A glassbox approach to adaptive hypermedia"; User Modeling and User-Adapted Interaction, 6, 2–3, (1996) 157–184. Hook et al. have found that adaptive hypermedia systems can generalize the user's preferences and apply them on new contexts. Preferences are often stored as numeric values in the user profile, contrary to the case for other data, which is often represented symbolically. This makes it possible to combine several users' preferences, in order to formulate group user models. Group models are useful when creating a starting model for a new user, where this user can define his or her preferences, and then a user model is created based on the user models of other users who are in the same "preference group".

Adaptive navigation support is used for helping the user to find the right paths through the hyperspace, by adapting the link presentation to the user's goals, knowledge, etc. Brusilovsky, P.: "Methods and techniques of adaptive hypermedia"; User Modeling and User-Adapted Interaction, 6, 2–3 (1996) 87–129, has found five different ways of adapting links to a user: direct guidance, sorting, hiding, annotation and map adaptation. Direct guidance means that the system suggests which links are best for the user to follow according to the user's goal, etc., in the user model. Sorting is an extension of direct guidance; all links are given a value according to how relevant they are for the user's goals etc. Hiding simply means that links that are considered not interesting for the user at the moment are hidden. In adaptive annotation systems, links are given a sort of comment about the current state of the node behind the link, for instance "not ready to be read yet". Map adaptation takes into account the human-computer interaction part. This is the only technique capable of fully adapting the layout of a page.

Machine learning and use of intelligent agents is a more useful technique than collaborative filtering, with respect to adapting the user interface to different users' needs. The reason for this is that the same user can have different needs at different times and therefore the system must respond to the user, and examine the user's actions, in order to understand what the user needs. In other systems that use user modeling, for instance in film recommending systems, the system already knows what the user wants and the interaction with the user is not as important.

U.S. Pat. No. 5,966,533 (Moody), expressly incorporated herein by reference, relates to a method and system for dynamically synthesizing a computer program based on user context data. Thus, according to the present invention, objects which incompletely define the desired functionality, are more completely defined based on personalization data. In accordance with the present invention, this personalization may be performed at the server, before execution in the client, or based on separate data files which define functionality within a generic computing environment, or using a hybrid technique.

U.S. Pat. No. 6,012,051 (Sammon, et al.), expressly incorporated herein by reference, relates to a system for processing user profiles to determine product choices likely to be of interest.

U.S. Pat. No. 6,006,218 (Breese, et al.), expressly incorporated herein by reference, relates to a method and apparatus for retrieving, sorting and/or processing information based on an estimate of the user's knowledge or familiarity with an object.

U.S. Pat. No. 6,012,052 (Altschuler, et al.), expressly incorporated herein by reference, relates to a method and apparatus for building resource transition probability models for use in various manners.

U.S. Pat. No. 6,014,638 (Burge, et al.), expressly incorporated herein by reference, relates to a system for customizing computer displays in accordance with user preferences. In accordance with the present invention, the user displays may thus be customized in accordance with a past history of use, including navigational choices, and personal characteristics and preferences.

U.S. Pat. No. 5,978,766 (Luciw), expressly incorporated herein by reference, relates to a system and method for suggesting nodes within a choice space to a user based on explicitly defined and/or observed preferences of the user.

U.S. Pat. No. 5,977,964 (Williams, et al.), expressly incorporated herein by reference, relates to a method and apparatus for automatically configuring a system based on a user's monitored system interaction.

U.S. Pat. No. 5,974,412 (Hazelhurst, et al.), expressly incorporated herein by reference, relates to an intelligent query system for automatically indexing information in a database and automatically categorizing users.

U.S. Pat. No. 5,970,486, (Yoshida, et al.), expressly incorporated herein by reference, relates to a method and apparatus for creating situation-dependent keywords, based on user characteristics and preferences, which are then used to define a query.

U.S. Pat. No. 5,963,645 (Kigawa, et al.), expressly incorporated herein by reference, relates to a system for receiving and employing personalized broadcast program metadata.

U.S. Pat. No. 5,801,747 (Bedard), expressly incorporated herein by reference, relates to a method and apparatus for monitoring a user's content consumption, to infer user preferences therefrom.

U.S. Pat. No. 5,758,259 (Lawler), expressly incorporated herein by reference, also relates to a user preference profile determination system which monitors user activity.

U.S. Pat. No. 5,945,988 (Williams, et al.), expressly incorporated herein by reference, further relates to a similar system for dynamically updating inferred user preferences based on user activity.

U.S. Pat. No. 6,005,597 (Barrett, et al.), expressly incorporated herein by reference, relates to a system and method for monitoring user content consumption and creating a dynamic profile based thereon, which is then used to sort future available content.

U.S. Pat. No. 5,973,683 (Cragun, et al.), expressly incorporated herein by reference, relates to a system for the dynamic regulation of television viewing content based on viewer profile and viewer history.

U.S. Pat. No. 5,946,490 (Lieberherr, et al.), expressly incorporated herein by reference, relates to an automata-theroretic approach compiler for adaptive software. Such a compiler could be used, for example, to produce customized applets for users representing a set of search results, or incorporating user profile data.

See, also:

Boyle C. and Encarnacion A. O.: "MetaDoc: an adaptive hypertext reading system"; User modeling and User-Adapted Interaction, 4 (1994) 1–21.

Brusilovsky, P., Eklund, J.: "A study of user model based link annotation in educational hypermedia"; Journal of Universal Computer Science, Vol. 4 No 4 (1998) 429–448.

Chin, D.: "User Modeling in UC: the Unix Consultant"; Proceedings of the CHI-86 Conference, Boston (1986)

Moore, J. D. & Swartout, W. R.: "Pointing: A way toward explanation dialogue"; Eight National Conference on Artificial Intelligence, (1989) 457–464.

[AVANTI homepage] zeus.gmd.de/projects/avanti.html

Fink, J., Kobsa, A., Schreck, J.: "Personalized hypermedia information provision through adaptive and adaptable system features: User modeling, privacy and security issues" zeus.gmd.de/UM97/Fink/Fink.html Eftihia Benaki, Vangelis A. Karkaletsis, Constantine D. Spyropoulos, "Adaptive Systems and User Modeling on the World Wide Web", Proceedings of the workshop, Sixth International Conference on User Modeling, Chia Laguna, Sardinia, 2–5 Jun. 1997

Brajnik, G., Guida, G., Tasso, C., (1990): User modeling in Expert Man-Machine Interfaces: A case study in Intelligent Information Retrieval, in IEEE Transactions on systems, man, and cybernetics, 20:166–185.

Brajnik Giorgio and Carlo Tasso, (1994): A shell for developing non-monotonic user modeling systems in International Journal of Human Computer Studies, 40:31–62.

Croft, B. and Thompson, R., (1986): An overview of the IR Document Retrieval System, in Proceedings of the 2nd Conference on Computer Interfaces and Interaction for Information Retrieval.

Karkaletsis, E., Benaki, E., Spyropoulos, C., Collier, R., (1996): D-1.3.1: Defining User Profiles and Domain Knowledge Format, ECRAN.

Kay, J., (1995): The um toolkit for Cooperative User Modeling, in User Modeling and User-Adapted Interaction, 4:146–196.

Jon Orwant, (1993): Doppelganger Goes to School: Machine Learning for User Modeling, M. Sc. thesis at MIT.

J. Orwant, "For want of a bit the user was lost: Cheap user modeling", MIT Media Lab, Vol. 35, No. 3&4 (1996).

Rich, E., (1983): Users are individuals: individualising user models in International Journal of Man-Machine Studies, 18:199–214

Collaborative Filters

Collaborative filtering is a process that seeks to determine common habits for a group of individuals having a common characteristic. The information is commercially valuable, for example, because knowing what a consumer has purchased, it is possible to statistically predict what else he or she might buy, and to suggest such a purchase to the consumer. This collaborative filtering is preferably used in conjunction with a past history of the user himself, providing a powerful tool for predicting consumer behavior and preferences.

Collaborative filters presume characteristics of the user based on a class identification of the user. A collaborative filter may be adaptive, meaning that it is updated based on actions subsequent to the classification of the user relating to the success or quality of the classification. According to an adaptive embodiment of a collaborative filter of the present invention, therefore, it is preferred that the client system, either concurrently with use of the system by the user, or subsequently, transmit to the server sufficient information to update the collaborative filter for more accurately classifying the user and/or for more accurately defining the characteristics of a respective classification.

Collaborative filtering is often used in systems that continuously present new things to their users such as film recommending systems and personally adapted news. If the user does not like one suggestion from the system, he or she tells the system that this material is not interesting and the user profile is updated. Typically, the weight afforded to adaptive features is low, and indeed the feedback from one user is just one input to the system, and thus will typically not cause a major change in the user profile, since most of it still is valid. Systems that adapt the user interface to different users' needs often need to give the user more control over the adaptation process. It is much more difficult to predict the user's preferences correctly in these systems since they may vary with time. For instance, the user's knowledge of a subject can be a component in the user model, and it is hard for the system to predict exactly when a user has learned something new. The system needs some help from the user, and what the user says is more important than the current user model. The user model has to be modified completely to what the user has said. Therefore, intelligent agents and machine learning are preferred in these systems.

Collaborative filters and user profiles necessarily require that personal user information be employed. This personal information may include private user information, such as demographics, preferences, past purchase history, media consumption habits, and the like, or confidential information including trade secrets, or information otherwise not intended for publication. The unrestricted release and distribution of this private user information, or the risk of dissemination, is typically undesirable, from the user's viewpoint. In the case of collaborative filtering systems, this information must be stored centrally, thereby creating a risk of breach. In the case of adaptive personal profile systems, client-side filtering may be employed; however, this necessarily entails transmission of a greater amount of information to the user than is presented to the user. Client-side filtering requires that all information be transferred to the client system, which is often expensive or untenable. In general, any time valuable personal profile information exists, even in when physically in a client system, a risk of misuse or misappropriation exists.

The release and distribution of private user information, such as demographics, preferences, past purchase history, media consumption habits, and the like, typically is avoided, and may be limited by law or agreement. Therefore, one option available for filtering or processing information based on this information is at the client system, where the private information need not be released or distributed. For example, see U.S. Pat. No. 5,920,477, expressly incorporated herein by reference, and Metabyte Inc., www.mbtv.com, which disclose systems for determining user preference profiles for television programs, implementing a client-side filter. However, this requires that all (unfiltered) information be transferred to the client system, for subsequent filtering, which is often expensive or untenable. Further, this requires computational resources at the client for filtering the content. However, in various circumstances, such techniques may be employed.

Protection of Personal Profile Information

The present invention proposes a number of means for minimizing this risk. For example, the present invention provides a set of Intelligent Agents, wherein the private information forming the basis for agent action is encrypted using a secure encryption method, either embedded or associated with the Intelligent Agent, or securely transmitted to it. The encryption technique may be of any suitable known type, for example public key/private key techniques, RSA algorithms, elliptic key techniques, etc. The Intelligent Agent preferably is provided as an applet, either integral with the user interface applet or associated with it. On the other hand, a Intelligent Agent applet may also physically reside at a server location, being shielded from interrogation or analysis by a combination of so-called firewall protection, encryption, and logical restrictions on the quantity and nature of information released. The Intelligent Agent further is preferably protected from being probed to methodically determine the included private information, such as by generating spurious responses or "pseudorandom noise" (an apparently random yet predictable pattern based on a complex algorithm), which may be filtered at the client system, and by storing and analyzing a history of usage to detect and thwart hacking. While there may be cryptographic methods for breaching these types of security measures, such methods are computationally intensive and therefore may be more difficult than other surreptitious methods of obtaining the private information.

According to another aspect of the invention, the Intelligent Agent applet is self-adaptive, meaning that it contains the necessary logic to directly receive information for updating its functionality. Therefore, the profile itself, embodied in the applet, is never itself transmitted in cognizable form. The use of the applet, for example, requires a private key from the user, which therefore prevents a third party in possession of the applet code itself from operating the applet or probing its contents.

The techniques pioneered for prevention of detection of polymorphic viruses, may also be used to prevent analysis and probing of personal profile intelligent agents. In combination with public key/private key technology, for example, which prevents execution of the agent outside a privileged environment, the core decryption process and encrypted data may be secured.

Thus, the present invention allows the adaptive user intelligence to remain in the possession and control of the user while residing remote from the user through a limited bandwidth connection or other barrier, such as an accounting system that requires a monetary transaction for data transmission. It is also noted that the Intelligent Agent could also be segmented into multiple portions, for example a global user identification data file at the client system, an operational agent engine at the server site, and a detailed private data file at a service-provider web site, each with separate security schemes.

In one embodiment, a physical level of security is provided by storing the private information encrypted in a volatile memory subsystem, in which any tampering or other unauthorized access results in loss or corruption of data. Such a system could be provided with no authorized access means, thus shielding the private information even from law enforcement activities, and thus preserving the privacy of the user, eliminating any possible expectation that the information might be released.

The present invention thus provides an intelligent agent system, wherein the user private information is encrypted using a secure encryption method, either embedded in a custom intelligent agent for each user, interactively and securely transmitted to it. The encryption scheme may be of any suitable known type. In this case, the server stores a set of user-specific intelligent agent applets or data files, which are called upon as required to provide or supplement information about the user. These intelligent agents or data files may be adaptively updated, based on recent feedback from the user or respective use, with the updated agent or data file encrypted and the raw data purged. Therefore, the intelligent agent applet may physically reside at a server location, while being shielded from interrogation or analysis by either a secure firewall, encryption, or both. The intelligent agent further is preferably protected from being probed to determine the private information, such as by generating spurious responses (or being formulated with a portion of spurious data) or producing "pseudorandom noise" (an apparently random yet predictable pattern based on a complex algorithm), which may be filtered at the client system based on a knowledge of the complex algorithm, and by storing and transmitting a history of usage to detect tampering. While there may be cryptographic methods for breaching this security, such methods are computationally intensive and therefore may be more difficult than other surreptitious methods of obtaining the private information.

The specific concerns for protecting the private information included in, or upon which the user profile is based, is multifold.

A first concern is that user financial data security may be breached. In this case, the information store itself must be secure, as well as any intended transmission of the data.

A second concern is the use of the user profile as evidence of activities of the user. While the present inventor does in no way condone illegal acts, and thus believes that criminals should not be able to shield their acts or communications, it is also apparent that acts which themselves are not illegal, or are not part of an illegal scheme, are often publicly disclosed by criminal investigators for the purpose of embarrassing the subject of inquiry. Even at a trial, Courts may admit as evidence information relating to a user's access to particular information, or a pattern of information access, even though such access is presumable Constitutionally privileged. Likewise, in corporate environments, mere access to Internet web sites that include constitutionally privileged information, may subject the user to sanctions. Thus, in order to prevent the data within an agent or data file from being used as evidence, there are a number of options. First, the user may elect to filter or purge certain types of characteristics from the file. Second, the file may include corrupted information, wherein a reliability of the information is set at a predetermined threshold, e.g., 95%, with both false positives and false negatives, such that the information is inherently unreliable. Advantageously, the false positives and false negatives are derived in such a manner that, for most purposes, these do not affect, or even improves the probabilistic functioning of he system, for example by using the principles of collaborative filtering. On the other hand, since there is no direct chain of evidence that connects the user to the particular information associated with tat user, the evidence would be considered tainted.

In a like manner, a system for generating such spurious data requests (in a false positive manner only) could be implemented as a client system applet. Thus, tracking of the user activity based on URIs, IP addresses, and downloads would be, for many purposes, frustrated.

A third concern is the acquisition of demographic information by commercial interests, about the user, generally for targeted advertising, direct mailings, and the like. On a most simplistic level, this information is considered valuable, and users typically believe that this information is their own valuable property. Thus, misappropriation of this property is wrongful. The present system can address this concern by securing the stored information, but also generating sufficient spurious activity with respect to web site visits, cookies, and the like, to substantially impair the value of the information for vendors. Should the user seek to liquidate the value of the demographic profile, the spurious activity may be identified and extracted. In this case, the use of pseudorandom sequences, as described above, are of particular value. Of course, the user, in this case, would be burdened with spurious information (and potentially absent information) corresponding to the corruptions of the data file. This can be addressed in two ways; first, the user may employ a proxy server, which implements a filter to correct the corruptions, based on a proprietary knowledge nature of the corruptions, requiring indirect communications. Second, a filter may be implemented at the client system. In some cases, the spurious information (or indeed all information) may be presented in the form of efficiently transmitted codes, which may be filtered at the client or at a proxy server that translates the codes. In either case, it would be difficult for an unauthorized entity to filter this information, which represents aspects of the user's demographic profile, without being a party to the transaction. The server, in this case, is considered a trusted party for both obscuring the actual data and for decoding the data, as and if necessary, for use.

Another reason for seeking privacy for profile information is because the content itself is of value. In this case, adding noise to the information will only dilute some of the value, without entirely protecting the user's interests. Often, this issue goes beyond the user profile itself—the mere act of gathering data may leave a trail, divulging valuable information. Obviously, the use of proxies, to assure confidentiality of identity, and encryption, to assure confidentiality of content, address parts of this problem. However, the usage log of a web site nevertheless may leave indications of the user's query, which may itself be valuable information. In this case, the use of local databases at a trusted server address portions of this problem. Aggregation of simple search requests, between a trusted server and external resources, with compilation into a complex query response at the trusted server may also preserve confidentiality.

One solution where the concerns are balanced is where all profiles are intentionally corrupted, allowing each user to deny responsibility for providing offensive information, yet allowing retrieval of information. It is noted that this aspect of the invention does not address logging of access to "forbidden" sites. In that case, one solution is to provide a proxy server with an encrypted communication stream; however, this might not pass through a firewall system. One way around this concern is through the use of applets that operate on binary data. Thus, the "forbidden" information may be compressed and encrypted, and denominated or watermarked on a normally acceptable file type, such as an innocuous GIF or JPG image, MP3, MPG, WAV or AVI file. The applet extracts the digital information from the file, and only on the local client system is this converted to free text form.

A further privacy concern involves personal tastes. Political correctness requires that all communications be made in a manner sensitive to diversity, morality and ethics. It also requires that individuals conform their activities and thoughts to generally accepted norms. To the extent that a personal profile might indicate any deviation from political correctness, such a personal profile might be deemed itself politically incorrect. Thus, an individual or institution might compel the personal profile to only contain information that is politically correct, and any agent acting based on the personal profile information, to only act in a politically correct manner. Of course, this solution is inapplicable if the profile is intended to model politically incorrect behaviors. Thus, the present invention may be employed to implement a policy, in a manner somewhat abstracted from pure censorship.

In the case of models of politically incorrect behaviors, perhaps the best strategy is to abstract the profile from a personal characterization of the user, and rather consider the profile as indicative of only the information desired by the user, for whatever purpose. In that case, a number of legitimate and socially acceptable reasons exist for defining a query which itself seeks politically unacceptable materials. For example, law enforcement officers themselves seek to police the Internet for information which is itself illegal, such as child pornography, and for information indicative of ongoing or potentially illegal activities, such as terrorism. In these cases, the profile itself does not, and should not be intended to, model the actual user. Rather, the profile seeks to define the scope of information sought by the user.

Thus, the present invention allows the user model or personal profile to remain in the possession and control of the user, while physically residing remote from the user. This may be achieved through the techniques comprising encryption (including public key/private key and digital signatures), physical security and firewalls, filtering, addition of noise or pseudorandom noise, intentional partial corruption of the data, use of proxies, and aggregation of multiple users for interaction with external resources. These techniques may be used even through a limited bandwidth connection or other barrier, such as an accounting system that requires a monetary transaction for data transmission. It is also noted that the user mode or personal profile could also be segmented into multiple portions, for example a global user identification data file at the client system, an operational agent engine at a server site, and a detailed private data file at a service-provider web site. Thus, the server site need not obtain either the identity of the user nor a complete profile. The user system and the service provider cooperate to constrain the data which must be analyzed by the user, while preventing the server from obtaining too much private information. The client system need only identify itself to the service provider to access the detailed private data, although preferably the client system performs some filtering of received data as well. Optionally, the amount of filtering may be user-determined, based on a degree of "paranoia".

Thus, it is apparent that the present invention, according to one embodiment, provides an improved environment for the acquisition and use of personal and private information based on an intentional reversible or irreversible partial corruption of the stored data, wherein, in the partially corrupted form, the data is nevertheless useful to obtain substantial functionality. Thus, the value of the partially corrupted information is impaired to third parties, generally to an extent greater than the impairment to the owner of the data.

According to another embodiment of the present invention, a personal data in or for use by an intelligent agent is encrypted in a manner that the data itself is unavailable for inspection, but the agent itself is still functional.

According to a still further embodiment, information comprising a personal profile is physically separated in at least two different locations, such that an inspection of data at an unprotected one of the locations does not reveal the entirety of the personal profile, but used in conjunction provide substantial implementation of processes conforming to the personal profile.

In the same way that a personal profile or user model may contain personal or private information, other customized objects according to the present invention may also contain non-public information. Such objects may be protected from unauthorized scrutiny in many of the same ways. In this regard, it is noted that certain objects according to the present invention are intended to contain and present specific information, e.g., regarding the history of use by the user, the queries and preferred logical structures, and the like. Further, according to an aspect of the invention, such objects may be transmitted and shared with third parties. In these cases, the user must often strike a balance for intended disclosure of the information and arrangements thereof.

Digital Rights Management

In fact, some objects according to the present invention include information belonging to third parties, or with intrinsic restrictions on redistribution. An example of the first type of information is demographically targeted advertisements, which may be defined specifically for the initial user, and which may include incentives or other information or rights not intended for the general public. An example of the second type of information is copyright protected data, for which a limited license is provided to the original user. In each of these cases, a rights management module may be provided to limit the retransmission or reuse of the portions of the object in accordance with the accepted or imposed restrictions. This rights management module may also respect indications of confidential information in the object, and either delete, modify or substitute information for those restricted portions before transmission.

In many cases, the restrictions will encompass an economic interest or otherwise require a relatively simple negotiation to remove the restriction; in those cases, the rights management module of the transmitter or receiver may negotiate for the rights, using, for example, a known micro payment scheme, e.g., Micro Payment Transfer Protocol, or other appropriate communication, to secure necessary rights for the data. In other cases, such as demographically targeted advertising, the acquisition of rights may entail substitution of advertising based on the recipient's profile, rather than the originator's profile. This later updating may be performed adaptively through use of the object, for example by the object, during use, communicating with an advertising server to provide the appropriate information. Thus, a rights management module may be a part of each client system, for assuring appropriate and consistent use of data and objects.

The rights management module may be, for example, embedded within the host operating system, within the host application, e.g., the JAVA Virtual Machine or Internet browser, within a remote server which interacts with the objects, or as a separate and possibly obligate applet residing on the client system. Alternately, rights management functions may be embedded within each application or applet interacting with objects subject to restrictions.

In fact, the rights management module may be a separate system, and multiple rights management systems may be present, depending on the particular restrictions. In this case, the applet which interacts with the object determines a rights status for information, as well as a rights management method identification, and communicates the necessary information to the appropriate rights management module. In one case, an honor system may be implemented, in which a user may have access to the information outside the scope of the applet, in potential disregard for imposed restrictions. In another case, the information is protected, and requires successful completion of a rights management clearance for release. In this case, the information is typically encrypted, with the necessary information for decryption provided only upon rights clearance. Alternately, a micropayment scheme may be implemented, potentially locally, with a secure accounting system. In the micropayment scheme, typically a direct communication between creditor and debtor is not required; rather, the transaction produces a result which eventually results in an economic transfer, but which may remain outstanding subsequent to transfer of the underlying goods or services. The theory underlying this micropayment scheme is that the monetary units are small enough such that risks of failure in transaction closure is relatively insignificant for both parties, but that a user gets few chances to default before credit is withdrawn. On the other hand, the transaction costs of a non-real time transactions of small monetary units are substantially less than those of secure, unlimited or potentially high value, real time verified transactions, allowing and facilitating such types of commerce.

Thus, the rights management system may employ applets local to the client system, which communicate with other applets and/or the server and/or a vendor/rights-holder to validate a transaction, at low transactional costs.

It is also noted that, while a user may have to account for rights of third parties in order to use content, advertiser or sponsor subsidies may inure to the user based on viewing or access of advertisements, click-throughs, or the like. Therefore, while funds transfers may be necessary vis-à-vis sponsors, service providers, and rights-holders, the process may be transparent and potentially no-cost to the user. In this case, the risks of tampering and fraud based on manipulation of client-system resident data and applets will generally be low, and therefore the level of security and protection of these client-resident data and applets may also be low. However, as deemed necessary, a high degree of security may be implemented, such as a hardware "dongle", secure encryption and watermarking techniques, or real-time transaction verification.

Selection of Domain

One aspect of the present invention provides an information query system which receives a user information input relating to a user characteristic, the user characteristic being correlated with a probable subset of said distributed database including records of interest to the user. An additional user input defining a query is then executed against the subset of the distributed database. Preferably, the user characteristic is a societal role, and wherein the probable subset is defined based on prior received feedback from other users with common societal roles. However, the user characteristic may be any sort of useful search limiter.

The societal roles advantageously define avocation, socio-economic status, and/or demographic profile. The probable subsets preferably comprise sets of separate databases storing records having a common theme or source, although a semantic analysis of records may be provided to define subset classification.

Thus, the initial definition of the domain of search is narrowed, based on an implicit assumption derived from a characteristic of the user. The operation of this assumption may be a simple set of rules, however, preferably it is derived based on a statistical analysis of the use of the system (or other systems) by persons with similar characteristics. The system may learn the relations between the user characteristic and desired search domain in known manner, for example, statistical processing of data, explicit models, neural networks, and the like.

In defining a database domain, it is also possible to mine specialized databases that are not regularly indexed by Internet search engines; for example, a search by a medical doctor may include the MEDLINE database. A search by an electrical engineer may include the IEEE databases or selected databases therein. The results of these specialty searches may be reported individually or merged with other records responsive to a query.

Where such specialized databases are employed, it is also possible to categorize users based on their interest in such sources. Thus, an electrical engineer regularly searching the IEEE databases may be identified, and a suggested search domain for this person may also include NTIS databases. Therefore, it is seen that, in some instances, the relation between the desired search domains and role are apparent. However, this is not always the case, and only a statistical or other powerful analysis of historical activities will yield a useful correlation between role and desired search domains.

It is noted that the present invention may also provide facilities for a customization profile to modify a generic role profile. Thus, the system may employ a generic role profile to define the importance of various domains, which are further analyzed in conjunction with an individual specific profile to make a final selection.

The selection of domains for search may also be dependent on the search query itself. Thus, a medical doctor searching for "automobile" would likely access different domains than the same individual searching for "embolism". This intelligent pre-analysis of the query also relates to the below described definition of the database operation, but the two aspects may be distinct and employed separately.

As a special aspect of the preliminary search process, the invention contemplates special templates or personal pages, defined by occupation or social role. Thus, for example, there might be predefined pages for doctors or lawyers. A doctor's page might include the Physician's Desk Reference, Merck manual, ready at hand, whereas the Lawyer's template might provide on the desktop access to federal statutes or case law. The user would generally be free to modify these resources based on preference. Over time, the system may monitor the modifications made by some members of the group and automate the procedure for other members of the group. Of course, some occupations may be so esoteric or rare that no template is provided, but even so, the user may fashion his or her own custom template. The templates can be used to define the domain of all data relevant to the search, if the user desires. The templates could be invoked by user, but also might be suggested or evoked by the parsing of a user query.

These personal pages (or objects) may be dynamically generated. In this case, news items, market quotes and the like may be presented. In addition, messages specifically directed to the user from the server may be presented directly, without requiring an e-mail communication. Such a feature may be facilitated for example, by the use of XML or XHTML and appropriate tagging of communicated information. For example, activities performed by the user may be periodically automatically updated. The results may therefore be presented either directly on a personal page, or referenced by a URI. The present invention may also be used with personal digital assistants (PDAs), settop boxes, i.e., consumer electronic devices which typically interface with a broadband information delivery service, such as cable TV or satellite feed, and which typically produce an output display on a television, as well as other embedded Internet clients or other small computers. In accordance with the present invention, private resource locators (PRLs) may be employed, which require a translation step to define a URI. PRLs, however, may be more compressed, and provide efficiency proxy communications and caching services. Further, these PRLs help preserve user privacy.

When using a non-Personal Computer (PC) browser environment, the user interface may be simplified, although the tree paradigm may be extremely useful for organization of information and the transmission of relevant information, and therefore means for retaining this functionality even in bandwidth or display constrained systems is preferred.

Provision is also preferably made for communication with portable devices, including pagers, telephones, palm computers, and vehicular computers. Especially insofar as the personal home page (or object) is portable between systems, the user could have a standardized experience away from his or her own desktop comparable to being at it. To facilitate communication with small devices with limited screen resolution or size, or over limited bandwidths, a special simplified or reduced functionality mode of operation of the present invention may preferably exist, which would retain core functionality without necessarily being full-featured. One reduced format might provide the translation of tree formats into an outline format, as discussed above. Such a format may also be appropriate for communication with television set-top boxes and other Internet appliances and Net computers.

Non-PC Systems

Wireless communications techniques are often associated with reduced communication bandwidth or high data communications costs as compared to wired networks. Therefore, in an environment where data communications are preferably minimized, a system architecture is provided which communicates using compressed data and minimized non-essential communications. Further, even where communications are functional, in many instances it is preferred to reduce bandwidth by simplifying the constructs transmitted. Therefore, one aspect of the present invention provides optional feature sets and alternatives, allowing a user to select greater functionality and/or aesthetic richness on one hand, or minimum required bandwidth on the other. Other issues which may be addressed include the nature and quality of a display or other output device (such as voice), and the nature and quality of availability of input device (e.g., mouse, keyboard, touchscreen, microphone, etc.). Further, the present invention may be employed with the wireless application protocol (WAP), to transmit pages to compatible devices. Thus, the various graphic and intelligent locally executed applets which are preferred on a personal computer platform may be replaced with fully alphanumeric or remotely-executed constructs on a wireless personal digital assistant platform. See, "W@P White Paper", Wireless Internet Today, October 1999, WAP Forum; "An Introduction to WAP", www.links2mobile.com/wp/wp4.htm.

It is noted that, while communications bandwidth to wireless computing devices may be limited, the computational power available on such devices is not necessarily limited. For example, the Intel ARM processors and Transmeta Crusoe provide relatively high performance which will increase over time. Therefore, techniques may be used to define the user interface using local intelligence, e.g., a set of applications programming interfaces (APIs) or a set of applets, resident at (or transmitted to) the client device. Therefore, by proving enhanced resources at the client system, complex interface functionality may be provided without requiring explicit communication of a full definition for each user interaction.

While these applets may be written in a cross platform standard environment, these applets may be specifically customized to the user and the platform, and need not be "cross platform" in the sense that the same applet will properly interact with a system other than its intended target. For example, if a target system is a wireless personal digital organizer with a monochrome 320 by 240 resolution screen, the applets need not support higher resolutions nor color display. More importantly, tradeoffs may be made in the applet based on the available resolution, for example limiting the pixel size of an image to be displayed, for example by defining tree views with two or three levels maximum, instead of a potentially larger number. Where the image size exceeds the available display, the image may be scrolled, although this exacts a penalty, especially where scrolling is not supported in hardware. Further, through the techniques of aliasing and vector quantized compression (code library), network traffic may be limited, while providing informative presentation of information to the user. While the applet and information presentation may be customized for the particular platform, preferably the underlying object (especially as defined on the server) is invariant, allowing the user to interact with the same object on different platforms. Thus, another example of the use of object-oriented technology is apparent. However, preferably the native object is "filtered" at the server, thereby limiting the information that must be transmitted to the client system.

The present system may likewise be used with personal digital assistants (PDAs) such as Palm OS computers or Windows CE computers, locally, wirelessly, or through other telecommunications systems. While such PDAs may provide support for JAVA applets, or the K virtual Machine (KVM), as is preferred on personal computer platforms, appropriate applets may be written in native code for the PDA platform, or the PDA used as an X-terminal type display with intelligent control at the server. Preferably, objects defined on one platform (such as hierarchal trees) are portable to other platforms, although a translation process may be provided where the object is not inherently portable.

It is noted that the present invention is not platform-specific, and therefore many different hardware and software configurations may be supported. Preferably, a set of applets is provided which are portable, such as JAVA applets, which may be used on Microsoft Windows environments, Linux, other Unix and Unix-type environments, Macintosh OS, BeOS, and the like. Alternately, applets may be platform specific, such as Visual Basic programs for Microsoft Windows environments. In fact, both types may be supported.

Hierarchal/Taxonomic Organizational Schema

According to the present invention, an information retrieval hypermedia system is provided which includes an adaptive user interface, in which presented search results contain hierarchal associations of sets of documents, wherein respective hierarchal associations are based on user-specific data distinct from the formal query itself. Thus, for example, according to a user hierarchal schema, documents providing similar or related information are classified together, wherein this similarity or relatedness is not defined intrinsically in the query. Further, the hierarchal schemas may be persistent, and applied to results of multiple distinct queries. Alternately, a user hierarchal schema may be specifically defined for a particular query or topic of inquiry. By providing an organization of query responses, users may define a broad query scope that encompasses a desired topic, but may also encompass other topics, either intentionally or because the user is unable to a priori precisely define the query scope. Often, a query produces a large number of hits, and the user has difficulties finding relevant information in an unorganized set of query results. By presenting a linkage between similar documents, the user may not have to go through all responses to the query (search hits), but can skip many documents after having characterized the group or the contents of the group, e.g., read one of the documents.

An aspect of the invention therefore provides means for the user to refine the search criteria in order to improve the precision of search results returned. Preferably, this is an interactive process in which packets of information are communicated between the client and server, although it is possible to conduct this process solely on the client system. Where an interactive scheme is employed, it is possible to transmit, for example, marketing information to the user (e.g., banner ads) with each downloaded packet, or otherwise communicate information in spare or otherwise available bandwidth during this process. These added opportunities may be used, for example, to subsidize the use of the system that allows the user to define or refine the query.

This intelligent assistance preferably involves an interactive communication between the user and search engine, wherein a context, e.g., semantic taxonomic placement, of the search query is successively defined and refined. Preferably, after the context of the query is defined, the user is presented with a hierarchal tree of contents, i.e., a branched hierarchical graphic representation of the information and linkages, for confirmation. In the event that the relayed context is accurate, a simple confirmation is accepted. On the other hand, where the context is not accurate or of inappropriate scope, the user may change or refine the context. In this way, the number of complete database searches is reduced, and the results tailored to the user's expressed requirements.

By providing a hierarchical tree of contexts, the user is prompted to select or accept the narrowest definition scope of the query. In most instances, this will result in a narrower search than a simple one or two word query, but it may also provide an intelligent means for broadening the scope while avoiding an undue number of returned irrelevant hits.

The hierarchical tree of contexts may be presented to the user in a bounded rectangular box, for example showing three levels of hierarchy, with a single node at the highest level, a set of intermediate level nodes defining a range within the generic (highest level) taxonomy, but not necessarily being exhaustive for that level. A selected set of lower level nodes are also presented, which also need not be exhaustive, and in fact, it is preferred that this level be truncated if necessary in order to reduce visual clutter. The nodes are preferably connected with line segments. In the event that an ambiguity is presented, or otherwise the user is to be presented with multiple discontinuous representations of the taxonomy, each may be presented in a separate bounded rectangle. It is understood, of course, that the tree structure need not be presented in a rectangle, and indeed alternatives to a visual tree are also possible.

Preferably, each node within the structure is active, so that a graphic manipulation of the node in a web browser may be detected. This node need not represent a hyperlinked URI, however, and means are preferably provided for selection of one or more nodes by the user without intermediate screen information refresh. In fact, in some embodiments, only terminal child nodes of a hierarchal object are hyperlinked, for example to URIs or a search results page object, with all higher order nodes being locally interpreted at the client system.

In one embodiment, the nodal representation is presented as a graphic map, wherein a Cartesian coordinate of a pointing device is transmitted to the server to indicate a manipulation thereof. The server correlates the coordinates of manipulation with the graphic element at that point. Alternately, an applet may be provided to generate the nodal graphic. In this case, the helper application may intercept and process manipulation of the graphic, without requiring intervention of the server. Further, the applet may locally store a larger portion of the taxonomic structure than is displayed, which will allow faster refresh and improved real time interactivity, at the potential expense of a longer initial activation latency. Preferably, an applet locally stores a set of higher levels of the taxonomic hierarchy, as well as a cache of recently used lower levels. As the taxonomy requires updating, the applet may communicate with the server. In addition, the applet may provide further graphic information to the user, for example relevant ads or navigational hints, without interrupting the user's interaction with the nodal representation.

Typically, the taxonomic contexts will be semantic, e.g., a verbal expression of an idea. The hierarchical taxonomy will therefore represent, at least in part, a linguistic analysis of the proposed query. Typically, the taxonomy will include a single linguistic concept, which will be distinguished from other concepts, even those with an identical literal expression. In some cases, a multi-term query will represent an attempt to define a single linguistic concept. In that case, a single taxonomic classification will be defined, and the search formulated to retrieve records corresponding to that concept. Often, it is not or will not be possible to determine a context of a record a priori, i.e., during the indexing process. In that case, the record may be analyzed as a part of the search process to determine if it meets the search criteria or otherwise the ranking it should receive for relevance. On the other hand, it may be impossible to determine automatically (or manually) the context of a record. In that case, a set of rules may be applied to deal with this case. For example, the user may determine that these records should be retrieved, should be ignored, should be given a high or low ranking, or otherwise. The rules may also take into consideration the quantity and nature of other records retrieved (or excluded). Typically, it is desired to maintain a stateless condition, therefore, once the search query is executed, the results should be downloaded to the client, or explicitly defined in a URI. The database server, therefore, typically does not retain the query response for an extended period. See, e.g., U.S. Pat. No. 6,012,053 (Pant, et al.), expressly incorporated herein by reference. However, the server may retain search results for a period of time, for example 5 days, to allow the user access to prior search results from the server (e.g., allowing the user to employ multiple client computers or diskless computers), and to provide data for the server to establish user profiles.

In another aspect of the invention, the search query need not be limited to linguistic concepts. Therefore, the search may involve images, video, audio, or other types of data. In this case, the taxonomy may be based, for example, on characteristic patterns or attributes of the data sought. It is noted that there are a number of systems available that support non-verbal data access and retrieval. These include the QBIC system from IBM, products from Virage, Informix, Excalibur, Magnifi, Muscle Fish LLC, and a number of other entities. In fact, the interactive search definition according to the present invention is advantageous where a simple verbal search query is untenable, such as in searching non-linguistic data.

In some instances, the context of the query will not be fully or appropriately defined by a predetermined linguistic taxonomy. Therefore, the system may define a temporary or artificial taxonomy. This taxonomy may be based, for example, on an analysis of the records (or a select subset) themselves, or by the user during the interactive process. It is also possible for a user to store a preference profile, which may include, for example, taxonomic or heuristic concepts. The database server, therefore, may reference this profile in responding to the query. In known manner, this profile may be stored locally on a client system, e.g., as a cookie, or remotely, in a server in a file referenced to the user. For example, U.S. Pat. No. 5,895,471, expressly incorporated herein by reference, relates to a system for use with mobile, storage constrained clients, which stores hypermedia links such as Uniform Resource Locators (URL), used to identify and control access to resources on the network, on a server remote from the client device. Another system provides a globally unique identifier (GUI) to track users across secure and insecure networks. See, U.S. Pat. No. 5,966,705, expressly incorporated herein by reference.

A user may, for example, be provided with a personal web page, including a variety of information. In some instances, this information will be personal, and will therefore be maintained in secrecy, for example requiring passwords and/or support for encryption (e.g., secure socket layer [SSL] communications). Advantageously, the information associated with this web page may be updated and enhanced automatically, to represent a history of use by the user. Because this web page is maintained separately from the database server, it is accessible to a variety of servers, and further may be referenced by URL. Therefore, this scheme allows an on-line "memory" and persistence of complex parameters even where the system is otherwise stateless. This scheme differs from the simple use of Internet cookies, in that the file may be stored remotely, and is therefore not encumbered by the communication link between the user and server. Further, it is possible to perform analysis, e.g., stochastic analysis, of the profiles of a number of users, in order to improve the performance of the system. These files are "personal", which mean they are linked to the identity of the particular user, rather than the particular machine from which he communicates.

In the taxonomic representation, which, as discussed above, is preferably a tree structure, each node may be a hyperlink, meaning that a selection of that node indicates a reference to another data object or URI. See, e.g., U.S. Pat. No. 6,018,748 (Smith), expressly incorporated herein by reference. In some instances, the selection of a node will be employed to define a refinement of the taxonomic definition. In other instances, the selection of a node may point directly to a data element. Thus, for example, where the taxonomic definition is sufficiently specific, the selection of a node automatically calls a URI, which may initiate a search in a search engine or call a specific web page. On the other hand, the user may select a group of nodes to define a concept cluster. Graphically, the user may circumscribe a set of nodes, potentially across multiple taxonomic levels or even discontinuous through the taxonomy, to define the context. Where a node or group of nodes represent a search definition, the definition may be directly derived from the taxonomy, or it may represent the labors of human experts who translate the context of a node into an optimized query. Likewise, the query string itself may vary depending on the search engine referenced. Further, the search string may also vary in dependence on a "sophistication" or "role" of the user.

The user may create de novo, modify or extend a predefined taxonomy based on use or particular requirements. Therefore, the present invention provides a generic taxonomic structure for the organization of knowledge, and in particular computer and Internet platformed information, and to which a set of new, predefined or extensible definitions may be associated. From a commercial point of view, each person's activities and interests could be seen as hot spots on a predefined taxonomic map. To use a visual metaphor, a set of transparencies, each representing a taxonomic map of a person's interests and activities overlaid upon one another, would show darkened areas similar to population clusters in a population map. This metaphor could also be translated into a statistical model of groups of people sharing common interests for the purpose of sales and e-commerce. The present invention therefore encompasses the collation and use of such taxonomic maps of the activities and interests of specific populations. These may be used, for example, to generate custom sales catalogs, either printed or on-line.

The present invention also encompasses selections of information, e.g., customized catalogs, generated for individuals or population groups, based on the structure or statistical density of populated nodes on a taxonomic classification of interests and activities.

The present invention also encompasses the idea that there are certain domains of knowledge where a user may never have an interest. Thus, a child may have little interest in real estate listings. It provides the opportunity for user to exclude certain categories of information on a durable basis. This may be accomplished through a keyword methodology—certain keywords are related to real estate listings and suggest non-relevance, or by taxonomic exclusion, so that certain branches of a taxonomic tree are durably or semi-durably excluded. This approach to date has been limited to exclusion of "adult" material, but it has a much broader utility. In distinction to "smut filters", the system according to the present invention is therefore adaptive, providing individualized filters and inclusion/exclusion (or ranking) criteria. In fact, these criteria may be context sensitive, such that application of a criterion is dependent on the history of use (recent and/or long term), data environment of the system, e.g., explicitly and/or implicitly entered information and automated responses thereto, and/or status of the system, e.g., responsive to the tasks presently executing on the system. Therefore, according to the present invention, filters need not be absolute, such that in the aforementioned example, an otherwise relevant response to a query need not be excluded simply because it contains words which are likely indicative of a real estate listing, if the response is otherwise material.

This, of course, raises the issues of competing and cooperative filters. According to the present invention, an intelligent decision may be made dependent on outputs of a plurality of semantic, taxonomic, or other types of filters. Of course, a rigid filter rule, such as a "smut filter", may also be established within the same framework.

In some instances, a predetermined taxonomy is insufficient to finely granularize the set of results returned. In addition, the user may not be able a priori to classify the results without first examining them. In these sorts of instances, it may be desired to automatically classify documents into subsets of records of reasonable number. Thus, a relatively large set of objects responsive to a query may be automatically analyzed to determine common characteristics and categorized into mutually exclusive (or reasonably so) subsets thereof. The system may then define these distinctions as temporary (or permanent) taxonomic classifications. The user may then review these derived classifications, generated based on the content of the objects, or the objects therein. The automated classifications may also provide extrinsic distinctions, e.g., commercially motivated distinctions, rather than purely intrinsic content related distinctions.

As discussed above, the recently relevant portions of the taxonomy may be cached by an applet or helper application, and therefore these cached portions may include the derived taxonomy. Typically, the artificial taxonomy may be difficult to automatically integrate into a predetermined taxonomy. In that case, the system may offer the user the opportunity to manually define a taxonomic relation of a new or artificial taxonomic classification. Preferably, this opportunity is presented asynchronously with other requests of the server. Further, the applet may organize and defer such tasks. In fact, the applet may assist the user in organizing information extrinsic to the searching system, so that the user's available information base, from multiple sources, is coherently organized.

In a preferred embodiment, a taxonomy may be defined based on a commercial or industrial interest. Thus, the system according to the present invention may be applied to catalogs and specialized databases. Further, the taxonomy may be defined as a set of nodes, each node representing a different resource. For example, in an electronic (on-line) commerce system, each vendor may be represented as a node within the taxonomy, based on the products or services offered, client profile, and other factors, such as a priority rating. Therefore, the user may be presented with a plurality of potential taxonomic systems, depending on an initial interaction with the system. The user may initially indicate that he or she seeks to purchase an item. Therefore, the taxonomy selected will relate to goods for sale. In that case, a particular item offered within the system may ultimately have a plurality of taxonomic classifications, depending on a path the user takes. In other systems, the taxonomy is constrained such that no item may be classified more than once. An example would be linguistic searches, wherein a single "meaning" for a search term is desired, and the taxonomy defines the meaning.

Certain parts of the taxonomy might be made available on a commercial basis. For example, under automobiles, American automobiles, there might be a portion of the tree with Chrysler, under which might be sports utility vehicles (SUV), trucks, cars, and under sports utility vehicles might be Durango and Cherokee, where this inset in the taxonomy is paid for by the manufacturer or distributor on a fixed fee for view or click-through basis, or a combination of these approaches. The advertiser would know that a person entering its portion of the taxonomical tree really wants to see this particular product or aspect of its business, which should command a premium fee or click-through charge. To maintain integrity with the users, the paid portions of the taxonomy could be differentiated with a distinguishing typeface or color, could be outlined as commercial, or otherwise differentiated, to separate commercial and non-commercial portions of the taxonomy. In other cases, the probability of a user responding in the desired way to the ad is not exceedingly high. In that case, the cost per impression could be lower, or a higher valued ad substituted. The advertising rates may therefore be variable, and even computed according to a continuous formula, based on the characteristics of the user, the present search and past history of the user, and possibly other factors, for each imprint or user.

In the same manner, premium content, i.e., information objects that are available only by subscription or through payment, may also be highlighted and/or segregated from free or basic content.

The taxonomy may also include a hybrid representation, especially where commercial subsidies are a factor. Thus, where a user is "shopping", the interactive search process is purely of a commercial nature, and is optimized accordingly. This optimization may be such as to maximize revenues for the search engine proprietor, or maximize sales profit for the vendor. On the other hand, where the user seeks "content", rather than to purchase, the process may be subsidized by seeding the visual displays presented to the user with advertisements. Preferably, these advertisements are targeted to the user, for example based on the search premise, an imputed user profile or set of characteristics, or an identification of the user. Thus, for example, relevant commercial elements may be interposed in the taxonomic structure of the content. Alternately, banner ads may be provided, associated with the content displayed, the user, or otherwise to the process in which the user is involved.

This commercially subsidized portion of the information may be subjected to various filters, limits and compensation attributes. Thus, a user may wish to avoid all extraneous information, at the cost of usage fees, subscription payments, or other model for compensation of the service provider. Likewise, the amount of sponsor information may be limited, either at the server transmitting the information, or at the client system.

Revenue Models

A further aspect of the invention relates to revenue models, which may be defined, based on the advanced functionality of each respective system. For example, in the process of defining user characteristics for the system, the user conveys valuable information about himself. This information may be used, for example, to define, on a general level, a set of products and services in which the user may be interested. This information may be used internally within the system, or sold to marketing concerns, as permitted by the user, usage agreement, regulation and law. Advantageously, the system "tests" hypotheses by requesting feedback from the user relating to generalizations and specifications that are made. Thus, the function of defining the characteristic of the user may be enhanced through cooperation of the user. The benefit to the user of allowing these characteristics to be ascertained will be tangible and immediate, so the user will likely not object. The value of this data, in turn, may be returned to the user, in whole or part, by monetary remuneration, subsidy for search activities and/or reduced "search costs" for items of interest to the user.

Since a significant cost in Internet searching involved retrieval of query responses, by narrowing a scope of a search, it is possible to reduce the costs by limiting the information which must be delivered. Further, the value of the identification of a user characteristic, especially with the confirmation of similar interests, based on acceptance of the group presumptions made by the system, is high, especially for marketing purposes. Therefore, given the potential cost savings and information value, the system may provide substantial incentives to the user to cooperate with the information gathering process and to frequently use the system. These incentives may take the form of monetary rewards, coupons, bonuses, contests and random drawings, or improved content or service. These incentives may be allocated and provided in known manner.

Typically, the incentives are allocated according to profit to the proprietor of the database interface system. The greatest opportunities are, indeed, where the user conducts an e-commerce transaction through the portal, wherein the portal is compensated for delivering a willing and able purchaser to a vendor, or wherein the portal itself is the vendor. Therefore, the preferred primary basis for incentives is e-commerce transactions completed. A secondary basis for revenue to the portal includes advertising revenues, typically on a per ad impression or click-through basis. In this case, the proprietor desires mere use of the portal, and primary incentives may be provided, such as a set of useful services, as well as secondary incentives, such as rewards. These services may include, for example, personal shopping or information gathering agents, news feeds, e-mail, personal home page or web sites, electronic wallet services, best price services, consumer review services, on-line auction systems or auction monitoring systems, chat rooms or chat room monitoring services, and the like.

It is well known that by optimizing the presentation of advertising to potential consumers, a higher effectiveness of advertising will be achieved, termed the "ad response rate." It is believed that the probability that a potential consumer will purchase a particular item is correlated with certain personal characteristics, including demographic characteristics, of the person or family unit. The field is called demographically targeted advertising. Thus, by predicting the ad response rate for a person, the most highly valued advertisement may be selected for the person. This optimization allows the service provider to charge a higher ad rate, while the advertiser gains more effectiveness for marketing dollars.

Accordingly, one aspect of the invention provides that a conditional probability of a subsequent action by the user may be assessed for each interaction, and that, on the basis of that probability, an economic parameter altered. Thus, for example, the selection of a hyperlink by the user through a browser may be associated with a calculated probability that the user will subsequently purchase a good or service. This probability may then be used to calculate an advertiser charge for delivery of an advertisement, or to prioritize the advertisements sent to the user in order to, for example, maximize the utility to the selected advertiser, the advertisement serving system operator, to the user, or some combination thereof. This calculated probability may also be used to adapt the information subsequently presented to the user. This probability may be calculated, for example, based on a population statistic plus a recent history of the particular user, a collaborative filtering scheme, a long-term monitoring of the user through the use, for example, of cookies and a database, or other scheme, or through express input of user characteristics, such as demographic profile, survey response, or a direct user communication. The logic used to predict the probability may be formal Bayesean, fuzzy logic, a multiple regression equation, neural networks, or other known logic. Further, the probability calculation algorithm need not be completely accurate, so long as it produces an output more accurate than a random selection; however, since an economic valuation is placed on the result, a more accurate calculation will likely be considered more valuable in the marketplace.

It is noted that the advertisement need not be limited to efforts to cause a consumer to purchase. In fact, advertising, as considered herein broadly encompasses seeking to influence a user. Thus, the decisions made by the user need not be purchasing decisions. However, typically, an economic model is appropriate. For example, in a corporate Intranet, messages transmitted to users may be internal messages from within the network, for example informing users of new corporate capabilities, resources, or initiatives, or of changes. According to the present invention, these messages may be delivered in a context-sensitive manner, and based on a user profile. Of course, as in standard consumer advertising, messages may be targeted even to those persons who subjectively resist being so informed, but nevertheless are intended targets of the message. Advantageously, such internal messages may be subjected to an accounting system, wherein a real or imputed economic transfer occurs, for example in the manner of an auction, seeking to maximize the efficiency.

U.S. Pat. No. 6,014,634 (Scroggie, et al.), expressly incorporated herein by reference, relates to a system and method for delivering purchasing incentives and the like to a user, especially using a cookie and associated personal web page.

U.S. Pat. No. 5,974,398 (Hanson, et al.), expressly incorporated herein by reference, relates to a system that allows advertisers to bid for placement in front of particular users based on customer interest profiles.

U.S. Pat. No. 5,933,811 (Angles, et al.), expressly incorporated herein by reference, relates to a system for delivering customized advertisements within interactive communications systems.

U.S. Pat. No. 5,991,735 (Gerace, et al.), expressly incorporated herein by reference, relates to a computerized system for determining a user behavioral profile. This profile may be used, for example, to demographically target advertisements.

Business-to-Business Communications

The present invention also provides a system and method for communicating between potential partners to a negotiation. In this case, the user profile and user preferences preferably define characteristics of economic concern, for example an economic utility curve for the user. The query, rather than seeking a return of information, seeks an identification and initial negotiation with a partner. The user therefore expends considerable efforts defining the set of characteristics and profile, while the underlying query is generally quite concrete.

When the query and associated parameters are fully defined, the user may then transmit this information as an "agent". This "agent" may be executed at a central server, where an auction is implemented, seeking to identify appropriate negotiating partners, or the "agents" may be autonomous, and directly seek out and communicate with potential negotiating partners. For example, if both potential buyers and potential sellers each define "agents", the matching process may involve, initially, a correspondence of query, and subsequently a correlation of profiles, wherein a high correlation indicates a likely match.

In a preferred embodiment, the profiles are organized as hierarchal structures, wherein the correlation parameters are organized according to commonalities between the hierarchies. For example, a first inquiry looks at whether the hierarchal arrangements are similar, which, for example, may represent the scope of the request. A second inquiry looks at correlations of the nodes of the hierarchy, with appropriate compensation for differing roles of parties. Typical parameters to be correlated are cost, payment terms, quality, delivery, capability, warranty, distance, reputation, technical support, etc. Some parameters will be provided as numeric values or parameters, while others may be semantic or fuzzy variables.

To the extent that the information included within the "agents" is secret, it may be protected by both physical and algorithmic security schemes. If it is public, such security may be unnecessary.

In the manner of collaborative filtering, the reputation of respective potential parties may be an important factor in matching negotiating partners. Thus, such information, preferably gathered based on feedback from other's negotiations attempts, is preferably stored at a central server and accessed by the "agents".

In order to enter the required profile information for a specific negotiation, to a large extent, adaptive or learning systems may be ineffective. Thus, the user must manually and specifically enter the information. Advantageously, a set of graphic controls are presented to the user on a display, which can be readily manipulated. For non-continuous variables, other appropriate controls may be employed.

Trees

During a search process, there is typically a latency period between submission of a query and return of a first set of results, with further latency period if further results are subsequently presented. Typically, this latency period is wasted, in that the user is unable to perform any useful work, and the screen is either blank or not fully defined. The problem exists because the hypertext markup language protocols define that a response follow the query, and that no intervening packets are transmitted or accepted in between. The browser thus handles each hyperlink operation within a frame as a single thread. Thus, no background downloads are defined, meaning that screen refresh is limited by bandwidth and server and client latency. According to the present invention, this limitation is overcome by providing a helper application, i.e., a software construct that works in conjunction with the web browser, which allows the user to be constructive during the latency period, without unduly delaying the user when the results become available. Thus, foreground and background tasks are defined and controlled, allowing the user to remain productive substantially continuously without machine caused delays.

Advantageously, the user may be given the option to have an automatic summary or distillation ("Summary") prepared. Such technology might include, for example, the proprietary LindquistX Summarizer™ technology of Inxight Software™, a Xerox™ company, or other summarization techniques. Summarization may include a general purpose summary or one that is slanted to a particular purpose, such as that indicated by a search query. Summarization preferably may be user controlled as to depth or breadth. Likewise, automated language translation or other techniques may be applied to provide the user with comprehensible information. Further, the summarization may key in on certain categories of found names, such as persons, places, companies, countries, product names, and so forth. For example, in addition to language translation, portions of a taxonomic hierarchy may be presented to the user in encyclopedic form, allowing the user to browse a knowledge base separate from the source record, providing the user with background or other relevant information. According to the present invention, the user may also be presented with commercial information, especially where the system is in a purchasing or consumer mode. Thus, user receptivity is likely to be enhanced where advertisements or other messages are presented in proper context; likewise, the cost effectiveness of such messages will be expected to be lower if they are targeted properly.

Advantageously, the user is permitted and facilitated to organize bookmarks, e.g., URI or other object identifiers, or data records or files, according to a taxonomy, for later use. For example, each search query may be defined as a URI. By placing the URI in an appropriate position within a knowledge taxonomy, the user thereby can easily retrieve this resource in the future without going through a full process of defining the domains of search and the specific query, and not merely, as with current web browsers' "favorite" feature, placed in a long and difficult to organize list. The invention also provides that this emerging taxonomy of the user's activities, and indeed life, may be used to organize and place other important documents, such as mail, chat session transcripts, files from storage device. The organization process may be as a command line scheme, or by traditional graphic user interface techniques such as drag and drop. Different types of content may be distinguished from each other, for example by color, highlighting, location, and/or semantic indication. Thus, commercial content, premium content, adult content, and the like, may be segregated.

Advantageously, the user may be given the option to have an automatic Summary of a document or site saved along with a favorite. Also, in accordance with the present invention, a local or remote-hyperlinked data structure may be saved, for later analysis. Advantageously, user may also be given the option to add a title, description (either written or spoken), or hyperlinks, to a favorite, as defined by user, to the summary. Such information may also be defined within the source record, for example by XML tags, to be used as a default. This information may also be inferred by an analysis of the content, even if not explicitly tagged.

A particular advantage is obtained by employing pre-encoded tags present in source documents for the purpose of identifying the content of such documents for categorization thereof. Typically, the author of a document includes one or more tags or metadata that describe the document or provide key words to assist in automatic indexing thereof. These tags or metadata may be intentionally or unintentionally in error, or outdated; however, they generally provide useful information which is typically ignored, except in an initial indexing by a search engine using a single index strategy. In contrast, a preferred embodiment according to the present invention preserves this valuable content-descriptive information for later categorization.

Thus, the tag or metadata information of the document (or similar editorially derived descriptors of any type of accessible object) are preferably used by the system to understand the content thereof and to insert the document within a classification system, for example the tree hierarchy according to the present invention.

In many instances, adequate tag or metadata information is absent, or the reliability thereof cannot be assumed to be high. In that case, a content and/or context analysis may be used to define appropriate categorization of an object or document. Thus, the content is analyzed by, for example, semantic and linguistic analysis of the verbal content. In the event that the content is not verbal, or technical, known automated analysis techniques may be applied. Thus, in the case of audio, visual, or multimedia objects, various known content-based analysis techniques may be employed. On the other hand, some objects, such as full binary objects, contain no comprehensible content. Therefore, a context-based analysis may be appropriate. In a context analysis, the content of objects which are referenced by (e.g., embedded linkages or references) or which reference the subject object (e.g., block modeling techniques), through one or more levels of analysis, are determined, with a presumption that the linkages are conceptually motivated. Further, objects within the same hierarchal structure, such as a web site (or distinct portion thereof) or database, may also often be presumed to have conceptual linkages. Finally, the techniques of collaborative filtering may be employed to group conceptually related objects. Thus, while editorially derived content-descriptive information is preferred, systems and methods in accordance with the present invention do not rely on this information being provided, nor on the accuracy of such information if provided.

The user may also be given the choice to have favorites saved automatically into a taxonomic scheme, such as that represented by Open Directory™, an open source directory of web resources created and maintained by volunteer subject matter experts. This scheme would allow a user to review favorites so saved, and to browse easily in neighboring sites or materials hyperlinked to the same or nearby nodes in the taxonomic directory. Thus, in potential distinction to such "favorites" methodologies as those represented presently at www.backflip.com, the user may have the choice to save favorites into a ready-made browsable environment including pertinent sites not hitherto explored by user. In a further refinement, user may be informed when new sites or changed sites-appear within nodes or close to nodes in a taxonomic directory, to which a user's prior saving of a favorite suggests topical user interest; such notification could be periodic or realtime. Typically, monitoring of dynamic Internet information is provided as a service at a centralized Internet web site; however, the Internet spider-type technology may also be implemented at or proximate to the client system. In a further refinement, search results found through a query outside the directory, for example through a metasearch process, can be organized under directory headings. In this case, the directory may be queried as to whether and where it references a web resource, and if it does, the resource(s) may be saved to that (those) locations; if the directory does not reference the resource, appropriate directory classification headings may be still be found by analyzing the resources and extracting from them concepts and keywords, the directory then being queried as to where in its taxonomic structure such concepts or keywords may be found.

Preferably, all or a portion of a user's favorites collection, potentially including hyperlinks to related directory materials, may be defined by the user as an object and thereby stored, modified, transmitted, or shared. In accordance with Object Oriented technology, the object may have, for example, encapsulation characteristics, polymorphism characteristics, inheritable characteristics, multiple inheritance characteristics, dynamic inheritance characteristics, shared inheritance characteristics, and even non-inheritance characteristics. Thus, the object may include one or more characteristics of traditional object oriented theory, but need not fully comply with all formal tenets thereof, as is known in the art.

The organized taxonomy of favorites may be stored locally, on a client machine, or within a remote server. Advantageously, the stored information relating to a user may also include statistical and historical information relating to the user, which may be used, for example, to assist the user or the automated systems in producing search results that are appropriate in scope. This information may also be used by intelligent agents to perform automated tasks for the user. As discussed above, this data may be commercially valuable as well, and therefore is preferably subjected to strict controls over use and dissemination, to avoid invasion of privacy and dilution of value. This control may include requiring strong encryption, e.g., 128 bit SSL encryption, and limiting access to the personal information.

One preferred embodiment of the invention provides a system in which the user may organize the taxonomy by his social roles, for example vocational, familial and vocational roles. Other schemes provide classification by fields of interest, chronology or alphabetical order. The overall scheme may also comprise a synthesis of multiple methods. Of course, while convenient to do so, the organization of user information need not be conducted at any particular time or under predefined circumstances. The taxonomic classification scheme customized by the user may also be employed to assist the user in future tasks and to provide the user with customized features based on his or her interests. The scheme could also greatly facilitate the use of the search engine as an agent or servant of the user, in accomplishing those future tasks. The taxonomic classification, and indeed other information pertaining to the characteristics of the user, is commercially valuable, and may provide a source of revenue to subsidize operation of the system. The privacy of the user may be protected in a number of ways. First, the user profile may be retained within the server environment, and the server may act as the agent of commercial interests, shielding the identity and privacy of the user. Second, the user may be provided with control over the content of the profile itself, which may, for example, direct for or against certain commercial intrusions. Third, information may also be aggregated on a group level, thus filtering personal details while providing valuable population statistics. Fourth, the communication of user information to a commercial entity may be the subject of a direct negotiation between user and commercial entity, which may encompass, for example, payment or other incentive.

It is an advantageous feature of the present invention that the hierarchical taxonomy need not be unique or predetermined. In other words, the hierarchy may be altered, either explicitly by the user during an editing process, or implicitly, by an automated adaptive process, or otherwise. Further, a plurality of hierarchies may simultaneously be present, providing the user with different views and organizational constructs for the same information. Thus, in contrast to a traditional hierarchal file system (HFS), the hierarchy need not be predefined or limiting. Thus, the present invention comprehends that there is not necessarily a single or unique hierarchy suitable for all tasks, and that the data structures need not be repeated in order to provide multiple inconsistent structures. These structures may correspond, for example to the roles discussed above. Thus, a typical person has interests segregated by vocation, hobby, athletics, entertainment, family, friends, education, and the like. The same information records or objects may have considerably different meaning or desirable interrelations depending on which context the person intends to be applicable, and the knowledge base of the person will likely be considered constant through these different roles. An aspect of the present invention therefore allows a user to employ different organization objects as desired. Further, the concept of inheritance may be applied, in which a daughter object inherits the characteristics of a parent object. This inheritance may thus involve more than just organization, and may, for example, encompass content and expression issues as well.

Another aspect of the present invention is that the user may employ morphing structures, i.e., structures that may change in one characteristic, while retaining substantial elements of other characteristics. During use, therefore, a user may decide to invoke a different organizational structure for analyzing objects. The system may also intelligent and adaptively morph, based on explicit or implicit feedback from the user. In an adaptive scheme, it is preferred that the range of changes encompass a continuum, such that changes are incremental rather than paradigm shifts. On the other hand, it is often useful to provide the user with the express ability to invoke a complete paradigm shift, rather than mandate that all changes be incremental. Thus, the incremental changes are akin to linear combinations of characteristics of sets of polar object schemes. Implementation of these hybrid schemes may be achieved by double inclusion (or multiple hierarchal definition) of elements, combination or division of subsets with related content, and/or intelligent filtering of content.

The use of the organization structures according to the present invention may be exemplified with respect to an example. A user, in the course of interaction with automated devices, generally will favor a small subset of the resources available, while generally not making use of a large number of accessible resources. These favored resources may be called "favorites", and made available through shortcuts to a complete definition or location of the object. A simplest organization of favorites is based on number of prior uses or accesses of the object. Objects used more rate higher on the favorites list than those used less. An alternate organization rates objects in reverse order of use. A somewhat more sophisticated list applies a temporally decaying weight to previously used objects, thus combining both number of uses and time of past use.

On the other hand, it is often more useful to segregate objects by topic, for example, finance, travel, consumer purchases, business office purchases, automobile, vacation, restaurants, education (with possible subclassifications), etc. In this case, the simplest organization is static, representing a predefined taxonomy.

In some cases, a group of topics are related only because of a particular event. Thus, a business trip may involve airplane, hotel, car rental, maps, meeting schedules, personal identifications and contact information, and one or more business purposes. These topics, outside the context of the business trip, may have no other apparent connection. On the other hand, on a repeat trip, the previous set of information may be very relevant. The organization of this information may thus be represented as an object that can be reused and edited, as appropriate.

Often, a single object will have multiple relevancies to a user. For example, a business trip to Orlando Fla. may involve many common issues to a pleasure trip to Disney World in Orlando Fla. Therefore, portions of relevant aggregations of information of each will overlap. Therefore, the same information can be represented in various objects.

In another manifestation of the power of the multiple hierarchy concept, the user may choose to search or browse favorites in, or places web favorites within, one or more of a series of directories either standing alone or mapped to one another. This series of directories, for example, might include national library systems such as the Dewey Decimal system and the systems of the Library of Congress (USA), Bibliotheque Nationale (France) and the British Museum. One could browse directly from one collection's sub-category to another's because of preset mapping correspondences, or real-time exploration of hierarchal characteristics and real time drawing of conceptual connections.

In an object-oriented environment, objects may be chained, with child objects inheriting the characteristics of the parent object. Therefore, according to the present invention, for example, a parent hierarchy may encompass information relating to a business trip. A child object may define a predetermined taxonomy. A grandchild object may encompass a time-decay weighting of relevance. Thus, the topics of the business trip are organized taxonomically, and the items within each topic are organized in time-decay weighted manner. It is, of course understood, that a plurality of alternatives are available for organization of information objects at each level of analysis. The organizational structures may also serve as selective filters, limiting the scope of the information objects presented.

The present invention is not limited to information objects, and thus various types of objects may be employed and encompassed by the present schemes.

The present invention may advantageously employ Internet cookies to provide a memory of activities, in order to address the stateless nature of Internet protocols. The cookies may also provide user characteristics (such as the aforementioned user "role"), or even be used as a short-term storage of information, for example to preserve a state if a "filler" screen is presented to the user during a latency. However, in many cases, cookies are preferably supplemented with or replaced by information stored at the server level, and accessible to user through a security recognition scheme. Thus, the cookie preferably provides an address within a server database for critical information, rather than the information itself. On the other hand, where the cookie is not server-specific, but rather defines a standardized trait, a direct transmission of the trait in the cookie may be preferred to a requirement of inter-server communication to resolve the desired information.

There is potential great value of this organization structure of information both to the user and to statisticians. While it is obvious that the user will gain a single library of libraries for organizing his interests or activities, the same data is valuable for optimizing products and services for the user, and for directing relevant commercial messages to the user. Since the hierarchy is presented as a set of connected nodes, many of which follow a predetermined pattern, the mere representation of which nodes within the hierarchy are populated, regardless of the particulars of any information populating those nodes, provide a valuable profile of the user. Therefore, the privacy of the user may be protected by communicating only the node population densities, rather than specifics of the hierarchical map, or a pertinent portion thereof. Further, by grouping the hierarchical map of an individual with other individuals of similar overall profile, personal information may be further protected, anonymity maintained, yet still provide the statistician with detailed information.

The organizational structures according to the present invention are independent of the information populating them. This organizational structure may be automatically populated, or transmitted to the user as a sort of a map for exploration by the user. Thus, according to the present invention, one aspect provides that an information request (query) by the user may usefully result not in a direct return of responsive information, but in a return of an organizational structure of potentially material responses. In some instances, the user will immediately be able to determine which portion of the organizational structure, e.g., map or tree, is relevant. In other cases, a review of the information structure by the user may be necessary in order to explore the potential response space. In either case, the return of the information structure provides a substantial benefit to the user at low "cost", e.g., a retrieval operation that operates off an index rather than the full database, returning an information structure to the user. Therefore, this process is grossly analogous to the use of traditional search engines; however, it is possible that a greater number of interactions may be necessary between user and remote server before the information objects are directly reviewed. According to the present invention, however, portions of the analysis may be performed local to the user, for example through client-side applets or applications. This may mitigate some of the interactive burden, while facilitating personalization of the system based on explicitly or implicitly derived factors.

In accordance with the present invention, influences outside the user may define a default level of presented detail in a hierarchy with respect to sponsored information. This may be, for example, traditional advertising information, or internal communications, for example, within a corporate intranet. Therefore, while the user may have a high degree of direct control over a depth of information comprising the response to the query, a lesser degree may be provided with respect to sponsored information. Thus, in order to provide full value for sponsorship, a selected degree of information depth may be presented. The level of detail presented may also be adaptive to the user characteristics and/or profile.

U.S. Pat. No. 5,313,646 (Hendricks, et al.), expressly incorporated herein by reference, relates to a method and apparatus for a translucent file system. Such a technique, for example, permits aliasing of file structures and user redefinition of hierarchies.

Guided Browsing

The use of this information structure therefore presents another particular aspect of the present invention, that of guided browsing. Therefore, the user examines objects using known techniques and systems. The system according to the present invention need not replicate or encompass resource for all such objects. The emphasis of this aspect of the present invention is therefore to facilitate identification of relevant objects through intelligent analysis and information presentation techniques, including, for example, hierarchal or taxonomic organization.

It is noted, however, that the system and method according to the present invention may be integrated with standard object browsing software, such as Microsoft Internet Explorer or Netscape Navigator. For example, custom frames or codes within the command line may invoke particular functions of the present invention. The hierarchal organizational scheme may preempt the standard favorites organization. Of course, the present invention is operable without such integration, and indeed is operable in many instances without a standard object browser at all. In either case, the user is typically given an option to employ standard tools or those enhancements provided by the present invention. Further, many features of the present invention are modular, and need not be employed as a complete set. This is especially the case where features are implemented as sets of small applets, invoked as necessary.

An important trend in the development of the World Wide Web has been the growth of communities, which are web sites organized to encourage communication among groups of people sharing common interests. Such communities have been found to provide an attractive environment for specialized advertising and commercial sponsorship. It can be readily seen that the use of maps and other means for presenting relationships between objects according to the present invention lends itself to the recognition, organization and maintenance of communities. Indeed, the nodal map could be represented somewhat analogously to a demographic map, in which the activity of nodes could be analogized to the size of cities. On an ordinary map, an ordinary village would be represented by a tiny dot, and a large metropolis represented by a larger dot or circle. Analysis of such a map could help provide users an opportunity to initiate or expand a community, or for a service provider with access to such information to stimulate or encourage such a community. Therefore, it is an object of the invention to analyze user profiles, for example taxonomic maps, to define a user's interests, or activities, which may then be used to identify communities which relate to those topics. The user may then subscribe to those communities.

Presentation of Results

After a query is defined, the system may return a large amount of information. Therefore, a proportional burden of information not specifically requested by the user may accompany the download, for example banner ads. Advantageously, however, the user may be provided with options relating to the types and amount of such additional information, and its manner of presentation. Therefore, a variable cost and/or subsidy scheme may be provided.

It is known in the art of search engines to rank objects according to their quality, and therefore to prioritize the objects, for example an ordered presentation, based on this quality, independent of content. The object need not be a document or text, and in fact may be, for example, a domain, record or other source. The quality factor itself may be, e.g., investment in site, frequency of visits, duration of visits, hyperlinks, or human editor's opinion of quality. On the other hand, objects may also be ranked according to their relevance to a particular problem, i.e., in content or context-sensitive manner, by such techniques as counting the frequency of key words, proximity of key words, the appearance of key words in title or key word field, or by constructs that attempt to measure conceptual relevance semantically. In both cases, the particular factor or factors stressed by a search engine will differ, and these differences contribute to the distinctive response or "personality" of a search engine. One embodiment of the present invention, therefore, advantageously employs both types of classification data in order to determine the ranking of a record corresponding to a query.

The technique employed to create such a weighting is akin to the techniques employed in statistics for creating a stratified sample. A stratified sample encompasses a representative and balanced sample of elements of a population, reflecting the characteristics of the population as a whole. For example, a search query is dispatched to a plurality of search engines, each of which may operate on identical, overlapping or distinct data domains. The search engines operate on the query to generate a set of results. The results are normalized and scored according to a composite of content and source importance, and the results returned in rank order. If the results include duplicates, the existence of duplication is a factor in favor of higher ranking. In a metasearch system, wherein a single interface system dispatches a query to multiple search engines, the rankings applied by the individual search engines may be normalized and weighted, for consolidation of the results. The rankings may also be weighted according to the intellectual attractiveness or empirical success of the search and ranking strategy of the individual search engine. Thus, unlike conventional metasearch engines, which typically list results separately for each underlying database searched, the search engine according to this aspect of the invention would synthesize found results and order them according the above described methods; moreover, redundant results may be flexibly handled. For example, instead of separately presenting results from each search engine or database, these may be consolidated and ranked together in a single presentation. On the other hand, the database or source may have particular relevance, and therefore separate listings may be desirable. Likewise, in a conceptual cluster map, redundant listings may be pertinent or irrelevant, depending on the context of analysis. Thus, the extent of redundancy may be relevant, and may be displayed. Typically, however, it is considered an advantage to present all redundant records together, with a consistent ranking scheme for consolidated results from different sources.

In order to determine the value of the search and ranking strategy of primary search engines, an automated agent may compare results obtained from comparable queries, either during actual use or based on test queries. The results may then be automatically or manually analyzed, and the analysis used to formulate a normalization scheme.

The present invention provides for a clearer representation of the results of relevance ranking through several alternative means of display. Typically, relevant results are ranked among aggregate results in a linear fashion, either as a simple list, typically in descending order of relevance, or ranked by percentiles, quintiles, deciles, etc., as in the Lycos "top 5%." However, alternative means of partitioning results may be more useful. A partition by standard deviation is one alternative choice offered by the present invention. A partition by Fibonacci series is another choice offered. Further, a user preferably is given the option to choose among linear, statistical, or Fibonacci methods, as just described, or to show a combinations of these partitions graphically. These partitions could be represented either textually, or graphically, for example, using the model of a partitioned triangle, a triangle or pyramid, a pie shape, a bar chart, or as partitions along a curve of distribution, such as the normal curve. See FIG. 22 and also U.S. Pat. No. 5,966,126.

The present invention may employ known scoring and ranking techniques. However, by employing additional information, an improved presentation of retrieved information may be obtained. The present system preferably obtains a user "role" which may be analogized to a general user type. This general user type or global profile may impose a set of rules or constraints on the information presentation, such as ranking and sorting preferences, amount and type of information for each record, and the like. Thus, by employing the predefined role of the user, a consistency may be obtained for each user, while allowing different users to enjoy different presentation styles. Thus, a user profile may be segregated into persistent and generally non-content-specific characteristics, as well as content-specific characteristics. The content-specific characteristics may therefore be applied only where appropriate, with the content-independent characteristics applied generally.

U.S. Pat. No. 6,018,738 (Breese, et al.), expressly incorporated herein by reference, relates to a system that matches or sorts objects based on an attribute frequency value.

Importantly, the search definition according to the present invention is preferably taxonomically based. Therefore, the ranking or retrieved information objects may be made according to the taxonomic relevance of the object. Typically, known systems fail to define a taxonomic classification to a search term, and therefore have difficulty employing the classification in ranking the results. Therefore, in the event of a context ambiguity, the system cannot distinguish the respective contexts. According to the present invention, the context of each retrieved object may be analyzed with tools adapted to accurately classify the object in accordance with the user-defined context.

Because a user may wish to compare results of a search done presently with the same or similar search done in the past, the invention provides for a "delta search" functionality, in which the user is apprised of certain changes in objects found since the previous evaluation. See FIG. 23. This might include additions, deletions, or revisions of the identifiers of objects, or of the underlying objects themselves. Such comparison might be enhanced through preparation and comparison of summaries. It could, for example, encompass changes in unique URIs only, or to inspection of changes in content that is embodied within the sites addressed by the URIs, or the data collections associated with them. Concerning changes in unique URIs versus a previous search, one preferred method to accomplish such a search would be to save a record or URIs found. At the time of a new search, found URIs could be matched against prior URIs and a difference table established; these differences could then be sent to user for inspection. Changes to an object could also be highlighted, for example, through display of portions of the taxonomic tree, with portions that have changed highlighted by methods already discussed above, including color saturation, range of colors, or shading. It is noted that, by providing a content summary, the document may change without necessarily changing the summary. If such changes are important, a checksum or other detailed comparison of objects may be performed to detect such changes. The invention also provides for a process whereby summarizations are prepared of documents and the summarizations are compared for differences. See, U.S. Pat. No. 5,278,979 (Foster, et al.), expressly incorporated herein by reference.

In similar manner, the system according to the present invention may be employed to analyze relations between objects, creating hierarchies based on the analysis. In particular, often, objects comprise text documents. In many instances, especially in professional contexts, the set of documents stored and organized include significant redundancies. These redundancies are due to common origin, common purpose, or convergence. In any case, it is often useful to be able to analyze the relationship between documents, and indeed a large market has grown for document management systems.

In a broader application of the principle of similarity analysis, the conceptual likeness of objects, found through summarization, extraction, and/or comparison processes, may be used to suggest an automatic and possibly customizable hierarchal classification of information, based on concept or purpose (project, goal, mission). This organization need not be similar to the user's typical file organization, but rather may be implemented as a meta structure.

According to the present invention, a system performs summarization of documents within a scope, for example employing known document "compare" techniques to determine a relationship among them. Typically, a complete compare (to identify minimal changes or differences between objects) is computationally intensive. Therefore, a word o phrase classification index may be constructed, which is used to determine which pairs of documents require further correlation. See, for example the Thingfinder system. Once documents which substantial common features, e.g., topics or concepts, are identified, these may then be analyzed and organized in a useful manner. For example, one mode of analysis may be used to determine edit histories of a document family. Another mode of analysis may be used to determine documents having a common framework, such as completed form documents. A further mode of analysis may group documents with a common subject together. It is noted that, in some instances, analysis of an object may be facilitated by analyzing usage of uncommon words or names. In other instances, a linguistic analysis of words, phrases, and larger structures will be necessary to infer the content.

Once relationships are determined, the output may take any of a number of forms. For example, a tree structure may be created, populated with the available document set. A multidimensional cluster map may also be generated, with trivial dimensions collapsed to give the most useful output image. Thus, discrete, continuous or hybrid techniques may be used for data representation. In a preferred mode, a high level analysis segregates documents based on discrete criteria, such as a taxonomy, although at this level, a single document may be represented in multiple discrete segments. Within each segment, the documents are represented in a continuous map, the presentation of which may be altered by the user as desired to best distinguish the documents of interest.

Using this type of analysis, it is also possible to implement an efficient vector-quantized data compression scheme, based on the common sequences within proximate documents within the hierarchy. Duplicate files would be most efficiently represented. Thus, a series of documents representing a series of drafts of a document may be analyzed to produce a representation of the group as an edit history. This edit history may not only represent the entire set, but in many instances provides a useful organization of the data, including common ancestor documents, draft evolution, and individual contributions.

Definition of Context

A Presearch™ system of the present invention allows filters of various types to be applied to the search engine. A search filter is a system that analyzes a search query, and passes all or a portion of the query, with possible modifications of various sorts. Typically, a filter or set of filters is applied to limit the scope of the search to a reasonable context, while broadening the inquiry within that context to all relevant objects. Some of these filters are concrete, such as "MP3 files only", while others are more related to relevance ranking of the output data. Filters of various types may be used in conjunction, although a consistency checker preferably determines whether inconsistent or impossible conflicting demands are being placed, automatically or manually resolving any the inconsistencies. Other possible filter types comprise non-content specific characteristics such as language, date of document creation, document type, document source, document size, etc., content specific characteristics, or neural network systems which may be responsive to various characteristics.

Metasearching and Supra-Internet Data Sources

The present invention also provides a meta-metasearch engine, which assembles its data from an underlying internal or third party metasearch engine, or engines, and operates upon the results in the same way as if these had been separately gathered. Therefore, the above-described methods could be applied to results obtained from existing metasearch engines, such as Dogpile.com, Metasearch.com and Copernic.com.

Because the invention is not merely an enhancement to a Web search engine but also offers important improvements in browser and operating system functionality, it allows for searches that encompass not merely the Web but also any information system, including user's own computer files, however stored. Thus, the user may use the search technology described herein to search for local computer files, or for text within those files. Unlike the simple functionality offered for search in the Start Window of Microsoft Windows™ "Find">"Files or Folders" category, which is limited to search by word or phrase, by file size, and by date of creation, the invention contemplates search of one's own files in a full-featured sense, including Boolean logic, relevance ranking, ordering of importance of words or phrases, and/or any other improvements to search described herein.

OBJECTS OF THE INVENTION

It is therefore an object of the present invention to provide a database system in which a user characteristic, such as a role in society, is employed to refine the scope or domain of a search or other database operation.

It is a further object of the invention to provide a preliminary procedure for defining a database operation, wherein an interactive communication defines the database operation in plurality of communications, each communication transmitting information from the user to the database server, and triggering a selective response thereto by the database server, prior to execution of the operation by the database server. The database operation is preferably a query of a text database system.

It is also an object of the invention to provide a hierarchical representation of a taxonomy to the user for interactive definition of a desired search scope.

It is a further object of the invention to provide a database record retrieval system wherein subsequent to definition of a query, a further operation is provided for presentation of the query results, wherein the further operation is defined by a user input and selectively provided based on the results of the query.

It is another object of the invention to provide a computer database system, comprising a user interface, receiving a user input and presenting feedback; a memory for storing a user characteristic, the user characteristic being defined through the user input and being employed to control a domain of a database operation, while not defining a query; and a memory, for storing a user query, defining a range within the domain.

It is a further object of the invention to provide a computer database system, comprising a user interface, receiving a user input and presenting feedback; and a representation of an organization of knowledge, presented as feedback to the user, to define a contextual scope of a database operation, wherein the user interacts with said representation to define and refine a desired context.

A still further object of the invention provides a computer database system, comprising a user interface, receiving a user input and presenting feedback; a memory for storing a search query, said search query defining a characteristic of a desired information object; and means for ranking information objects having the defined characteristics, wherein an identification of objects are provided with an associated ranking using a plurality of methods, and wherein the rankings produced by the plurality of methods are processed to produce a composite ranking.

It is also an object of the invention to provide a human user computer interface system, comprising an object examination interface, providing human user access to a selected hypertext object; and a graphic portion simultaneously representing at least three hyperlinked objects in a hyperlink hierarchy, each hyperlinked object representation being hyperlinked to the respective object for selection thereof, the graphic portion being automatically generated to represent a hyperlinkage hierarchy and graphically representing a history of access to the represented objects.

Another object of the invention provides a human user computer interface system, comprising a graphic user interface, comprising a visual display and a pointing device; and a portion of the visual display presenting a hierarchal path representing a resource locator for accessible objects, wherein a selection within the portion by the pointing device of a predefined level within the hierarchal path is interpreted to request an object corresponding to the predefined level of the hierarchal path.

A further object of the invention provides an browser system, comprising means for defining a request for information; means for accessing files from a file-based operating system; means for parsing files into component portions; and means for presenting hierarchically arranged component portions, a scope of presented component portions being dependant on a relation of the component portions and the request for information.

An object of the invention also provides a method of providing a human-computer user interface, comprising the steps of providing the user with navigational tools for defining and retrieving objects based on a resource locator thereof; providing an object search engine for selecting a set of objects according to a user-defined content criteria and returning respective resource locators of selected objects; and providing an hierarchal organizational structure in graphic format for the set of objects, wherein the hierarchal organizational structure is automatically generated based on a content of or linkage between objects. According to one embodiment of the invention, objects extrinsic to the user-defined search criteria are inserted into the hierarchal organizational structure of the selected objects. These extrinsic objects are, for example, advertisements, communications, collaborative filter-based supplementation, or the like.

It is a further object of the invention to provide an information organizational system, comprising a hyperlinked organization of objects, wherein a single object may have multiple parent objects and multiple child objects, and wherein at least two independent hierarchies are formed by respective subsets of hyperlinkages within the hyperlinked organization, and wherein the respective independent hierarchies are distinguishable for each respective hyperlink.

It is a still further object of the invention to provide a human user computer graphic interface system, comprising a pointing device, producing a signal corresponding to a manipulation by the user and being capable of producing pointing device events; and a graphic display generator, generating a graphic display representing at least two objects and a linkage therebetween, as well as a graphic cursor, the graphic display generator selectively altering representation of at least one object in proximity to the graphic cursor and altering a linkage on occurrence of a pointing device event.

Another object of the invention provides an information organizational tool, comprising at least two distinct predetermined hierarchical organizations of information each having at least three hierarchal levels for a universe of objects; means for defining a relevant hierarchy from among the at least two distinct predetermined hierarchical organizations of information; means for defining a set of objects within the universe of objects; means for presenting links to the defined set of objects according to the relevant hierarchy; and means for storing at least a subset of the presented links within the relevant hierarchy as a recallable structure.

It is also an object of the invention top provide an information organizational system, comprising a set of n independent hierarchies, each encompassing a universe of objects; a user input for selectively defining a respective hierarchy; means for selecting a focus within a respective hierarchy; means for representing the focus, objects within the focus, and hierarchal linkages of the objects within the focus; means for altering at least one of: the universe of objects, an organization of the respective hierarchy, a scope of a focus, and a ranking of objects; and means for updating the representation of the focus based on the alteration.

It is a still further object of the invention to provide an information organizational system, comprising a set of n independent hierarchies, each encompassing a distinct organizational structure of a universe of objects; an input for selecting a desired hierarchy; means for defining a set of objects within the universe based on characteristics thereof; means for representing the set of objects based on the selected desired hierarchy and a ranking algorithm, the ranking algorithm ordering objects within the hierarchal classification; and means for selecting a hierarchal subset.

A further aspect of the invention provides an intelligent agent system based on (a) a specific task defined by a user, and (b) a user profile defining general characteristics and preferences of the user. The user profile may advantageously be stored in a personal record in a server, as discussed above, or be transmitted by the client machine to an agent server directly. The specific task may be defined explicitly, or for example, employing the interactive communication scheme and taxonomic representations discussed above. Furthermore, as a representation on behalf of the user, the taxonomic nodes on which the agency is active may be visually distinguished from the remainder of the nodes by color, blink rate, highlighting, or the like. The agent may, for example, conduct database searches or updates thereof, monitor published pricing or on-line auction status, discover new items which meet a purchasing profile, or otherwise conduct transactions on behalf of and using a strategy defined by the user. The invention also provides for customized news magazines, whose contents are mapped by the nodal map of a particular user.

It is also an object of this invention to allow for monies to be received from commercial interests who wish to obtain an elaborated portion of the directory from which user selects relevant categories (a "Limb"). Such a Limb would present additional material, suggested by the advertiser or merchant, in a more elaborated way than would otherwise occur: for example, multiple levels of details about an advertisers' products, video or audio commercial messages, special offers and discounts, contests, and so forth, arranged in the Tree format. Preferably, for the purposes of informational integrity, commercial content would be separated from non-commercial content by a demarcation, such as a colored line, to avoid confusion with non-commercial content. To give a specific example, user may touch a node for transportation/automobiles/US/Chrysler Dodge/Durango. Everything beyond Chrysler Dodge would represent a Limb, a paid service. Such Limbs could also be modified dynamically in relation to characteristics of the user. For example, the Limb for a young mother might emphasize safety features, while the Limb for a user known to be a male in his twenties might stress the power and handling package.

It is a further object of this invention to provide an opportunity for a searching service to share in its other revenues with its frequent users, for example such reward being proportionate to their use, as measured for example by duration, frequency, click-through, purchases, or otherwise. It is known in the prior art to reward users with frequent flyer miles, lottery prices (cf. www.iwon.com), or payments to other sites providing a hyperlink (cf. www.goto.com). However, the present invention preferably provides users with help in the "currency" they are seeking, namely search results or shopping, through provision of rewards in the form of access to human help, or other otherwise paid-for search assistance, including access to specialized content, bibliographic information, shopping assistance, delivery of information or goods, or referrals. Thus, the invention preferably provides for a means or storing records relating to user frequency, especially at the server level, if the user wishes to participate in the reward program.

It is also an object of the invention to provide a human computer interface system, comprising a client user interface system; a server system, capable of communicating with the client user interface system; and a user profile, wherein the server executes an operation in dependence on an explicit user command and the user profile, and wherein user profile is stored in an encrypted form which is resistant to detailed interrogation of the server.

It is a further object of the invention to provide a human computer interface system, comprising a client user interface system; a server system, capable of communicating with the client user interface system; and an applet, presenting to the user a hierarchal nodal map of relationships of information classes, wherein the server executes an operation, returning a set of information, and wherein the applet populates the hierarchal nodal map with elements of the set of information, the based on a relationship of a content of each element with a respective class definition of a respective node.

It is a still further object of the invention to provide a human computer interface system, comprising a client user interface system a server system, capable of communicating with the client user interface system, and an applet, presenting to the user an editable hierarchal nodal map of relationships of information classes at a respective level of analysis, wherein the server executes an operation, returning a set of information, and wherein the applet populates the hierarchal nodal map with elements of the set of information, based on relationship of a content of each element with a respective class definition of a respective node.

Another object of the invention is to provide a human computer interface system, comprising a client user interface system, a server system, capable of communicating with the client user interface system, and an applet, presenting to the user a map of relationships of information classes, wherein the server executes an operation, returning a set of information, and wherein the applet populates the map with elements of the set of information, the based on relationship of a content of each element with a respective class definition, and wherein elements of the set of information within a regional cluster are priority ranked.

It is an object of the invention to provide a human computer interface system, comprising a client user interface system, a server system, capable of communicating with the client user interface system, comprising a database system having an index, and an applet, presenting to the user a map of relationships of information classes, wherein the server searches the index based on a user query, returning information relating to a regional density of population of the map, and wherein the user may select a cluster of data elements within the map for further database operations.

It is also an object of the invention to provide a human computer interface system, comprising a client user interface system, a server system, capable of communicating with the client user interface system, and a user modeling applet having encrypted user modeling data, wherein the server is controlled by a user query and the user modeling applet, and wherein a key is required from the user to access the applet.

It is a still further object of the invention to provide a human computer interface system, comprising a client user interface system, a server system, capable of communicating with the client user interface system, and an adaptive user profile applet, comprising a collaborative filter for initial classification, which subsequently is modified based on user observation, wherein the server executes an operation, returning a set of information, based on a user query and the applet.

The present invention also provides as an object a method of protecting privacy rights of a user, comprising the steps of receiving private user information from the user, supplementing the user information with corrupt information not from the user, and integrating the private user information and corrupt information into a single aggregation. The integration of corrupt information may be based on a pseudorandom pattern, wherein the private user information may be substantially retrieved based on a knowledge of the pseudorandom pattern. Alternately, the corruption may be based on an asymmetric cipher (e.g., public key-private key encryption), wherein the corruption pattern is defined by a public key algorithm, which may be remediated by applying a private key algorithm. The integration of corrupt information may also be irreversible, and preferably the aggregation has a high correlation with the private user information or represents a collaborative filter supplementation of the user profile, such that the aggregation is useful in place of the private user information.

Another object of the present invention is to provide a method of protecting privacy rights of a user, comprising the steps of receiving private user information from the user, processing the private user information within a privileged environment to produce a public key-private key encrypted algorithm, wherein the public key/private key pair is associated with a user, and transmitting the encrypted algorithm to the user.

A further object of the invention is to provide a method for filtering user queries, comprising defining a user taxonomic hierarchy of interests, correlating the user taxonomic hierarchy with a set of references taxonomic hierarchies, and modifying the user taxonomic hierarchy based on sets of rules associated with a reference taxonomic hierarchies having high correlations.

A still further object of the invention provides a digital rights management system, comprising an index of content having associated digital rights; means for searching the index based on a user query; digital rights management means for applying a set of digital rights rules to a result of searching the user query in a content-sensitive manner; and means for transmitting the user query result and applied digital rights rules to the user, wherein at least one digital rights rule provides a positive incentive to the user.

The present invention has as an object to provide a system for preserving digital rights in a transmissible object, comprising a plurality of distinct elements, each having an associated distinct digital rights rule, comprising means for analyzing the transmissible object to determine associated distinct digital rights rules for respective distinct elements; means for substituting at least one distinct element based on an associated distinct digital rights rule; and means for accounting for the substitution.

Another object of the invention is to provide a human computer interface system, comprising a client user interface system, a server system, capable of communicating with the client user interface system, and means for defining a hierarchal cluster map of data elements retrieved by the server system, and transmitting a cluster density of the cluster map to the client user interface system, wherein a hierarchy of the hierarchal cluster map is alterable.

Finally, it is an object of the invention to provide a human computer interface system, comprising a client user interface system, a server system, capable of communicating with the client user interface system, and means for defining a hierarchal cluster map of data elements, and transmitting a cluster density of the cluster map to the client user interface system, wherein a hierarchy of the hierarchal cluster map is supplemented by context-appropriate advertising.

In many instances, the invention according to the present invention builds on themes and concepts of the prior art. It is understood that the herein discussed references therefore disclose elements and implementations of portions of the invention, and include disclosure of elements and implementations which could be modified in express accordance with the teachings herein.

These and other objects and features of the present invention will become more fully apparent from the following description and appended claims taken in conjunction with the accompanying drawings, in which like numerals refer to like parts.

BRIEF DESCRIPTION OF THE DRAWINGS

FIG. 4 shows a relative importance input scheme;

FIG. 5D shows size guidance of a search;

FIG. 5E shows levels of hierarchies;

DETAILED DESCRIPTION OF THE PREFERRED EMBODIMENTS

Figure 1:
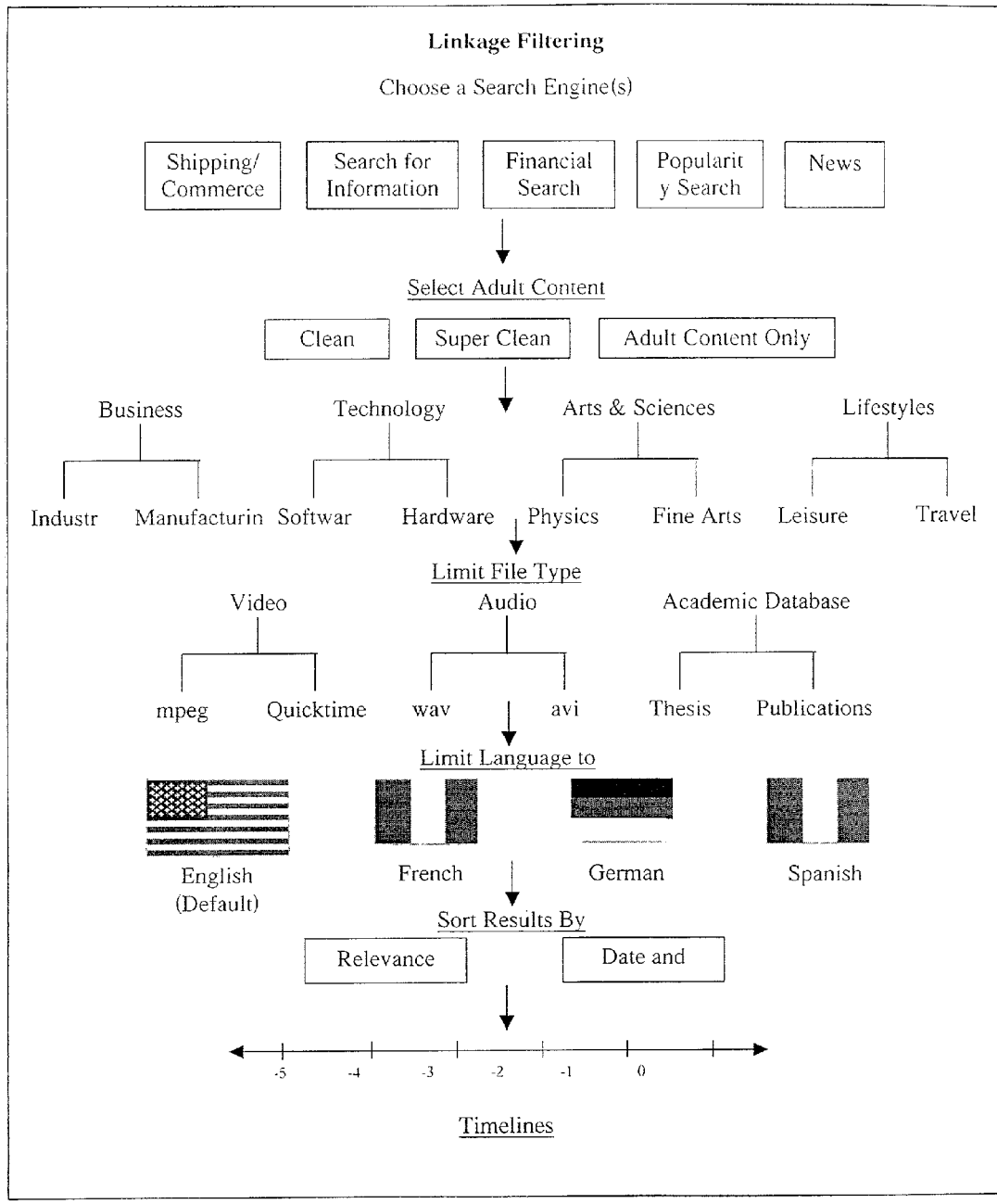
FIG. 1 shows various classes of general information that may be obtained prior to a search to define a scope.

The invention will now be described by way of the drawings, in which corresponding reference numerals indicate corresponding structures in the figure.

EXAMPLE 1

The sifting process for the user is preferably effected through two distinct phases, which are called "Presearch"™ and "Postsearch"™. In the Presearch™ phase, the user is prompted to respond to certain questions that narrow the scope of the search. For example, at the threshold, user may be asked if he or she is a shopper, a searcher for information, or both. User may also be asked how timely the materials should be, that is, should only the most recent one week or one month of information be searched, or is a longer period of search in order. See FIG. 1.

Presently, the commercially available search engines have a relatively high cost per search, due to the massive resources necessary to return results of a search across a vast database consisting of millions of full text records or abstracts thereof. The present invention addresses this problem by refining the search prior to conducting it, and arranging the identified returned records after the search. The scope of the search may be narrowed, thus reducing the resources consumed by the search. By providing a number of steps in the process, opportunities for commercial subsidy and targeted advertisement improve.

Figure 2:
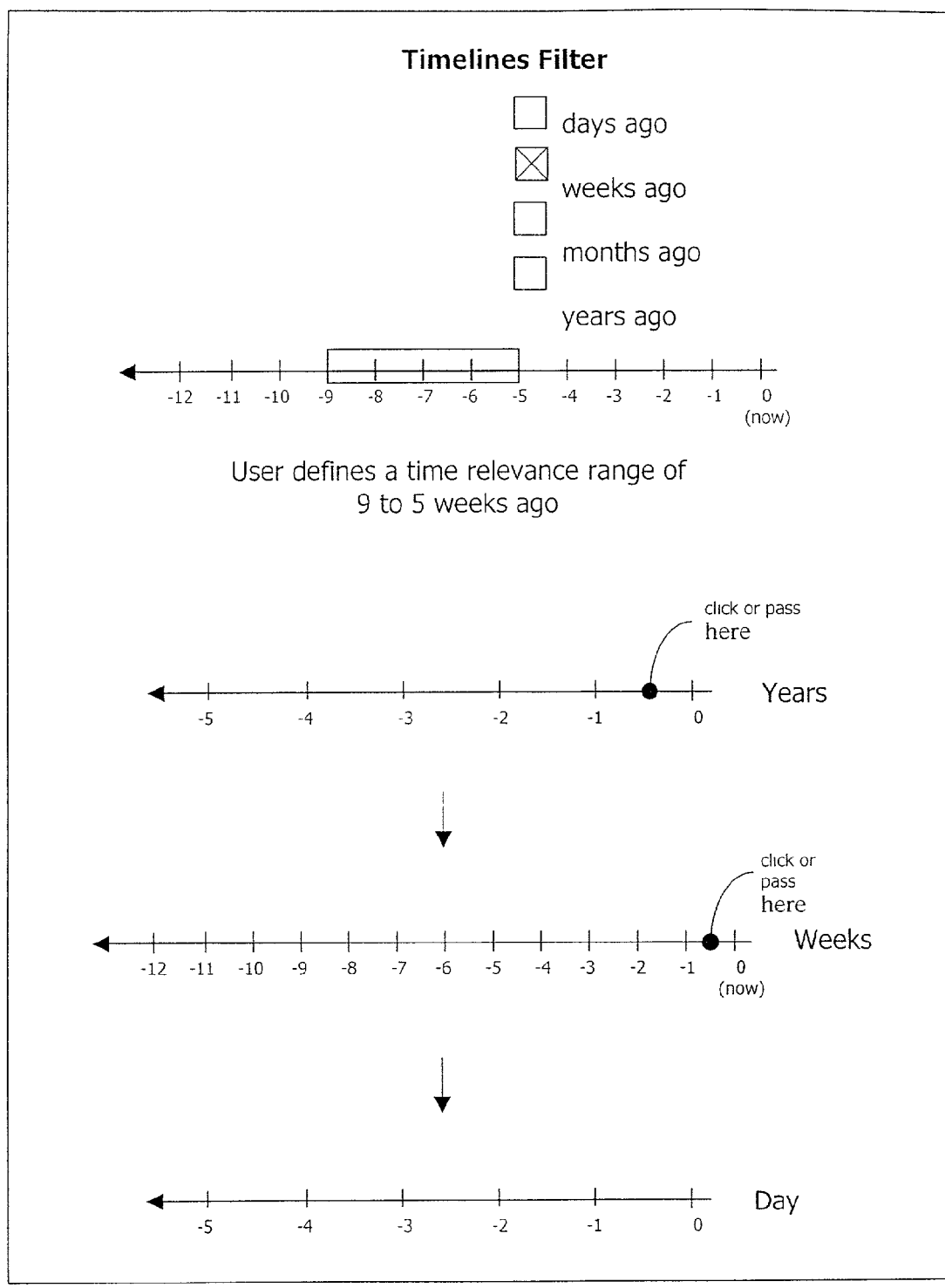
FIG. 2 shows a detailed view of a timeliness filter.

In the case of a chronological limitation or timeliness limit, the user input is preferably provided via manipulation of a graded representation portion, as disclosed in U.S. Pat. No. 5,966,126, expressly incorporated herein by reference. For example, this graded representation portion is presented as a time-line visual representation that can be operated upon by using a pointing device. A radio-control style input or pick-list style input may also be employed. As many queries are of the nature, from some past time until the present, the present time may be a default category on one end, preferably the right side (though this could be changed to a past date), and the past time would be defined by clicking on a scale that could be enlarged or opened up at key points, to show finer gradations, perhaps a logarithmic scale. Alternatively, one could click on a scale choice, such as days, months, years, decades, etc., and the scale representation could be changed. Conceivably, the time line could also be extended into the future, either to cover futurological topics, or to cover requests for information that may be provided for user in the future. See FIG. 2. In this context, it is noted that the search strategy underlying the analysis of the user input may change dramatically in either a continuum or at discrete points. For example, searching for futurological information typically requires an analysis of word tenses. For past information, embedded dates within the record, date of record accession, or other factors are important. By this logic, a futurological record may be referenced both by its date of creation and its date of "implementation". Past records may also have multiple relevant dates, for example history restatements.

In addition, it is also possible for the system to produce outputs to the user including graded representation portions, i.e., the results of a search represented, at least in part, by a graded representation object which is manipulable by the user. Thus, for example, the user initially produces an input defining a search criterion with an express or implied ranking criterion or set of criteria. In response, the system returns to the user a representation of the results that include a manipulable limiter, such as a slider bar, bull's eye concentric closed figures or pyramid, which the user may interact with to alter a discrete or continuous parameter, such as a cutoff. Preferably, in this case, the graded representation object includes a representation of quantity of hits versus grading parameter, which is interactively presented to the user within a local system, without requiring server communications. When the user has completed manipulations, the selected parameter or parameters are communication to the server, and the results (or representation of the results) communication to the user. See, for example, U.S. Pat. No. 5,966,126.

Further, it is noted that the presence of a future date as a limit on the operation may be interpreted by an agent system to re-execute the search to supplement responses either periodically or at the future date.

Figure 3:
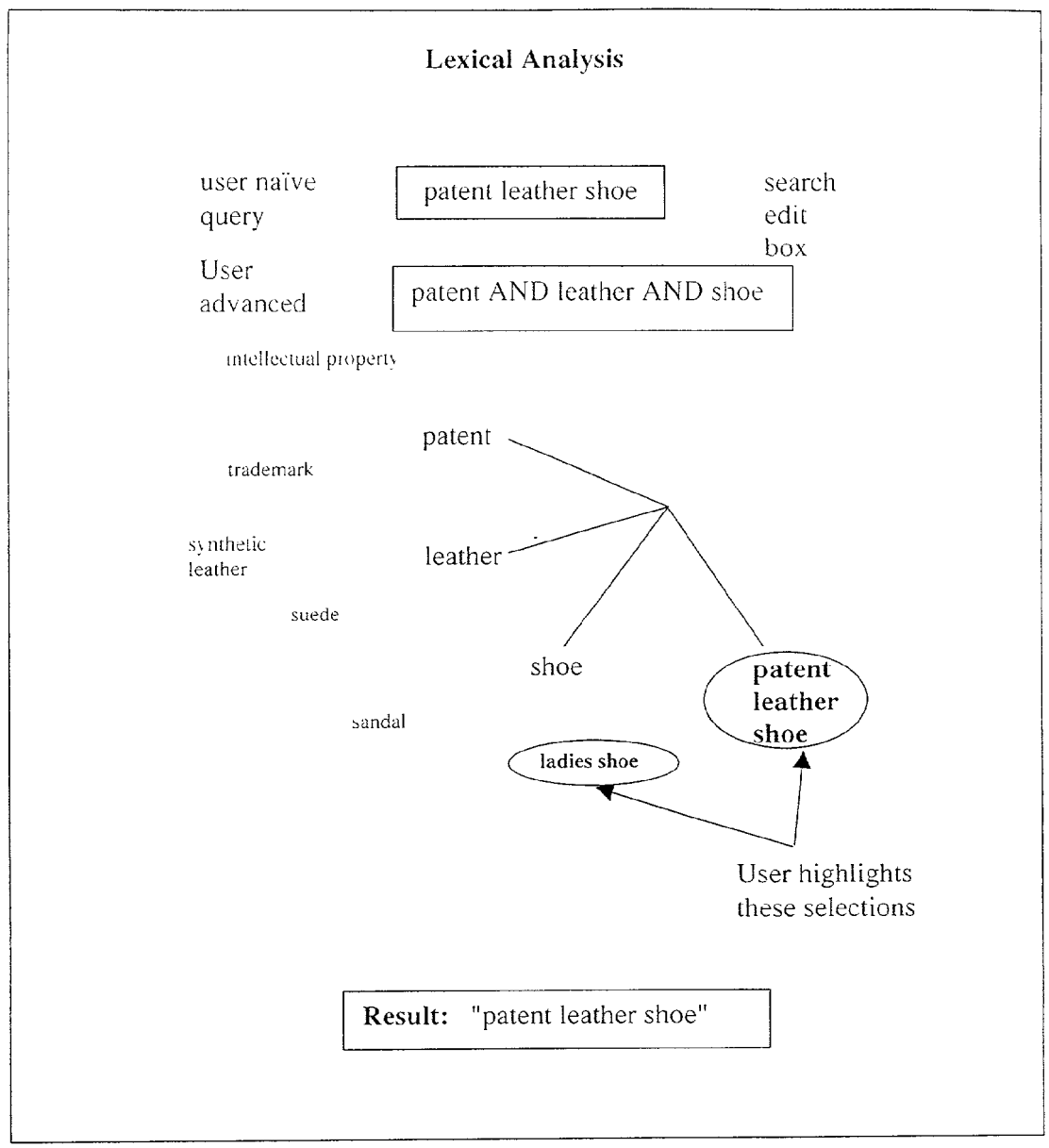
FIG. 3 shows a lexical analysis input scheme.

The invention also envisions that the parsing of a user's "naïve" query may require lexical analysis, for example services offered commercially at this time by Lexiquest, Lexeme, and others. Such parsing is also built into the major commercial search engines, with varying degrees of sophistication. So for example, if a user writes "patent leather shoes," a sophisticated lexical analyzer would be able to determine, based on studies of language use, that the user probably means to search the phrase "patent leather shoe," and not, separately, the words, "patent," "leather," and "shoe." Such choices could be presented to user, however, for user's approval, in the same manner as category choices. See FIG. 3. Preferably, the present invention exhibits intelligence, by providing semantic discrimination as a distinct step, only when there is sufficient apparent ambiguity (either over-inclusiveness or under-inclusiveness, or both), such that the discrimination is likely to be worthwhile. For example, if the semantic lexicon indicates only a single meaning, then the semantic step might be omitted to save user's time and server system resources. Alternatively, the most probable meanings, including synonyms and related words, could be defined for user, but preferably leaving the user the opportunity to inspect and modify such lexical assumptions. Then again, the lexical analyzer may parse the natural language phrase into one or more Boolean queries for search, but then display the resulting Boolean phrase(s) for inspection and modification by user. Such inspection and modification could be facilitated by a diagrammatic Boolean search facility such as the one described in U.S. Pat. No. 5,966,126. Further, this lexical analysis may be employed to rank the returned results based on relevance and the presumed intended search scope. This process could accomplish several tasks: interpret which words belong together as phrases rather than being treated separately; interpret the interaction of language parts, e.g. nouns, verbs, adjectives, prepositions, and adverbs, to form a query; for example, why are there taxes versus how are people taxed?; and interpret how the order of words affects meaning. Thus, this lexical analysis may be relatively transparent to the user or provided as an explicit step in the search process that may be manipulated or controlled by the user. However, aspects of the invention also contemplate the parsing of user's natural language inquiry into a Boolean query, e.g. including the use of the words AND, OR, or NOT. This is a process which is normally implicit, but necessary, when search engines process a user's natural language query. One distinction of the search engine according to the present invention is that user's parsed query, connected by Boolean logical connectors, can optionally be displayed explicitly to the user, preferably for user's review and possible revision, rather than being a "black box" operation in which user has no idea what connectors are assumed. One well-known database provider, for example, translates even an explicit user "OR" into a hard AND, as AND is a restrictive condition and therefore provides for a faster and cheaper search. In a preferred embodiment, through display of the Boolean expression, as parsed from user's natural language expression, integrity, reviewability, and revisability, are maintained. After parsing, the Boolean translation of user's expression can be represented textually, or through the use of aspects of the graphic user interface described in U.S. Pat. No. 5,966,126.

The invention also provides for further improvements to the graphic user interface that aid the user in more rigorously defining the search query. In particularly, as shown in FIG. 4, the user may be presented with a series of two or more distinct entry fields arrayed vertically or horizontally, the user being given the instruction to arrange words or phrases in order of importance to the search. One advantage of this approach is that it allows users to define phrases without the use of quotation marks or parentheses. In distinction, other search engines, which may allow the user to define all of the words in a single message box as a phrase, this innovation provides for the separate definition of words and phrases. The invention may also provide for the placement of logical connectors between the distinct entry fields. See FIG. 3. In this case, both rows and columns of words and phrases may be input, with columns representing distinct concepts (OR operator), and the columns together subjected to a conjunctive (AND operator) or negation (NOT operator). These positions may, or course, be reversed. The OR fields may be defined directly by the user, or interactively through use of a thesaurus or lexical function.

The use of a question mark to signify a query to the computer is well known, as for example, in askjeeves.com. However, the present invention preferably also invokes the exclamation point to indicate a directive for the server to carry out an agent function.

The user's query may be used to implement suggested relevance zones, which will be in effect zoomed-in views of a portion of a taxonomic tree. From these views, which will be displayed in the manner of a family tree within bounded areas, probably rectangles, the user will select portions that are truly relevant to the query. See FIG. 5A. These zoomed-in views would preferably be arranged in order of apparent descending relevancy. If the views are too numerous to fit on a single visible page, they may be allowed to run to further pages, with an alert to the user preferably given, but the portions most likely to be relevant should preferably be displayed on the first page. Nodes on the taxonomy that are predicted to be potentially relevant could be identified by a difference in color, a heavier impression of ink or different style of the same color, as for example a large dot, concentric circles, or other such symbolism. A degree of predicted relevance may also be shown by degree of color saturation, or through a color code, as in the case of so-called "heat grids" or other pseudocolor representations.

Figure 5A:
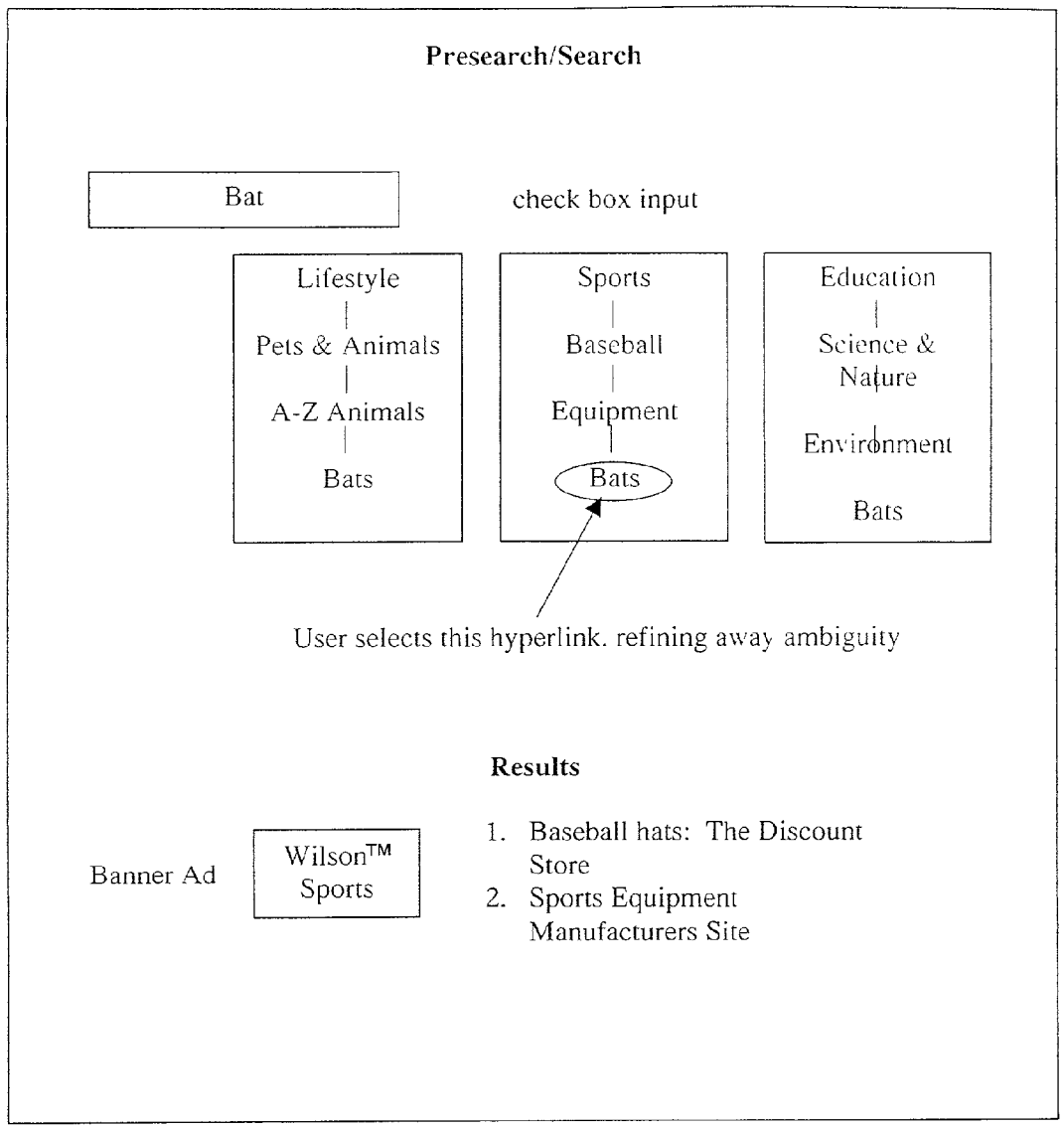
FIG. 5A shows an ambiguity resolution input scheme.

As shown in FIG. 5A, a user's choice of a particular node(s) tends to refine away (distinguish) ambiguity, which would otherwise be inherent in the use of most natural language words and phrases and many proper names. As a commercial model, this method presents several compelling advantages. First, the user has uses two "click-throughs" at a minimum to complete any search. Since the convention of banner advertising on the web tends to pay per impression on a click-through basis, the search engine business will receive two distinct impression payments in this way. Second, and more significantly, the second click-through tends to define what user "really means" by excluding at least provisionally other often plausible alternative choices that user "might have meant." The implication for context sensitive advertising is that the search engine in principle should be able to charge more for the second click-through on a per impression basis, as the context of the context is usually much better known in that case, which would tend to predict higher than average click through rates on the banner ad, in that the ad may likely be more pertinent or less offensive to user's true interest.

In one embodiment, a visual screen display generated during interactive use of the system to define a context within the taxonomy. Dual panes are provided, for example, to represent an ambiguity, for example between the word bat, meaning a flying rodent, and bat, a piece of sports equipment. In the left pane, a biological taxonomy is represented, with bats being one class of lying rodents, while certain squirrels being considered another class. Individual species are defined at the lowest level. In the right pane, the highest level is sports, while the middle level is represents distinct sports that employ bats, e.g., hardball and softball.

At the lowest level is sports equipment, which would include bats. It is noted that the relevant taxonomy need not represent the context at the same level in each instance, i.e., bats are at the mid-level on the left and lowest level on the right. Further, on the right, a bat might be represented as sports equipment under both hardball and softball, even though the bat itself might be identical. Thus, a formal rule of taxonomy that each object has a single classification is not required.

In the case of certain other search engines offering taxonomic categories, such as Yahoo.com, the user may, entering a query having large numbers of hits, receive back a list of categories and subcategories from which user may make a selection. For example, if one types in "steel" in the clue box, one is offered a choice of directory topics such as the one that follows:

Business and Economy>Companies>Manufacturing>Metal Working>Steel

Business and Economy>Companies>Industrial Suppliers>Materials>Metals

Business and Economy>Companies>Construction>Metals>Steel Framing

These categories allow users to select a portion of the taxonomically organized materials to access. However, they do not allow user, through any gesture, to see additional siblings or children. In contrast, the invention, in a preferred form, allows user, through a gesture, to "open up" the categories in order to see corresponding siblings, additional descendents, and/or more remote ancestors. Preferably, this viewing is provided by a very simple gesture, of which an effective one would be that a pointing device, if roaming over a portion of the taxonomy, pauses for a certain interval of time, such as one second, would then cause siblings to open up. For example, suppose, according to View 1 of FIG. 5E, that one wishes to see companies other than construction; one would hold the pointing device over "Construction" until siblings appeared, as shown in View 2 of FIG. 5E. In this way, the taxonomic categories, rather than being analogous to a "dumb computer terminal" view, are actively available to explore new knowledge from the taxonomy itself rather than through hyper-link to the stated categories. Such exploration of the taxonomy, particularly in conjunction with the knowledge of the size of each node, as illustrated in FIG. 5D provide valuable information and feedback to the user.

According to an aspect of the present invention, the user may "hover", or hold the graphic cursor near a screen object, to trigger a change in display, such as a change in local detail, rather than requiring a mouse click or other discrete event. With such hovering, the user can increase displayed detail to see siblings, parents, and dependents. This isn't possible, in fact, is inherently impossible perhaps, in a single root file folder paradigm. When a mouse click is triggered, a new range of vistas may be brought into view, which also can be hovered over.

In contrast to the Yahoo.com approach, the present invention suggests the improvement of creating an outline or conceptual cluster map, to eliminate many redundancies and therefore improve readability while creating a less crowded screen through the device of displaying a zoomable nested nodal network. See FIG. 5B.

Figure 5B:
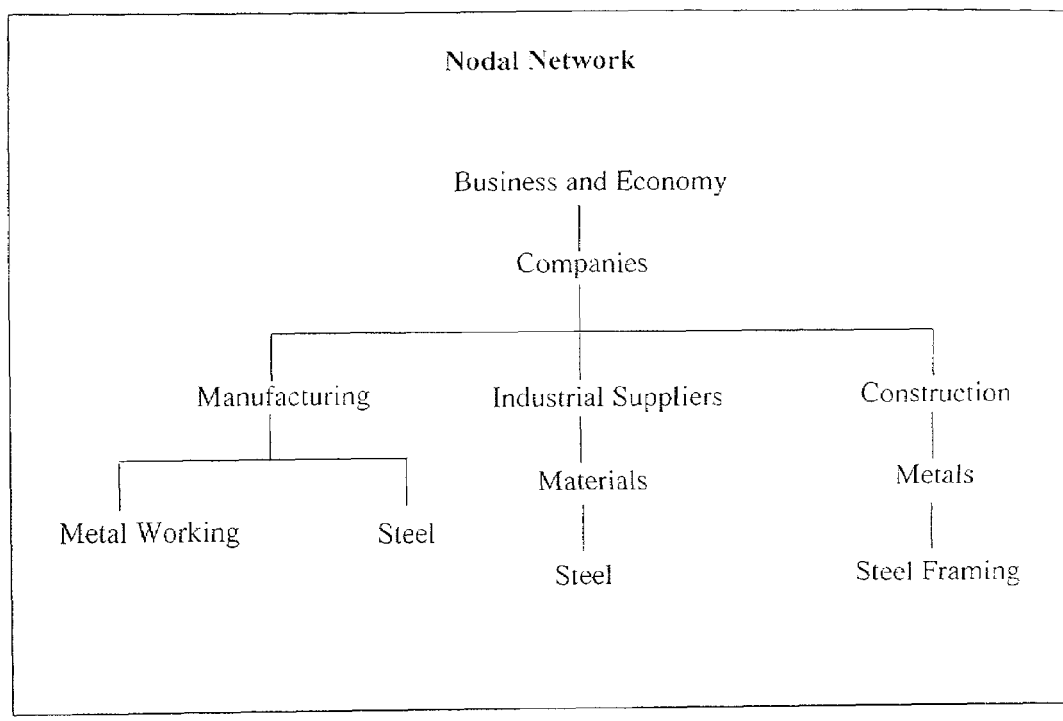
FIG. 5B shows a nodal network.
Figure 5C:
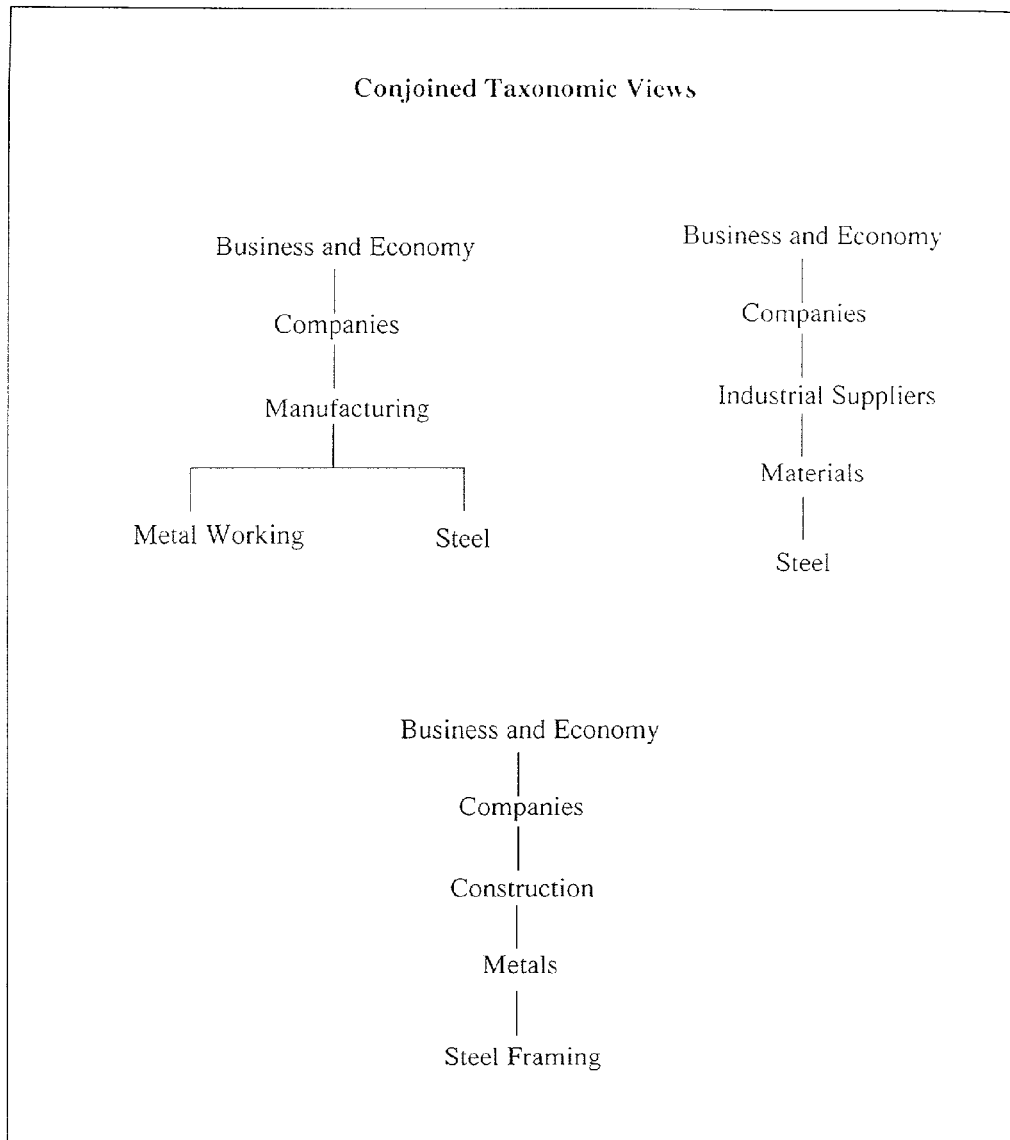
FIG. 5C shows conjoined taxonomic views.
Figure 5C:
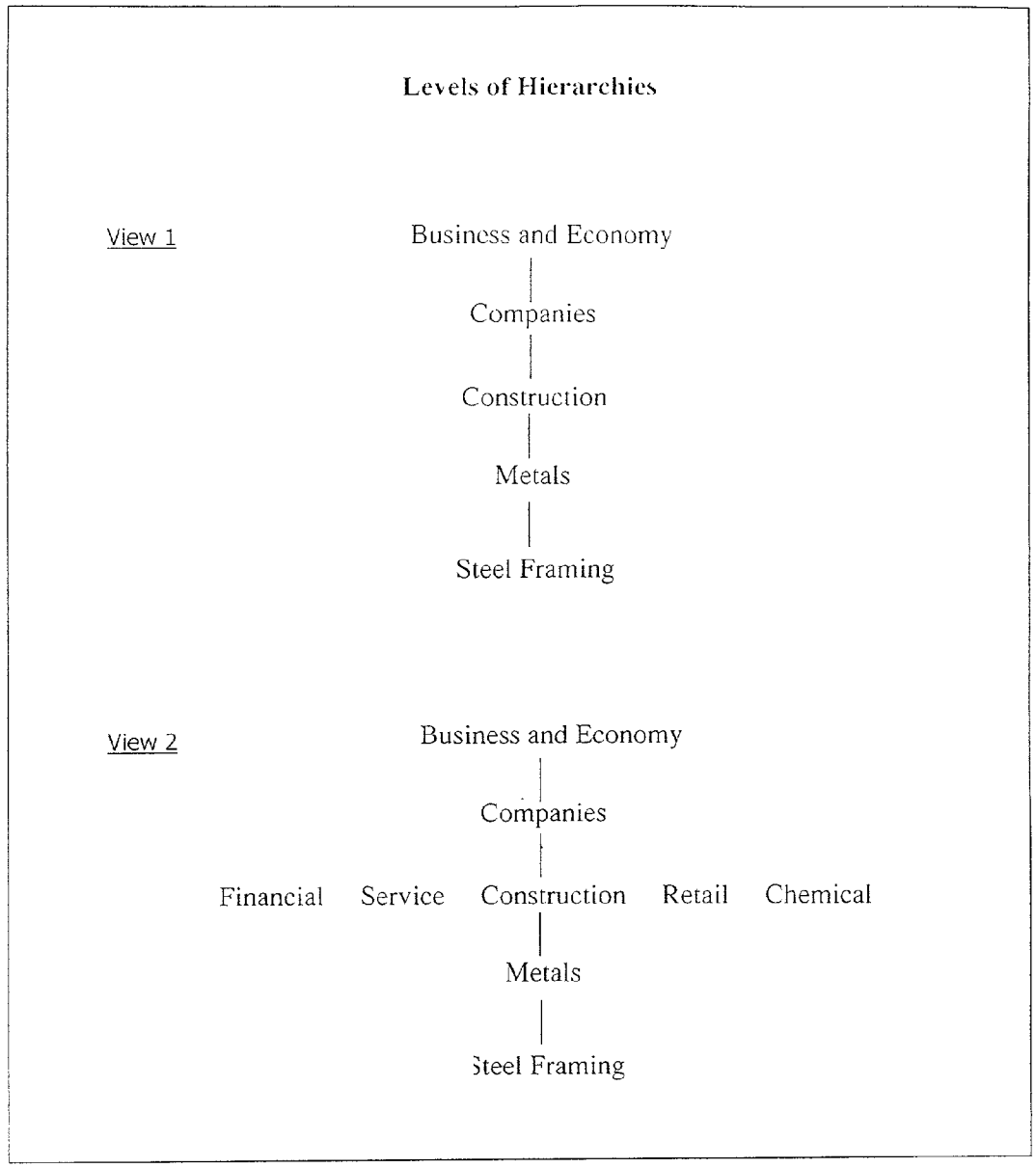

Another approach, slightly different from FIG. 5B, is shown in FIG. 5C. In FIG. 5C, zoomed in taxonomic views are only conjoined when more than one possibility exists for a relevant node at a single level of generality.

The invention may also provide that user's choice of a node or nodes within a taxonomic tree provides a useful discrimination, not only as to indexed materials classified by that taxonomy, but also relating to other materials not indexed in that, or associated taxonomies, but nevertheless digitally retrievable. This bonus discrimination is preferably implemented by intelligent selection of concepts and keywords from nodes the user selects, or from pages or web resources corresponding to or near those nodes, from which keywords and concepts are extracted, for example by a summarization procedure, which will be used to enhance a user's prior search query or define a new one. Therefore, for example, user's query might be "sports", but user selects the taxonomic node "baseball", or a web-page in which the word "baseball" is prominent; user's query string might profitably be expanded to "sports AND baseball," or just "baseball," for the purpose of a search of other materials, for example, through a metasearch procedure of other search engines. By a like procedure, OR conditions and NOT (dissimilarity) might be appended to user's query, or used to modify user's query, or replace user's query, to enhance such a follow-on search. Thus, for example, by beginning with a process of directory selection, user gives valuable information that powerfully amplifies and specifies searching outside of that directory.

In a preferred form, the tree views presented to viewer are expandable. For example, under the same string where Yahoo.com gives Business and Economy>Companies>Construction>Metals>

The user of a system in accordance with an embodiment of the present invention is presented with a zoomable nested nodal network in which "metals" is the bottom node. See FIG. 5E. In View 1 of FIG. 5e, each level of the hierarchy holds one instance. The user decides what he is really interested in exploring is various company types. The user gestures, for example by holding a pointing device over the word construction (the child) until a view appears of the siblings of "company," as shown.

This functionality requires, within a traditional browser, an applet that responds to pointing device actions in the absence of events button depressions. The applet may present for viewing locally cached hierarchal data, or automatically request this from the server. See, e.g., U.S. Pat. No. 5,964,836, expressly incorporated herein by reference.

As to nodes of the taxonomy, the preferred embodiment of the invention provides that one, two or three of the following numbers be present at all or many nodes of the taxonomy: (a) the total number of instances of database elements corresponding to this node (either real time count or a recent number), (b) the total number of database elements apparently relevant to the query corresponding to this node, and (c) the total number of apparently relevant instances in sum within any of the nodes. These numbers could be presented as a couplet, as in FIG. 5D, with the total number of relevant instances presented a single time, for example, in a box above the taxonomic tree. These numbers might be of great value to a user in determining when to open up hits. If the number of all instances, or of apparent relevant instances, is "just right," user may then turn to opening it; if too few, back up a step or two; if too many, carry on with further steps. This technique is relatively efficient with respect to database server usage, wherein retrieving hits incurs a major cost, while tallying potential numbers of hits is relatively low cost; that is, identifying a number of potentially relevant hits references the index volume only, while retrieving records requires access to the entire database.

The invention also contemplates, as an alternative to a strict "full-zoom" view of a portion of a taxonomic table, a hybrid zoomed-in, "fish-eye" view, as with the fish-eye lens of a camera. Such a representation may include hierarchical clustering, whereby nodes are grouped into clusters, and clusters may themselves be placed into other clusters. Users can then navigate these clusters until a desired level of resolution or scope of content is reached. The fish-eye view can then be produced by a special "variable-zoom" algorithm, as described in D. Schaffer et al., "Navigating hierarchically clustered networks through fisheye and full-zoom methods," ACM Transactions on Computer-Human Interaction, Vol. 3, No. 2 (June, 1996), pp. 162–188.

The present system not only permits visualization of multiple roots simultaneously, but can also use visual tricks to create an impression of focus, just as with ordinary vision. This could be a fish-eye effect, blurring on the edges like peripheral vision, bolder type or larger size or different colors for focal points. Several focal points may be viewed simultaneously. Further, focus can be changed by a hovering action rather than generating a pointer event (mouse click).

Figure 6:
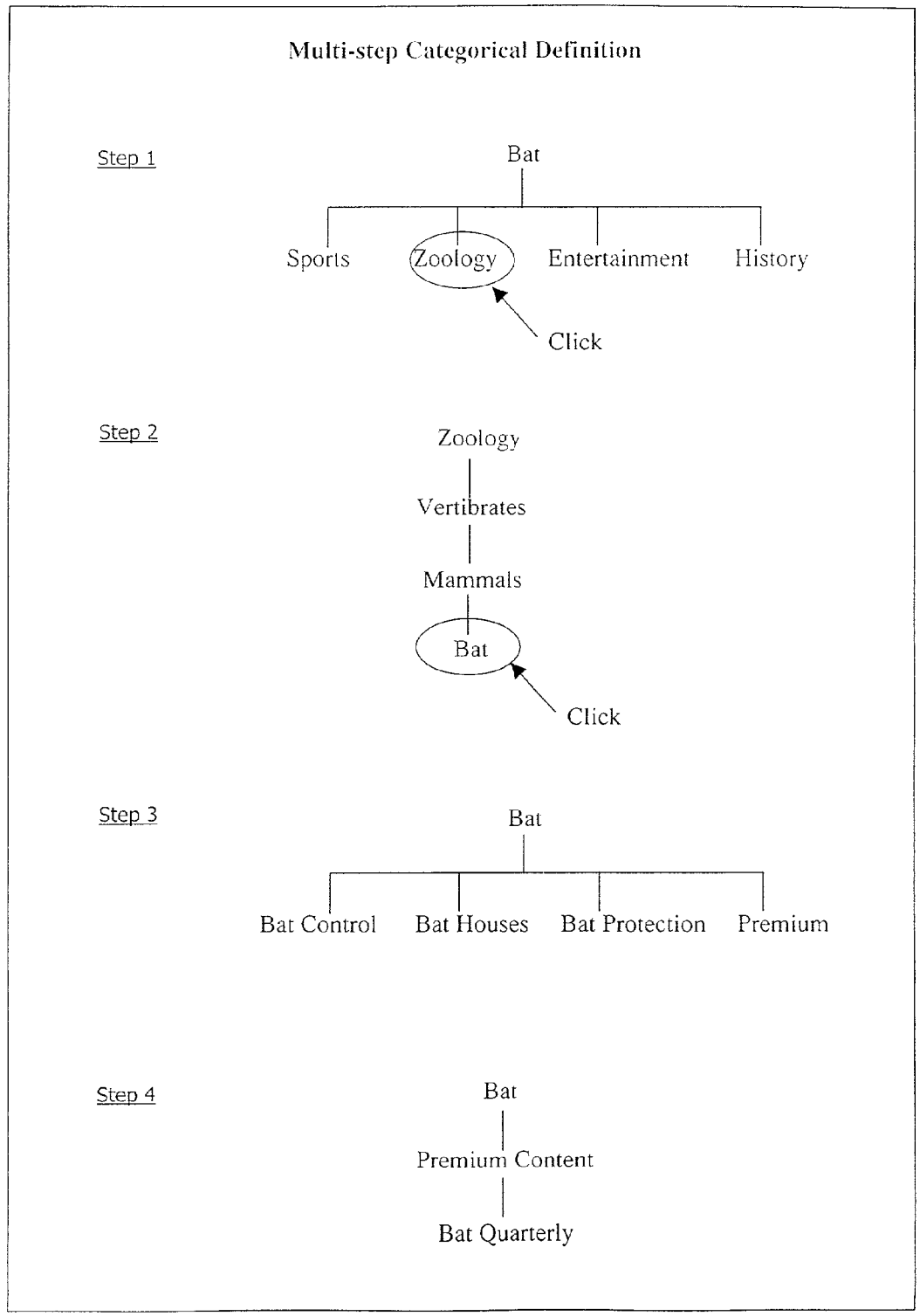
FIG. 6 shows a multi-step categorical query definition.

Of course, the process by which a user defines a node or nodes of interest within the taxonomic categories need not be limited to a single step. See FIG. 6. As the user selects nodes of interest, further taxonomic choices are presented. These choices could be more detailed instances of the subject that fall below the visible entries shown and are opened up for more detailed examination. Alternatively, these new taxonomic representations could be miscellaneous elements of the database that may be of interest to the user. One basis for predicting such collateral elements that might be of interest to user would be a model based on collaborative filtering of others users' interests; for example, of those users who have shown interest this node (these nodes), what other nodes were of interest to them? The contributions from such other users might be based on their explicit or implicit recommendation. The process of laddering down or around categories would be limited either by exhaustion of the user's needs or interest, by exhaustion of the database resources, or by an arbitrary limit such as number of steps allowed. Such arbitrary limits prevent abuse of the system while providing most normal users full access. It is also possible that the limits applied are dependent on compensation, for example a subscription level, acceptance of advertising (e.g., banner advertising), filling out a demographic profile, permitting tracking to other sites, etc.

The storage at server level of user patterns of search, both informational and commercial, and particularly the pattern of items purchased or sold, becomes particularly valuable as a database in itself. Because an aspect of the invention creates a process for allowing the user to carefully define a search, the value of the resulting data about the search becomes correspondingly greater. In relation to particular advertisers and merchants, the data can become a goldmine of insight into the "segmentation" of their product, that is, what kinds of individuals or groups or geographical areas favor this product. The value also runs in the opposite direction: that is, as the search engine is familiar with the habits of particular users as individuals or as members of groups, it can direct context sensitive advertising to such group with greater efficiency than a less accurate search engine.

A context-sensitive facility is provided for relating advertising content (and possibly compensation scheme) to the query, nodal position within a hierarchal tree, search results, past searches, past activities, or individual or group characteristics of the user. Thus, the advertising may be optimized in some manner to best appeal to the user, while producing the maximum perceived benefit to the advertiser.

In another embodiment of the invention, a user has a choice of a series of general or categorically organized web databases of increasing size in terms of web documents encompassed. Each increasingly large set will have greater size but lower overall measured "quality," where quality is defined as predicted relevance for queries propounded by most uses. The user could make the tradeoff himself or herself. Alternatively, a query may be processed first through a small, high "quality" database, and if the resulting set of found documents is too small, measured either subjectively or objectively, then user would be bootstrapped up to a higher level of size and lower level of average quality. This method differs from techniques that perform a search on a complete database and then return a limited number of records ranked in order of "relevance", in that the distinct databases provided are preselected for "quality" level. Both techniques may therefore be separately applied, i.e., selection of database and ranking with truncation of displayed records.

Another aspect of the invention provides a system and method wherein a user finds a site or document of interest. A Summary is automatically prepared, which may then be edited or modified by the user. The user may then ask the search engine to search for like documents on the web, based on keyword or phrases from this Summary. Likewise, the summary may define a predetermined or ad hoc taxonomy, which may then be edited or modified by the user, the system then populating the taxonomy with defined or referenced objects.

Figure 7:
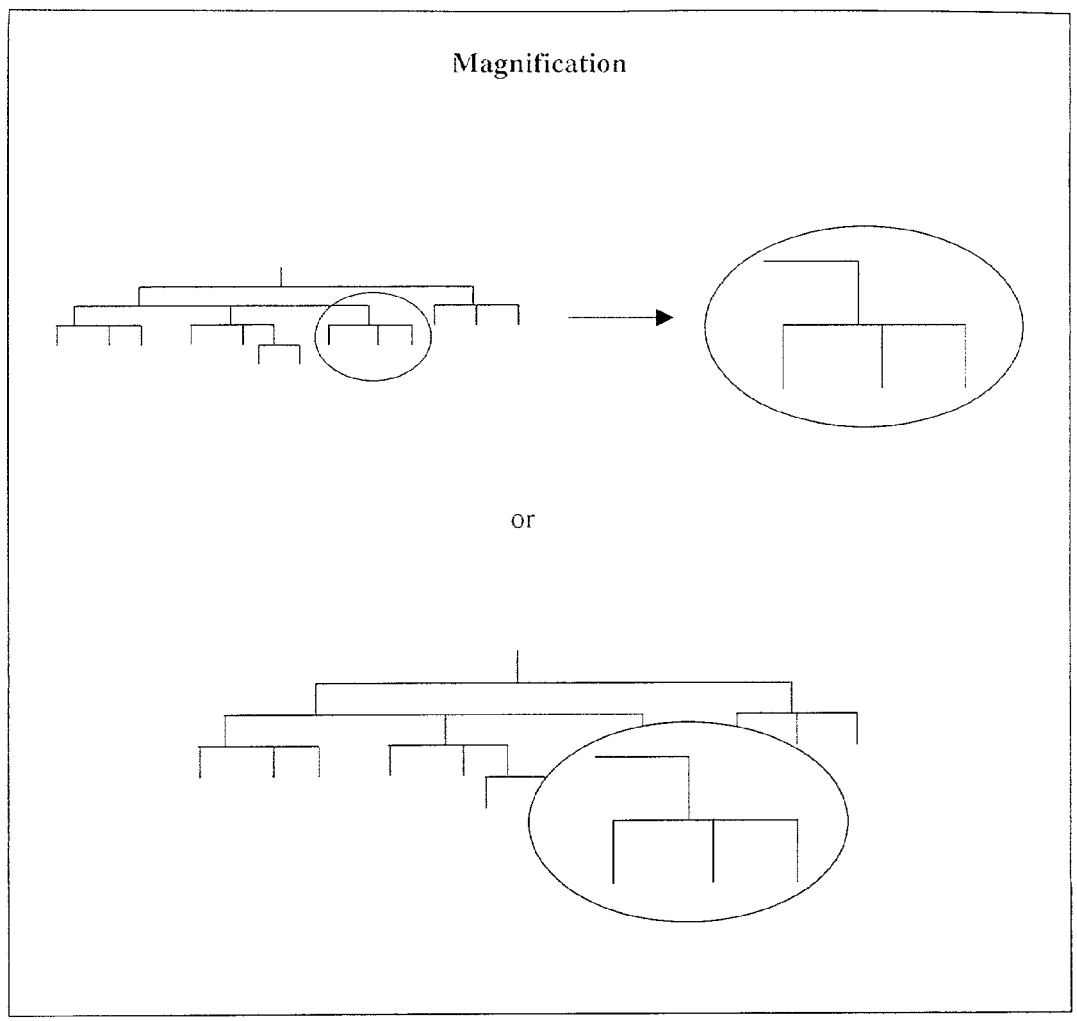
FIG. 7 shows magnification of a nodal network.

Because aspects of the present invention envision displaying useful information in a pictorial format, and because this format may sometimes require the use of small type size, or may be used by the visually-impaired, the invention preferably provides that as one passes a cursor over an area of interest, that area may be enlarged, as if passing a magnifying glass over that area. This technology is known and at the present time can most readily be applied via the browser. In an extreme case, even an entire taxonomic tree could be presented at once, and one could zoom in on certain highlighted areas of potential interest, as an alternative to the model of separate zoomed-in areas representing portions of the taxonomy. See FIG. 7. This scheme effectively allows multiple scale representations of the taxonomy without further reference by the client to the server.

A user may also wish to adjust certain settings for relevancy, as provided in U.S. Pat. No. 5,966,126 (the sliding controls or mixing-preamp visual representation). As explained therein, such factors as conceptual relevancy, proximity, linkages, blockmodeling, presence in title, popularity of site, duration an average users stays on the site or others, may be weighted by a user as to their proper importance in the relevancy model for this inquiry or group of inquiries. If the user, for example, strongly favors the popularity model, user might set this control to the maximum, and others at zero or lesser levels, in order to see the most popular sites first. In the case of a search for commercial content, other factors, such as price, quality, availability, guarantee, consumer or expert ratings, could be the critical relevance variables.

Also, in the course of a metasearch, a user may wish to determine the weighting of individual search engines or search approaches, in which the user may be given the option to do based on 1) an explicit weighting of individual search engines, 2) through a weight of search approaches associated with individual search engines, 3) through a ranking of certain desired qualities, such as speed of search, comprehensiveness of database, or richness in certain content such as video. For example, the Google™ Internet search engine is associated with linkage analysis, Alta Vista™ with keyword analysis, and Direct Hit™ with popularity analysis. A user may thus rank as follows, Google 10, Alta Vista 7, and Direct Hit 6. Alternately, a user might select, Popularity Analysis 10, Linkage Analysis 9, and Keyword Analysis 6. The numbers cited could correspond to explicit input or, for example, positions of sliding controls or other analog like devices, as illustrated in U.S. Pat. No. 5,966,126 and U.S. patent application Ser. No. 09/353,305, expressly incorporated herein by reference. Similarly, the user may have in mind other variables that may be controlled by sliding controls, normally expressing continuous or analog variation, or stepped variation, but in some cases also bipartite choice. For example, a search for a certain manuscript could be by length, rated originality, and keyword proximity; a commercial search might be by price, quality, reliability; a chemical search might be by core chemical structure, substitutions from a generic structure, atomic weight, hardness, or valence.

Yet another improvement provided by the present invention involves the separation of web documents with adult content, particularly erotic content. The nature of this problem is binary: in most cases—a user either is or is not searching for erotic content, generally not both simultaneously—is not well dealt with today by conventional search engines. A search of the phrase "dog AND pony" on many sites brings forth significant bestiality content, but also information on pets and animal husbandry. The present invention may provide, as is known in the art, a technique for filtering out most erotic sites. Such techniques typically involve searching for sexually oriented key words. However, the present invention might also provide for the filtering out of violent content through a search for repeated violent key words. By analyzing not only the words on (or embedded in) the web page, but also the surrounding context, including other pages within the site, cross references from or to the subject page, and possibly non-semantic content attributes of the page, filtering decisions may be made. Thus, the hierarchies may serve the purpose of both pass and reject filtering of information.

On the other hand, in respect to adult users' legitimate First Amendment Rights to view adult content, the invention also provides a means whereby all non-erotic material can be filtered out. Preferably, such searching would be through a path that checked to make sure that minors are not entering, and preferably it would require an affirmation or test thereof, such as credit card verification. In effect, one could also have a dual search engine, in which adult content is walled off in this way, or one could have a unitary engine that provides both erotic and non-erotic content, or one could have a stand-alone search engine for either erotic or non-erotic content. It is estimated that over half of web usage in the United States comprises searching for erotic content, so these measures would represent a significant improvement. In like manner, other defined interests may be accommodated, such as on-line musical resources, including MP3 files. In similar manner, "legal" (properly licensed) musical content and "illegal" (pirated or suspected pirated) content may be segregated using an intelligent filtering technology.

The user, having refined the scope of the search through the Presearch™ process, then proceeds to submit the search request. This will be in the form of a natural language inquiry, or for advanced users, preferably through the Boolean graphical interface described in U.S. Pat. No. 5,966,126. During the latency period while user waits for results, which typically would be about ten to twenty seconds, the user will be prompted as to whether there is a category under which any useful results should be saved, either as pages or as hyper-links. In order to provide compatibility with normal web browsers, this intermediate function may be implemented by an applet or helper application, so that the HTTP communication session is not interrupted, nor the available bandwidth hogged by ancillary activities. Alternatively, the user may choose from categories suggested by the server, those categories being driven by the portion of the taxonomy from which user selected a sub-domain for the search. As the user progresses with this and other searches, he or she will be encouraged to develop one or more personal zoomable nested nodal networks, around which the user may organize useful web or other resources, including files from the user's own computer. It may be suggested to the user that a useful model for such organization may be different vocational, avocational, and familial interests of the user; alternatively, the organization might be by subject matter fields, by chronology, by alphabet, or some combination thereof. A taxonomic hierarchy based on a known classification of knowledge may also be provided, which optionally may be modified by the user. The user would be free to draw links among segments of the tree both horizontally and vertically, and the lines could have various meanings and graphic characteristics, e.g., solid and dotted, depending on a characteristic of a connection, and indeed the nodes and lines may have multiple graphic characteristics which are either continuously or selectively viewable, representing more complex organizational principles. This organizing device will henceforth be called the "Little Tree"™.

However, as the latency period between the submission of the refined search request and the receiving of information from the server may be quite short, owing either to the advantages of the present invention in refining the query, or owing to the availability of massive processing power [as for example now experienced at the site of Fast Search, whose URL is www.alltheweb.com], then the activity of saving web favorites and other files can be usefully postponed until the Postsearch™ process. In this case, the user could be apprised of a very short waiting period through the use of a clock, in which the estimated brief waiting time could be given. The invention also envisions that Little Tree™ can be a freestanding web-appliance, or licensable module, to save one's favorites.

Thus, the functionality of Little Tree™ may be provided as a separate application that is usable in conjunction with the web browser and operating system, and indeed which treats both local files and URIs as objects to be organized and represented.

Further, although preferably a user is presented with hits after completing the definition process, the invention also provides means in which hits can be provided at each stage of definition, based on a best guess of user's intent up to that point. Thus, very common queries or tasks may be accomplished through a single search interface. Thus, for example, maps, telephone and address directories, personal information, e-mail, and the like, may all be integrated into a single interface or portal.

Figure 8:
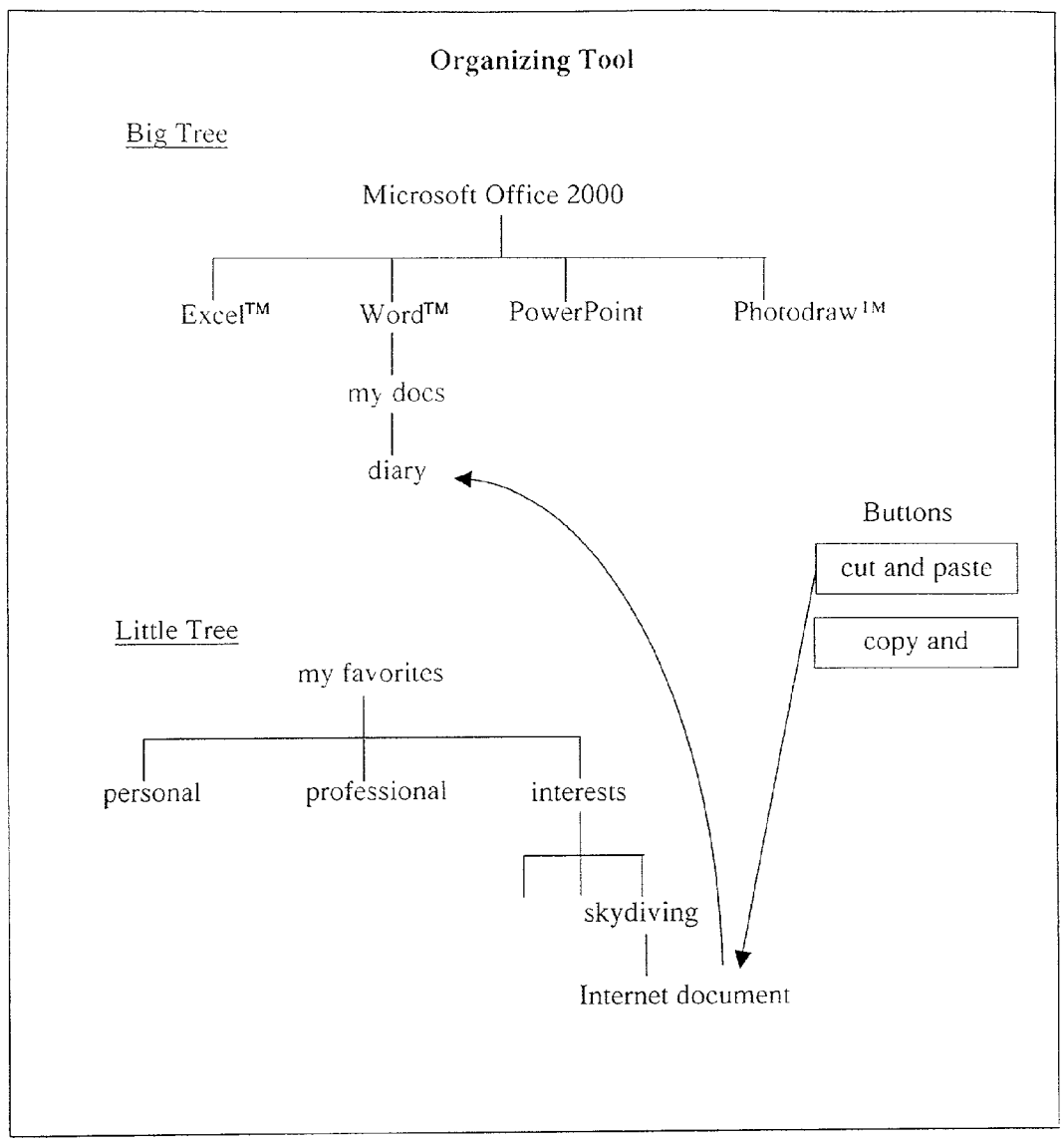
FIG. 8 shows use of the nodal network as an organizing tool.
Figure 9:
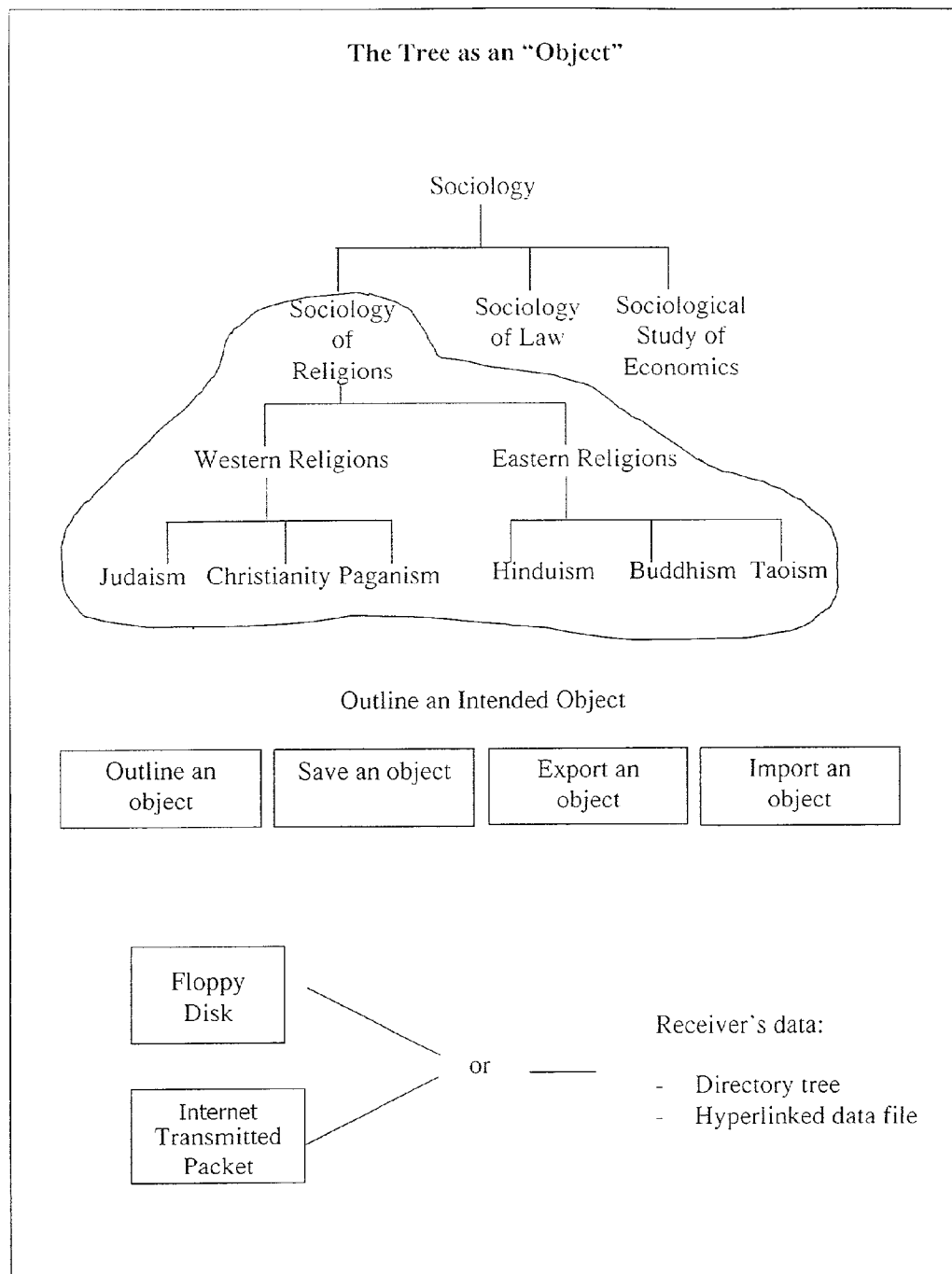
FIG. 9 shows a representation of a nodal network as an object.

Concerning the process of saving favorites and other files and materials in the user's personal tree format, the invention also preferably involves—in its so-called "Big Tree"™ format—giving the user the ability to translate the user's computer directories, such as may be stored for example on a hard disk or elsewhere, into a zoomable nested nodal network format. This application could be run at any time, online or offline, and would provide an improvement over functionality of such tools as the Microsoft Windows Explorer or NT Explorer, or equivalent services of other operating systems such as Macintosh, Linux and Unix, by allowing user to add, move, delete, review, and revise contents using a tree format rather than such other formats as file folders and sub-folders. Once again, the entire tree could be navigated on, as if a big map, as user moves a pointing device to "explore," or certain zoomed-in areas could be identified for exploration by a user command or gesture, or by response to a user query. Preferably, the user could set the pointing device in a move mode when user wished, to facilitate moving items without keeping a mouse button or analogous device depressed, so that items could be picked up and a dropped off with single clicks, to facilitate ease of use and accuracy. See FIG. 8. The user could therefore take web favorites from a search result and embed them in user's Big Tree™. Thus, a seamless integration of the personal computer and Web resources can be achieved visually. It is noted that the Big Tree™ may be persistent or transient; for example, a Big Tree™ may be constructed for a project, and eliminated from the user's current sphere when the project is completed. The Big Tree™ may be formulated as an object which may be transmitted, and thereby permit exploration and/or modification by various users. See FIG. 9. In addition, for topics of common interest, the server may store preformulated zoomable nested nodal networks, which are transmitted to the user. Thus, in contrast to present systems for conveying information, such as Lotus Notes, a zoomable nested nodal network organization can be transmitted with data files, such that the receiver of information has an experience analogous to opening up a private web site custom tailored for a particular purpose; indeed, the present invention also provides that such zoomable nested nodal networks could then be saved in a form from which they can be publicly or privately retrieved from a specific URI, i.e. a "web site." The invention also envisions that the Big Tree™ application, or a Little Tree™/Big Tree™ combination, could be a free-standing or licensable web appliance or application that would offer an alternative to services provided by such appliances as Internet Explorer and NT Explorer, with the enhanced functionality offering an improvement over those alternative appliances.

Advantageously, a user may be given the option to have a Summary prepared of the user's own files, for example, as residing on the hard disk of a computer or on peripheral device, or stored remotely through the Intranet or an extranet, either as a useful precis in itself, to be saved or disposed of as needed, or also as a way to generate keywords and key-phrases that can facilitate automatic organization and placement of objects in a taxonomic scheme or tree or other conceptual map.

One advantage of the present invention is that, in contrast to the file folder metaphor provided by known graphic user interface operating systems, the present tree-based metaphors permit an n-root visualization, and therefore overcomes many of the inherent limitations of the prior systems. File folders encompass only a single root, and if viewed from a different root, the entire view changes. An n-root visualization of a tree metaphor provides the ability to visualize multiple parents and children simultaneously. In the case of a radial organization, multiple centers may be visualized. Further, the tree metaphor is consistent between the file operating system and the Internet, with URIs and local files being treated potentially equivalently. File folders also are limited to a single, hierarchy, with the possibility of cumbersome aliasing. In contrast, the tree metaphor according to an aspect of the present invention permits multiple distinct hierarchies to be represented.

Figure 10:
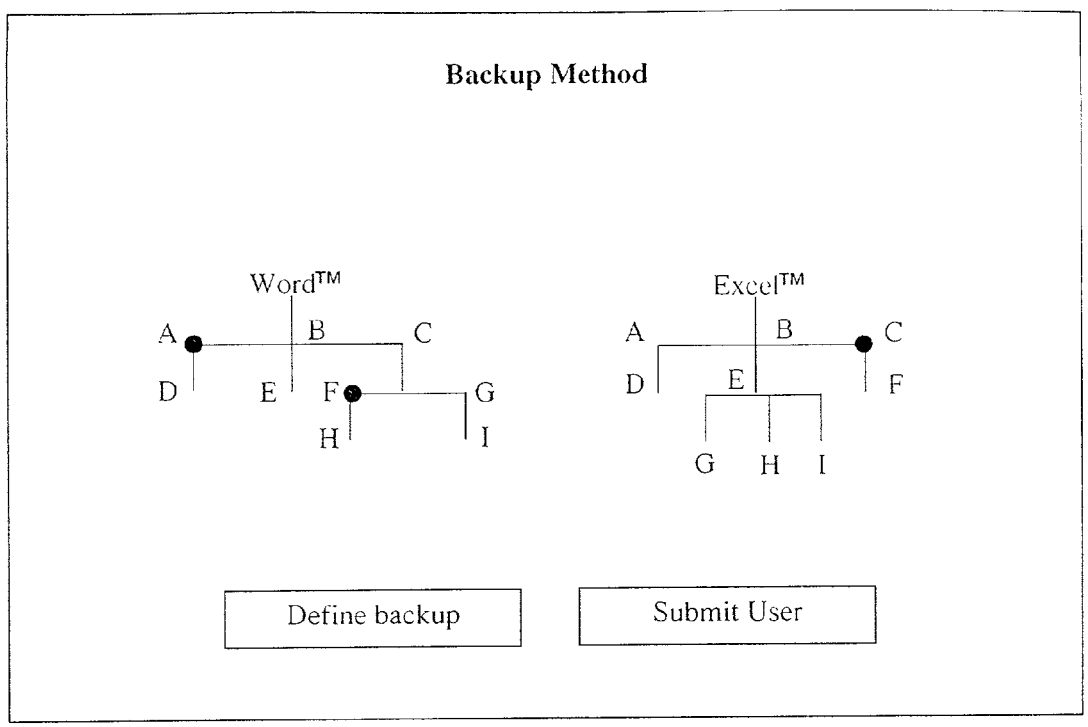
FIG. 10 shows a representation of the nodal network used in a record or file backup method.

A special feature that would preferably be embodied in both the Little Tree™ and the Big Tree™ relates to backup. In that case, a user would be able to employ a gesture of the user's pointing device to identify nodes on the zoomable nested nodal network that require manual or automatic backup, transfer, burning onto a CD, or other individual or aggregate operations, such as input/output, printing, processing by an application, or the like. This operation could then be performed by a simple command. Further, sets of such backup maps could be saved to provide a template for future backups. Finally, an imaging could be done of an entire disk or portion of disk or partition using Big Tree™, where the Big Tree™ format would be recorded on the storage device, so that user or others could see the organization of the backup up data as a graphic file with the stored data. See FIG. 10. The present invention also provides this backup system as a freestanding or licensable web appliance or module.

Figure 11:
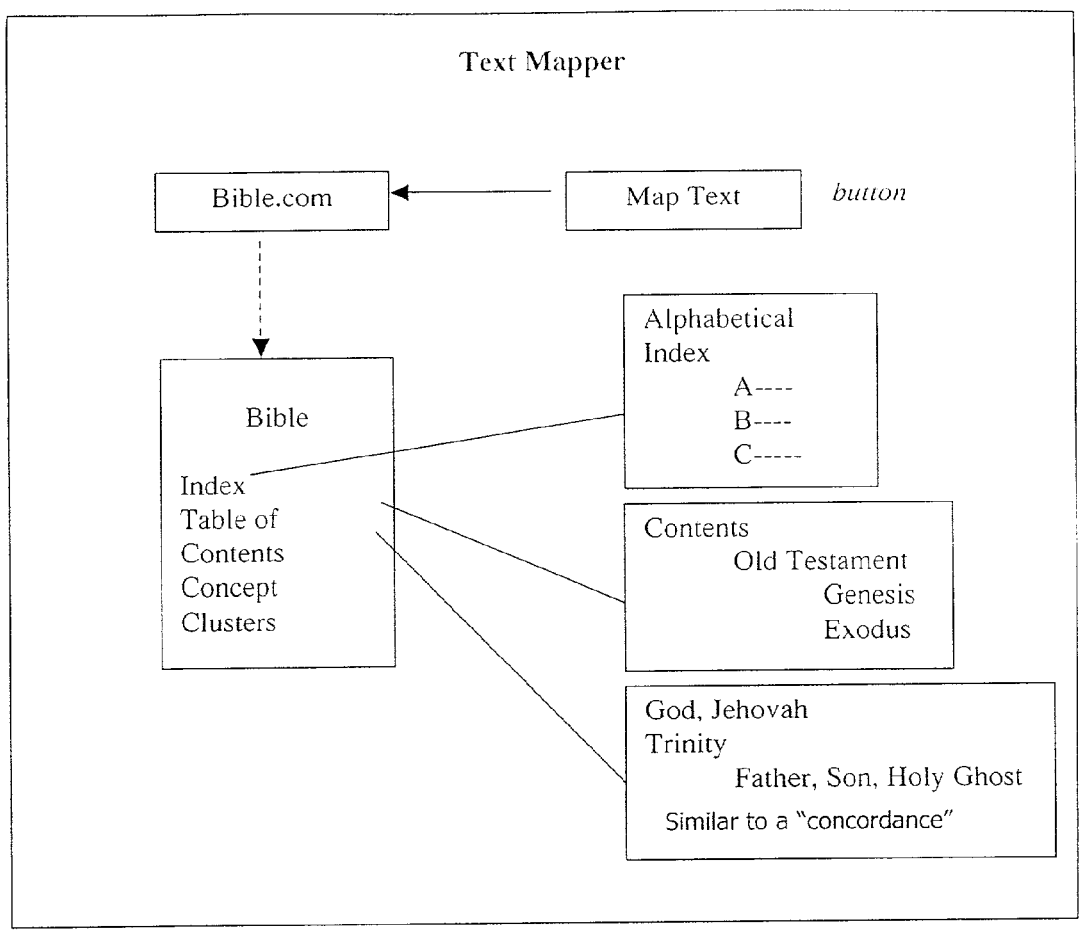
FIG. 11 shows a text mapping function.

As a set of textual data is loaded into the server, a text mapping process or Summary may be implemented to form an outline, index, and table of contents or conceptual cluster map of elements of the text. This mapping may be performed based on the embedded formatting within the source document, such as typeface, size, font distinctions, indentation, inherent outline notation, preprepared site map or table of contents, as well as by linguistic methods such as word frequency, grammar, and context. This text mapping process may be expressly initiated by the user, referring to a specific set of text, or as a result of incidental or automated access to the text documents, such as when caching search hits. See FIG. 11.

The present invention also permits replacement of a user's virtual desktop in a graphic user interface operating system with a different paradigm for accessing objects. This paradigm is represented by a hierarchal tree in which references to objects of various types, as well as navigational linkages between objects, are defined. The structures represented in this paradigm may themselves be transmitted as objects. In this system, the hierarchal linkages between various objects can all be represented on a single plane or level, facilitating visualization of the interrelations. Further, each object of the hierarchy may be an iconic hyperlink, allowing direct relation between the visualization and implementation. This is similar in some senses with the nested menus as implemented by Microsoft in Windows 95/98 systems; however, according to the present invention, rather than being a part of a program or operating system, these are used dynamically by applications and employ data files that are transmitted.

Figure 12:
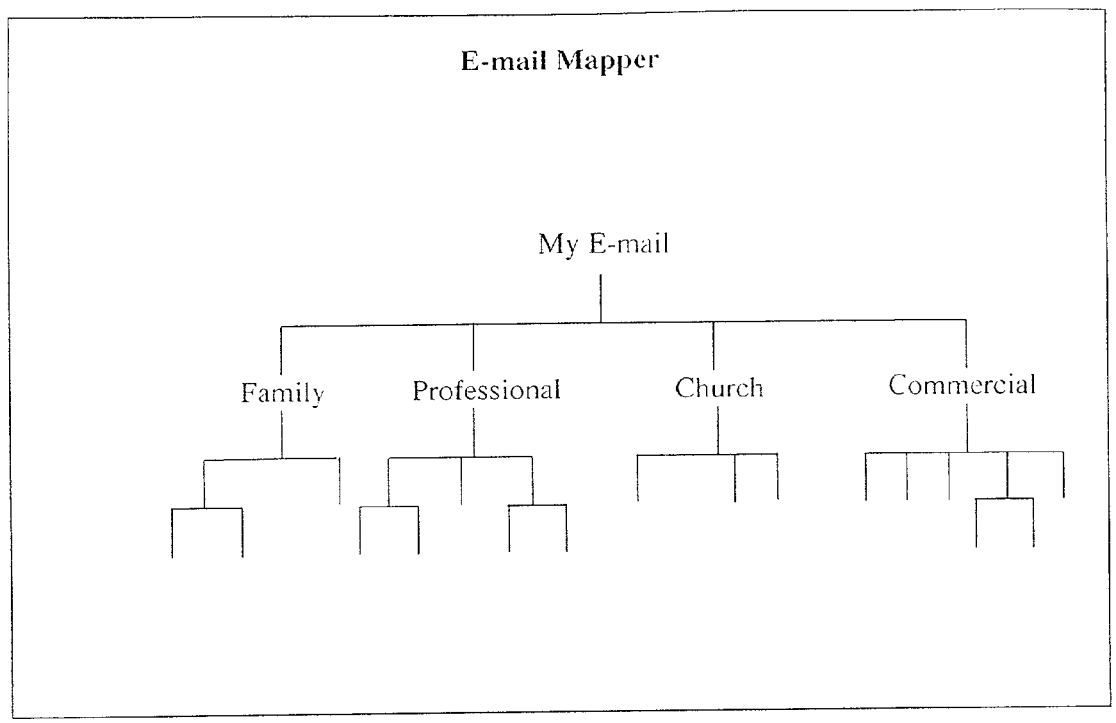
FIGS. 12 and 13 show an e-mail mapping function.

In similar manner, e-mail communications, documents and data files, and other groups of objects or icons representing objects may be organized with expressly recognized interrelations using a hierarchal template. Objects in inventories, catalogues, auctions, organized or informal exchanges, and collections represent other suitable objects for organization with such a template. E-mail communications are of special interest, since they have many common features, and are often organized through an application program separate from the operating system. Therefore, the hierarchal organization may be maintained in a virtual file space, without requiring separation of the e-mail files as distinct objects within the operating system. See FIG. 12.

Figure 13:
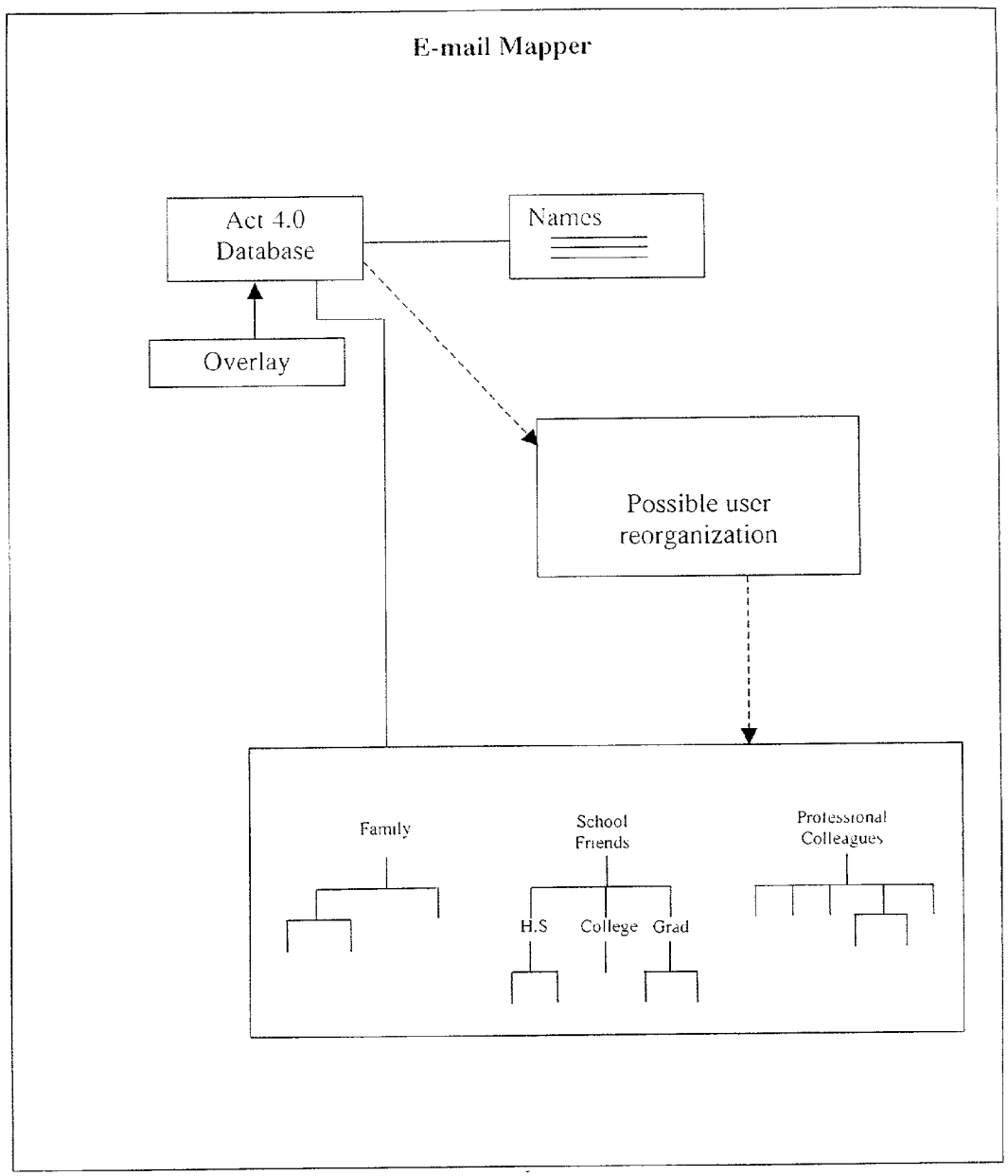

The invention also provides preferably that both Little Tree™ and Big Tree™ can accommodate the needs usually served by a Personal Information Manager (PIM). A PIM, generally speaking, is a relational database of a person's contacts and calendar, which helps the user to save data such as phone numbers and addresses of contacts, record a log of activities, communicate via fax, e-mail, or traditional mail, create addressable labels, write form letters, etc. The present invention therefore provides preferably for a PIM Tree™ that user can organize user's contacts in the familiar form of a branched tree (or one of the alternative visual representations provided herein, including hub and spoke, outline, and conceptual cluster map). In this way, the zoomable nested nodal network representation or like representations become the unifying metaphor, and a grand simplifying and clarifying device according to this aspect of the invention. The present invention also envisions that such a PIM Tree™ could be placed on top of or work in conjunction with existing PIM's such as ACT 4.0. That is, the invention provides either for a specific PIM implementation, or it provides user with an interface to various PIMs, one of which may be user's PIM prior to adopting the invention. The invention also envisions that the PIM Tree™ could exist as a freestanding or licensable web appliance. See FIG. 13.

In the case of PIMs, the present invention provides particular advantages over the limited arrangements of data available from traditional applications. For example, ACT 4.0 allows a user to sort by city, name, organization, and define a new list. From these, a group can be defined. The present invention, however, allows definition and use of several ways of organizing simultaneously. For example, a database of friends may be organized according to degrees of social separation and according to degrees of physical separation. The user may, for example, hyperlink from any one form to another, and slice off levels of generality from a hierarchy, define it as a hierarchy, and transmit it.

Figure 14:
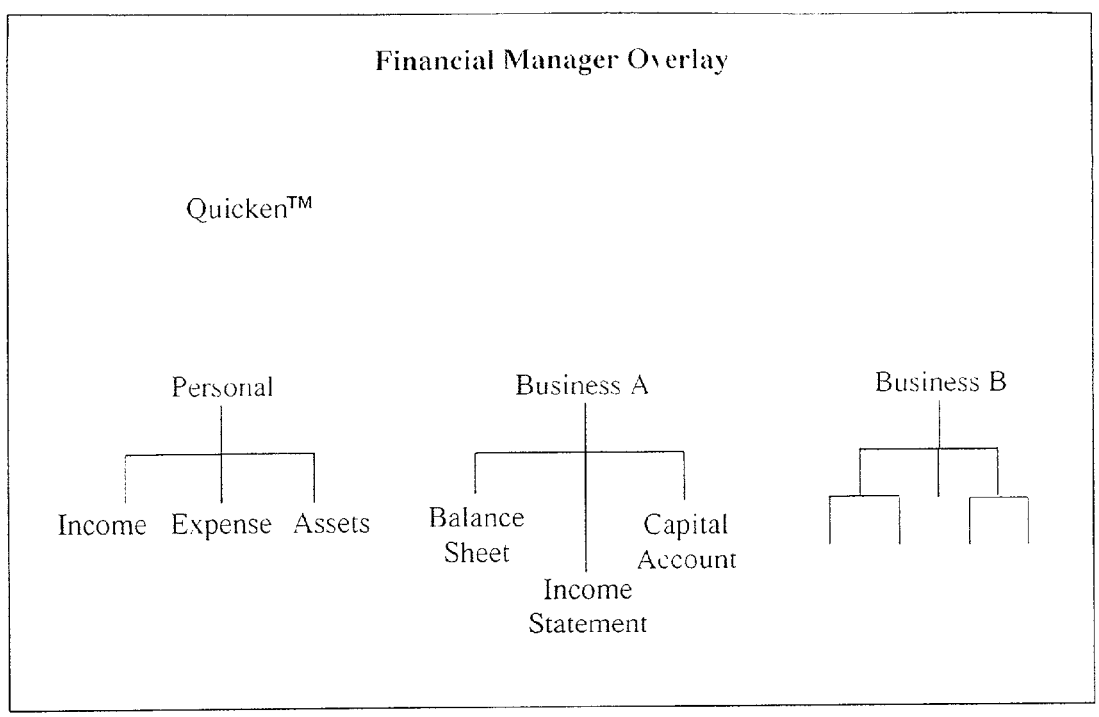
FIG. 14 shows a financial manager overlay.

The zoomable nested nodal networks may be employed to organize a variety of information. In particular, financial information is particularly subject to this type of organization, such as investment portfolios, expenses, tax years, etc. These clusters assist in the ability to organize and cross reference bodies of information, such as accounting. See FIG. 14.

Another aspect of the present invention is that the taxonomic structures represented need not be limited or controlled by an operating system file organization. Therefore, elements in different locations may be viewed together or vice versa. In addition, singular files, treated as a single object under an operating system, may be analyzed and segmented, and represented as a flexible aggregation of objects within the zoomable nested nodal network. Thus, the taxonomy may be applied to subset portions of files or pages, in the manner of a cross-file table of contents. In turn, this allows a taxonomic analysis on a fine-grained level, facilitating classification of the subset portions. The tree organization may therefore be an adjunct or partial replacement for portions of traditional computer operating systems. Alternatively, the invention may be embedded in an operating system such as Windows 2000, Macintosh 8.0, or the like, thereby enhancing such systems. Such embedding may be in the manner of OCX, DLL, or other known operating system extension formats.

Figure 15:
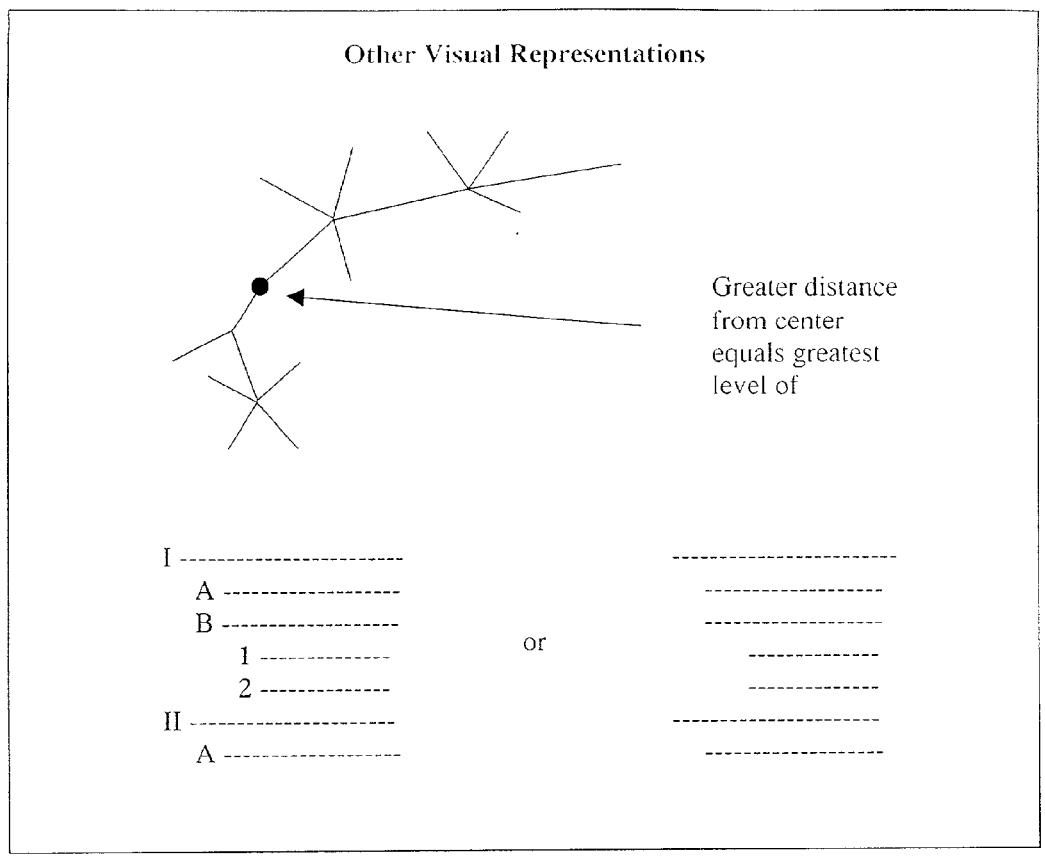
FIG. 15 shows star and outline visual representations of a nodal network.

Although the taxonomic tree format is a preferred visual embodiment of the invention, it can be seen to those skilled in the area that other visual representations can accomplish all or various of the schemes of the present invention, as illustrated in FIG. 15. Possible visual representations include a traditional outline (lower portion of FIG. 15) and a hub and spokes (or star) (upper portion of FIG. 15). References herein to taxonomic representations encompass these alternative formats.

Figure 16:
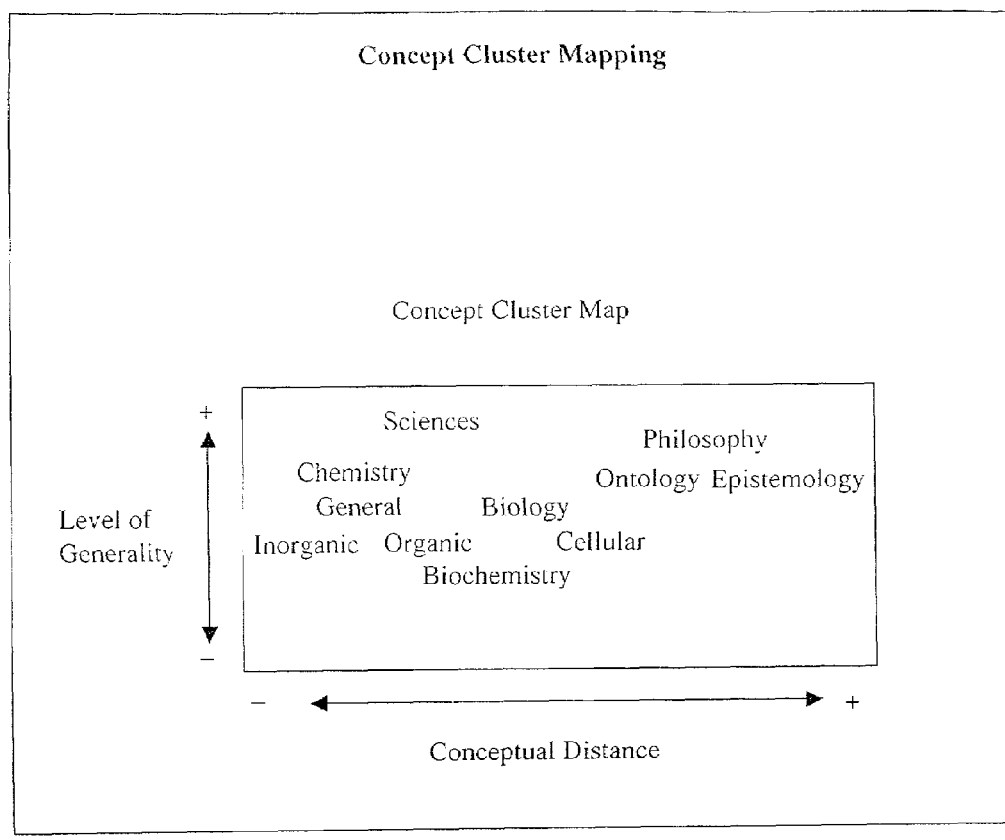
FIG. 16 shows concept cluster mapping.

Another possible visual representation is the idea of conceptual clusters. Certain nodes can be represented as close to one another without the formalism of logical branching. For example, these clusters can be mapped into groups based on linguistic, visual, auditory, or tactile associations, in the manner of a scatter plot, or of regular or irregular geometric figures representing constellations of such nodes. Further, just as one can move from a taxonomic view to a more refined or detailed taxonomic view, one could touch on a cluster to get a similar effect, either more or less general, or make a lateral gesture to sweep laterally. See FIG. 16. In a preferred embodiment, horizontal placement would indicate conceptual distance across a similar level of generality, with upper portions representing high generality, and lower portions representing low generality. Obviously, many other principles of organization can be employed. Further, in such a map, a height dimension could be used to represent frequency or relevancy, although one would then have to be able to see through or around raised objects, for example by means of translucency or cutaways or by visually or virtually "walking" around the blocking objects.

In another embodiment, a user enters a virtual physical reality, and navigates among different rooms or areas representing possible topics, choosing them using a pointing device analogous to a hand, or through a virtual reality device that detects movements of user's hands, feet, and/or eyes. As in Presearch™, the fundamental choices are presented for spatial selection, and one selection may be lead to a more focused or zoomed-in set of choices.

In the Postsearch™ phase, preferably the user will not be presented with the usual undifferentiated pile of results. Once again, results are preferably shown as selections from zoomed in portions of a taxonomic tree, and user will select the results most pertinent. Another possibility is that user will be directed to choose among special materials, and some of these materials may be "premium content," whereby user, if choosing such content, agrees to compensate the search engine provider (or content owner) for such services. The choices presented could instead be among alternative commercial providers of products, and thereupon, the system could suggest a transaction in such products and/or invite user to enter an order using a so-called electronic wallet or otherwise, as through one-time use of a credit card or by billing through a third party such as an internet service provider or local phone company. The user may also be asked if user has another inquiry. If considered by the user to be unsuccessful or partially successful, other strategies will be suggested for finding the desired object.

In the case that multiple iterations have occurred in the first phase, the Postsearch™ phase may omit further taxonomic specification and turn directly to other Postsearch™ activities. In some cases, though, the Presearch™ and Postsearch™ phases may be different in character. In Presearch™, the user may be navigating through a pre-ordained taxonomical tree to determine best fit for a search inquiry. In Postsearch™, though, categories may be dynamically created through on the fly categorization of found content; this process may be practically possible because of the very selectivity implicit in the Presearch™ process. In this way, the Presearch™ process would exploit all improvements in query definition possible without recourse to the underlying dataset, and Postsearch™ would exploit those further refinements that have recourse to the underlying dataset or indices thereof. So, for example, in the commercial model where the search engine (Engine) pays a fee to a third party provider (Provider) for delivery of hits, Presearch™ may operate on a lexical or taxonomical level based on a download of such tools at its own server-site, whereas Postsearch™ would require communication with the "super-server" at the site of the ultimate database provider(s); in many cases, only this ultimate recourse would lead to the charging by Provider of a per-search fee to the Engine. Of course, other possibilities exist, for example, where every step of user's inquiry process leads to a query to the underlying database, and where best hits up to and including this step are included instead of or together with an opportunity for further refinement of the search by user.

Another potential use of Postsearch™ is to create a dynamic arrangement of results by criteria other than subject. Such criteria could include the following characteristics of information: date, source, medium (such as MP3, video, indexed hard copy, indexed physical articles), language, geographical association or source, relevance, type of material (want ads, commercial material, newsgroup postings, company public relations releases, etc.). In such cases, bar graphs, star graphs, or histograms may usefully represent portions of data proportional to such categories (for example, broken down by source), and user may be allowed to access such statistical representations represented as an individual bar on a bar graph, by selecting an associated hyper-link to the associated materials. In other cases, theses categories may be better represented in traditional textual form.

The invention also preferably provides that the user, having defined a range or results through a dataset set defining procedure, can perform a novel set definition procedure upon those results, so that the prior range becomes the domain of a new search.

Another problem addressed by the invention has been articulated as follows: "there is little or no opportunity on the Web to look ahead, to preview information before downloading it. In order to decide whether a linked item is worth 'consuming,' first you must, well, consume it. It's as if you had to eat every item on the menu before picking which meal you want to have for lunch. Here's what we need: Web sites should provide good, scalable information visualizations that let visitors look ahead at items deep down in the structure, not just the first level or two in. These visualizations should also help visitors maintain a sense of where they are at all times . . . " Robert P. Lee, "Lost in the Web," The Industry Standard, Aug. 16–23, 1999, p. 104.

Figure 17:
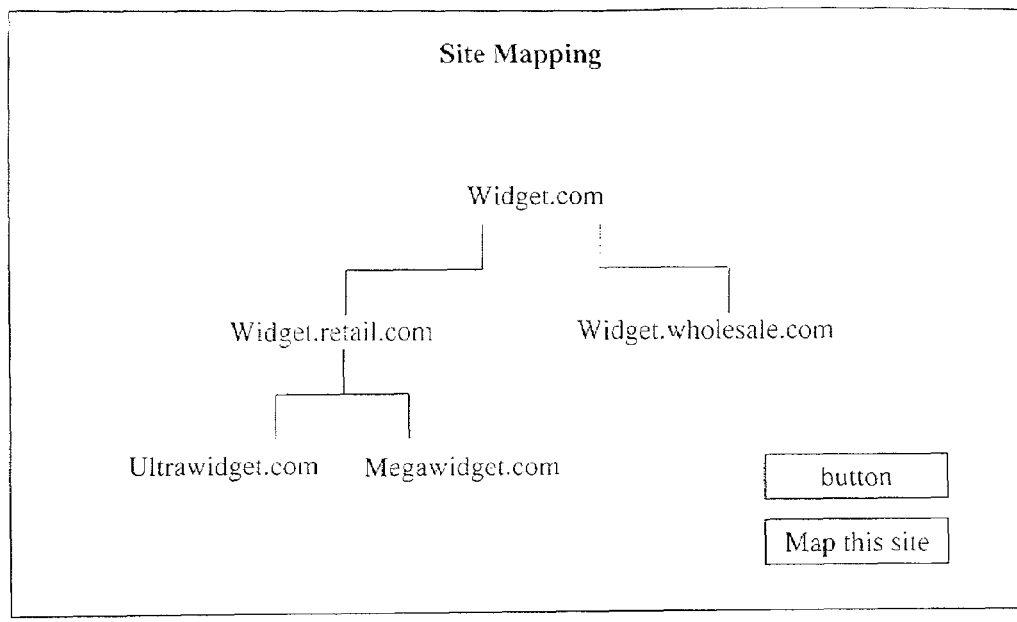
FIG. 17 shows site mapping.

Responding directly to this need, the present invention a field of improvements for a user's experience through so-called Site Mapping™. See FIG. 17. In this process, large groups of web sites can be organized, through either a human librarian or an automated process, into entities having common mapping and navigation characteristics; these pre-mapped sites would be updated frequently to take into account any changes. Alternatively, individual sites can be so organized in real time, "on the fly," prior to navigation of such sites, or in close to real time, with the result returned as a batch file via e-mail, instant messaging, or via a web site retrieval process. Site Mapping™, in effect, provides a familiar, organized overlay to the user as he or she visits different sites with their various contents, organizations, and means of navigation. Features of Site Mapping™ might include availability of a desired visual organization of the contents, such as Table of Contents, Index, or a hierarchical structure, such as a tree, hub and spokes, nested groups arranged as files, or might preferably be arranged as conceptual clusters. In most cases, a branched network, similar to conventional site maps now present on web sites, would be preferable. Preferably, the nodes on the map would be hyper-links leading directly to the relevant page of a site's content, rather than necessarily to the home page. The status of the system, e.g., the page presently being visited by the user, may be indicated within the site map, for example by a change in typestyle, color, size or attribute of the associated text for the distinguished URI.

Site Mapping™ differs from the site maps found at some web sites today, however. First, the site map would be intended to provide a unifying model by which the user can view countless different web sites. In generating such site maps, a so-called web "spider" may crawl all or select portions of the web and create a ready-made set of such site map overlays, for convenient or rapid use. Such maps could be built by human librarians or automated by special site mapping software. As a business model, these maps could be subsidized by advertising, by usage charges to consumers or businesses, by usage charges to the sites indexed, or by e-commerce or commission splitting generated or facilitated through the convenience and appeal of the site map. The Site Mapping™ scheme dovetails with the concept of receiving revenues from advertisers seeking to offer elaborated commercial content in a hierarchical form, such as in clustered nests or as part of a taxonomic tree, by providing a suggested preliminary or final model for such content. The Site Mapping™ facility could in itself be sold or licensed as software that operates independently of the other features of this invention, and which might be used by users of the web or by other search engines, browsers, and/or portals. Site Mapping™ may also be a valuable service meriting the payment of licensing or use fees for the following groups of users: librarians of data collections, whether human or electronic; censorial groups that exist in organization that monitor improper use of proprietary electronic resources; and/or commercial intelligence.

Site Mapping™ on an automated basis requires overcoming certain technical obstacles. First, although some web sites have built-in site maps, not all do, and those that do may not have them up to date or they may be difficult to use or interpret. Second, many sites do not offer a search engine or index, and those that do may be unfamiliar, ineffective, inefficient, or difficult to use. Third, many sites have sub-domains related to them that are difficult to identify. For example, Widgets/Warranty/Terms may be easy to identify, but domain Service.Widgets/Warranty/Terms, would probably be difficult to locate. Fourth, may sites have anti-robot technology that may bar queries from an Internet address that appears to be scanning the site automatically and rapidly.

The Site Mapper™ could also include a facility for input or feedback from the underlying web site proprietors or users. This feedback could be in the form of corrections to the Site Mapper™'s previous work. Web proprietors could also be encouraged to submit a proper site map of their site, with correct linkage and hierarchy, according to a consistent format accepted by the Site Mapper™. A site map developed on a fly could also be the basis for the proprietor of a web site to post a map of its own site, including after refinements and edits. Conceivably, such a format could tend to influence the development of a web standard for site mapping and related software that could be sold commercially or offered as freeware The algorithms driving the Site Mapper™ engine that can produce a site map of web sites, that are otherwise incompatible, would exploit certain key clues in inferring a site structure. First, it could open a site and explore all hyperlinks found from the site page forward, and seek to connect those links, links to links, and so on, so as create a drawing of the links. Second, it could distinguish between links to outside sites from links within the site. Third, it could seek clues to hierarchy in the use of the slash (/) and dot (.) symbolism of unique URI's to infer apparent seniority. For example, IBM/Patent/Recent and IBM/Patent/pre-1963 show an apparent structure based on two "children" of IBM/Patent and "grandchildren" of "IBM." Dot symbolism also creates seniority to the left in many instances. Fourth, the Site Mapper™ could treat the matter within the site as a domain to be organized, and it could use the technology of automated indexing to create an Index, including an alphabetized and searchable index.

In another implementation of Site Mapper™, the search engine, being asked to map a certain site, has recourse to a set of indexed documents and generates the site map based on the indexed links. The Site Mapper™ engine may also map individual web sites on the fly, to determine their internal structure. In this case, dead or empty links may be discovered and indicated to the user, for example with an indication of the amount of data at any web page.

Preferably, Site Mapping also provides, either as a feature to be saved and associated with particular nodes of the Site Map, or in real-time, or both, a Summary of the contents of materials referenced by the Site Map. The invention also contemplates that the Site Mapper™ could be a freestanding or licensable web appliance.

Figure 18:
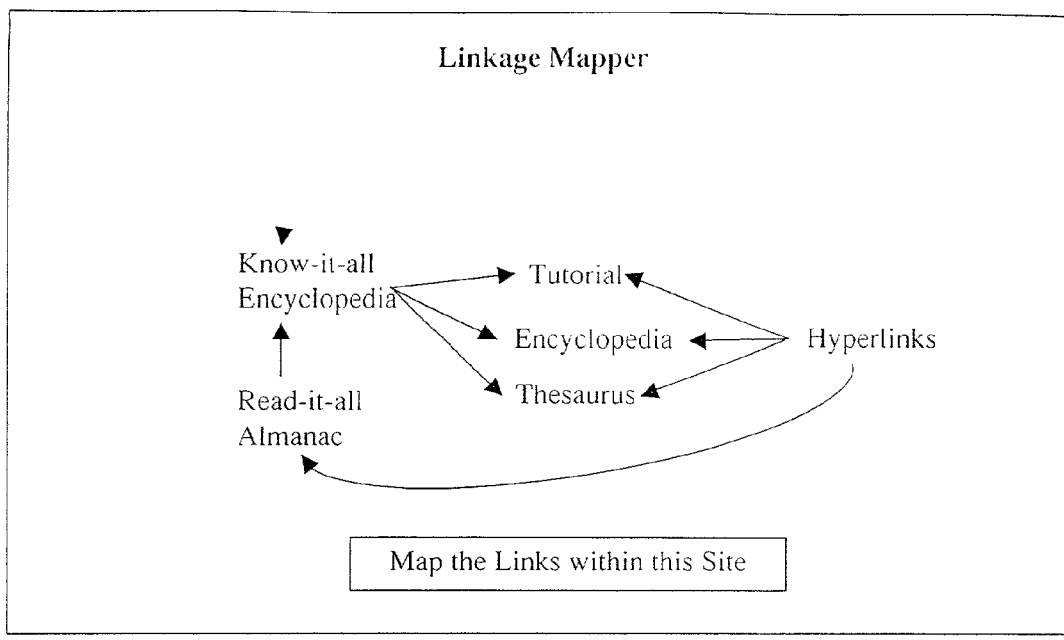
FIG. 18 shows linkage mapping.

The Site Mapper™ relates to internal structure of a web site or set of data. The invention also provides for a Linkage Mapper™. See FIG. 18. The Linkage Mapper™ is a utility that allows user to see the external links of a web site or location, in terms of citation by other sites to a site (links coming in) or links citing other sites (links going out) or preferably both. As distinguished from such efforts as Google.com (now in beta form) and Clever.com (a proposed IBM search process), which seek to analyze linkages as a means of inferring authority or relevance, which in turns allows the search engine to rank order search results by apparent relevance to a search request, the Linkage Mapper™ provides for direct inspection of linkages by the user for a variety of purposes, that may include relevance attribution, heuristic or brain storming work, curiosity, troubleshooting by a webmaster, or other purposes.

It is known to provide a graphic representation of a linkage between web pages, which provide an indication of an apparent physical interrelation between hyperlinks, i.e., a damped oscillation when one branch of the tree is touched, with a displacement of other branches of the tree. See, www.bacardi.com, which employs a system designed by Thinkmap, www.thinkmap.com. In fact, this known system apparently reflects only the graphical relation between the representations of the nodes, and not the content of the nodes. The present invention, however, provides a method wherein a relation of the content, or other extrinsic aspect of the tree (not inherent in the hyperlinkage structure) is represented visually. Thus, while the tree is essentially a two-dimensional structure, extra dimensions may be added, both static and dynamic, to indicate a relationship of the content represented by nodes. Thus, in one embodiment, the graphic user interface pointer may act as an oscillator, with each node in the tree having a transfer function, either relating to or independent from the tree hierarchy. Thus, as the pointer nears or touches a node, those nodes that are linked, for example by a similarity measure, vibrate at the frequency of the oscillator. Thus, for example, highly relevant nodes may be identified by a text display or icon that vibrates maximally, less relevant nodes by lower amplitude or no vibration. By providing a plurality of oscillators (e.g., at differing frequencies), multifactorial correlations may be determined. Likewise, each node may have a variety of characteristics, e.g., amplitude, color, luminance, "temperature", "loudness", "spin" (potentially along three orthogonal axes), or other characteristics, which may be represented independently or simultaneously. In some embodiments, the pointer is employed to provide a focal point of interrelation analysis, as discussed above, and in others, the extra dimensions are statically or continuously applied. Therefore, restrictive criteria may be superposed upon a predefined tree to indicate "relevance". These criteria generally relate to the Presearch™, search criteria, intrinsic or extrinsic ranking criteria, collaborative filtering, or Postsearch™ elements described elsewhere herein or known in the art, or may be user defined. In this way, the presentation of preexisting taxonomies may be customized, without altering the taxonomy itself. By providing a hidden multifactorial database "behind" the hierarchal tree structure, a substantial amount of information may be presented interactively, without substantially impairing usability. In one embodiment, this database is downloaded in association with the tree object, and in other embodiments, server interaction is required for investigating higher organization levels or dimensionality.

In use, the higher dimensionalities may be used, for example, to focus user investigation of certain branches and sub-branches of the tree, based on a density of representation. Regions of the tree with high representation density are likely relevant, even if particular nodes score low, likewise, regions of low representation density are likely irrelevant or incidental, even if particular nodes score high. By overlapping multiple restrictive criteria, it is possible to map relatively narrow concepts, even if the underlying data is imperfect or corrupt, as often is the case in Internet search engines. It is noted that the hierarchies are typically predefined and relatively immutable, e.g., a lexicographic taxonomy, while the variable representation dimension may be fixed or variable. According to an aspect of the present invention, a user may graft and prune the tree, for specific purposes. In some cases, the implication of a grafting operation is object oriented, e.g., a child object inherits the characteristics of a parent object, while in other cases, a grafted branch is uninfluenced by the change in taxonomic organization. These reconstructed trees may themselves be maintained as an object, represented as a complete description thereof or as a set of incremental changes from a basic tree. These objects, may in turn, be transmitted between users, with the modified tree object and associated hidden information available as a single object.

It is also possible for the search engine to return search results from a query to the user in the form of a tree object, e.g., a zoomable nested nodal network. The user may then probe or investigate the object, without referencing the specific contents thereof, to determine the relevant portions thereof. Therefore, as is known, a search engine retrieves an over-inclusive result; it is often considered inefficient to attempt to provide a narrow yet complete search result due to the extensive processing time required. Thus, by returning both the search hits and data defining various relevance criteria in a single data object, the user is permitted to investigate the result as a whole.

Figure 19:
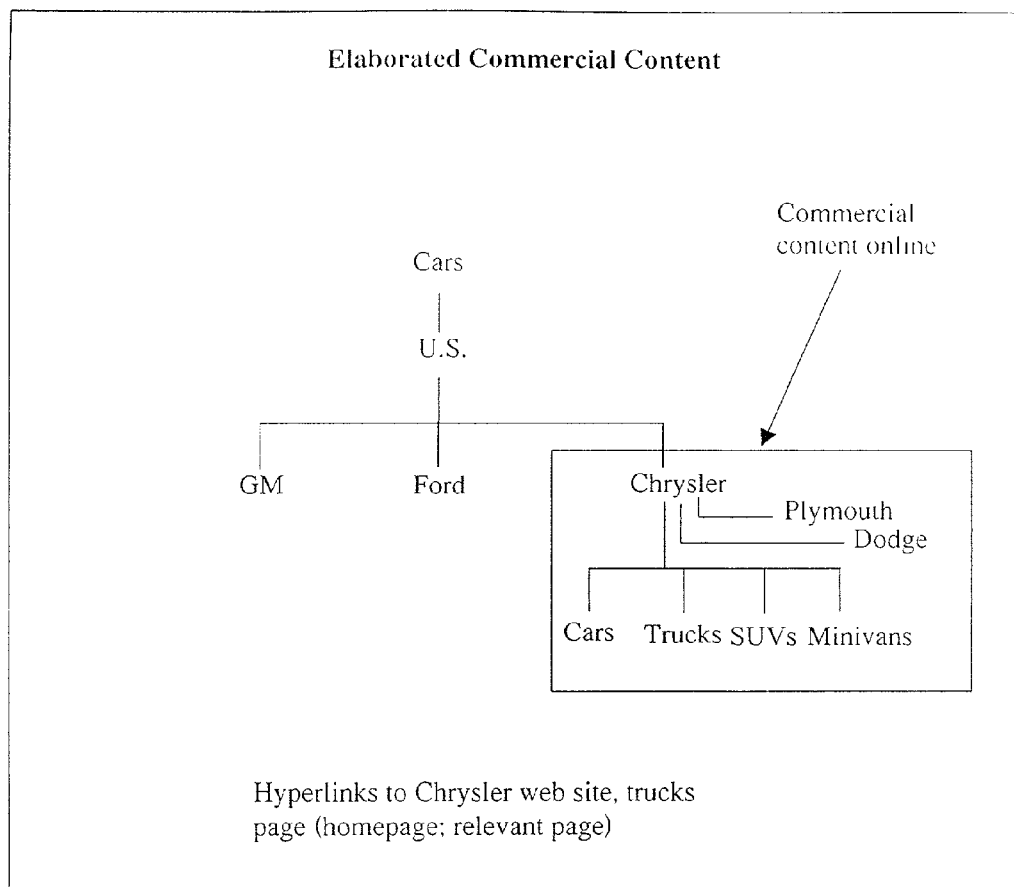
FIG. 19 shows elaborated commercial content embedded within a nodal network.

The tree object also provides a substantial opportunity for the integration of advertising content. The user, in identifying the restrictive search criteria, necessarily reveals an area of interest. To the extent that commercial interests overlap with the expressed area of interest, which are defined by the taxonomic representation, advertisements may be represented as nodes or groups of nodes in the tree. See FIG. 19. In some cases, commercial intrusion is unwanted or unwarranted, and might be effectively ignored, but should at least handled consistently, i.e., the user must view banner advertisements during use of the tree object viewer. On the other hand, in many instances, the user is commercially motivated, and seeks useful information from product or service providers. In this case, substantially deeper content may be made available within the context of the tree. To obtain a separation of commercial and non-commercial content, the commercial portion of a taxonomy could be identified by an outline, a special color, or other demarcation. Thus, for example, the user may write the sentence in a clue box, "I want to buy a Durango." Using a method presented by this invention, the user may then be presented with a series of zoomed in views of a taxonomic tree, one of which might show, in decreasing levels of generality, 1. autos, 2. US, 3. Chrysler, 4. sports utility vehicles, 5. Durango; in this case, everything below Chrysler may be elaborated commercial content of the taxonomy in the sense just described. The user could go directly then to a desired part of Chrysler's web site, for example, without the discouraging factor of needing to navigate that site.

In fact, each result may also be organized as a presentation, or group of presentations. Such an object is relatively easy to use, as the user may be a passive observer during a presentation. The cost of preparing high quality presentations may be offset by commercial providers, in the form of commissions on sales, advertising or sponsorship fees, or the like. By preparing these objects using multivendor information, a-service is provided which no single vendor could (or would) supply, in the manner of a trade publication. By linking the final preparation of an object with the search query and search engine results, a customized object is available. The object, it is noted, need not contain the entire presentation or full content, merely the required hyperlinks to access the content, and preferably information relating to a taxonomic linkage of the hyperlinks and also preferably information defining relationships between the search query and/or content referenced by the hyperlinks. In this sense, the tree object may provide sequence and timing information for the presentation, in the manner of Synchronized Multimedia Interface Language (SMIL) or HYTIME.

According to another aspect of the invention, a revenue model is provided whereby advertisers may bid for placement in a list of relevant results, in the manner of the bidding process used for relevance ranking used as www.goto.com. However, in distinction to the model employed by www.goto.com, this model may provide for the isolation of the paid relevant rankings from the "objectively" relevance rankings. Such an area of "associated commercial content" could be represented by a parallel taxonomic tree or a list. Such associated commercial content is distinguished from banner ads, and like promotions, in that the content would consists of hyperlinks rank ordered by an economic criterion, that is, highest utility, however measured, e.g., price paid by the advertiser. Thus, the present invention provides a useful revenue model for the subsidy of its many useful features thereof while avoiding the problem of "contamination" of the objectively ranked or ordered results, which has been a frequent criticism of the practice followed, most prominently, by the business associated with the web site www.goto.com.

The term "agent" refers to a "smart" software construct that can act intelligent on behalf of the user to accomplish tasks. The term is sometimes used in a strong sense to refer to a process where user gives power of attorney to a computer agent to buy or sell goods or carry out other tasks. Such agency services could include finding the best price for a good or service, placing (or buying) a good or service in auction, checking on availability, providing product updates, providing news updates, and other services. These agency services in many cases may reinforce or facilitate business models of the search engine, i.e., the user's economic goals are generally allied with the business interests of the search engine or portal provider. In many cases, the user may provide a personalized profile, to be located at the client level as a "cookie" or at the server level in a mass storage device, in order to better carry out the agency role. The user may also be identified through a username/password scheme, allowing a single user to employ multiple computers or guest computers. The server may also provide a personal and/or personalized home page function.

The present invention serves not only consumers looking for products but also products (and services; that is manufacturers, service providers and distributors) looking for consumers. The product providers may further subscribe to a service that customizes their portion of the taxonomy in relation to known characteristics of the user. For example, if the advertiser sells luxury sedans, it might situate its commercial messages (ads) within a portion of the taxonomy having a high probability of being presented to mothers, by emphasizing safety features. It might also situate its commercial messages (ads) within a portion of the taxonomy having a high probability of being presented to a young man, by emphasizing special branches relating to power and performance. Pages from the same or a different linked commercial web site could be opened directly as hyperlinks. In this way, just as one speaks of interactive advertising, there could be an interactive taxonomy.

Another potentially valuable service of the search engine is an aggregation of many discrete charges for e-commerce, including purchase or leasing of premium information content as well as goods and services. Since these payments for premium content tend to be small, this aggregation service would be convenient for many users. These charges could be repaid through many means, including direct billing, credit card, or via the local telephone company or ISP provider bills. The advertiser subsidies may be used to offset charges, which are typically accounted for in a micropayment scheme such as MPTP, Millicent, etc.

Another service of the search engine might be to keep the identity of user's URL confidential while user visits other web sites. This could be accomplished by serving as a proxy or firewall, i.e., standing in-between user and target site as an intermediary, where each request is rerouted as if a request of an alias ID, including that of the search engine, and where each response is received through a designated server and rerouted to user. According to the present invention, the proxy may also maintain and control use of cookies, and control various information passed from the client browser to the remote server, which might otherwise limit anonymity or functionality.

Figure 20:
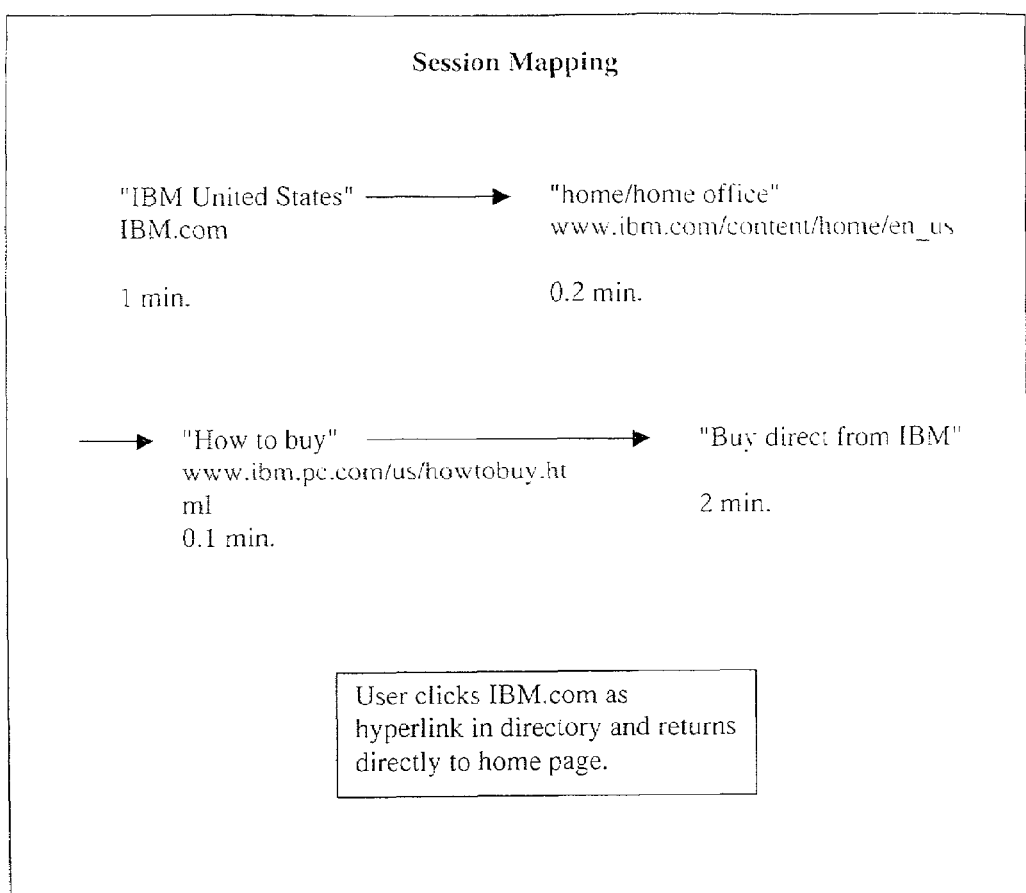
FIG. 20 shows session mapping.

Another problem that the invention addresses is excessive need to use the "back" button on the Internet browser. According to Jakob Nielsen, an authority on web architecture, the back button is the second most used navigational mechanism on the web, only exceeded by the Hyperlink. See, "Lost in the Web," The Industry Standard, Aug. 16–23, 1999, p. 104. In many cases, to return to a desired prior state, user may invoke the back button on the browser five, ten, or even fifteen times, with a latency period after every single action. The invention contemplates, in contrast to this crude, repetitive, and irritating process, that user may be able to retrace his or her path through a map, and that the user will have the ability to hyperlink directly back to a previous stage by a gesture, without resorting to annoying multiple uses of the internet browser "back arrow," and thus avoiding the consequent delay and annoyance and providing a more sophisticated means for specifying a desired hyperlink in a set of temporally or logically connected web pages. Preferably, a record is kept at either the client or server level, or both, of all web sites traversed during a session, including sub-domains. The user then clicks through to these previous states directly by a gesture of the pointing device. See FIG. 20. The map might also include all files opened and then exited, cascaded or shrunk, or saved, as illustrated. Backward as well as forward steps could be mapped in this scheme as well. Each node in the graphic represents a hyperlink to the prior visited URL. Further, in a given taxonomy, unvisited URLs may also be identified. The "Backtracker"™ or "Session Mapping"™ application, in a reduced form, could be clicked on to save a certain "break point" or "home" to return to. In either full or reduced form, the Backtracker™ preferably operates as a toolbar or "remote control" that stays open and available to the user on the screen. The present invention also envisions that the Backtracker™ could be a freestanding or licensable web appliance. Multiple different backtrack objects may be stored in a history file, allowing complex search and exploration strategies to be maintained and/or reemployed. The Backtracker™ could retain, not only a trail and order of each URLs visited, but also the time spent at each URL. The Backtracker™ may also distinguish between different Internet domain types, such as intranet or private network, Internet, secure protocol communications, different servers (by either domain name or by IP address), and the like. The Backtracker™, which in effect maps the session of each user, is therefore an improvement over the functionality of present day browsers, which provide under the "GO TO" menu option merely a listing in reverse chronological order of sites visited. This function, sometimes called "history," does not show time spent at each site, provides information on sites only and never pages within a site, and is presented in text format rather than as a graphic. It is noted that the time spent or other chronological features of the Backtracker™ are optional.

As a refinement of Session Mapping™, the present invention provides a Summary of some or all of the nodes of sessions. The present invention may also provide the user an ability to annotate a session map with titles, comments, associations, or spoke words, or hyper-links, or to provide such annotations automatically or semi-automatically (e.g., manually controlled automated process), or to prune, elaborate or otherwise transform a session map as desired by user.

As a further refinement of Session Mapping™, a user may have the choice to point to certain nodes represented in the output of the Session Mapping™ system, and identify these as favorites to be saved or as sites to be mapped by Site Mapper™, with the results either retained and associated with the Session Mapping™, transferred or cross referenced to Favorites, and transferred to, related to, or subsumed under a record of the search query itself, or otherwise processed, for example, deleted.

As a further refinement of Session Mapping™, the results of all or part of a session may be treated as an object to be saved, transmitted or employed in an Object Oriented Architecture. Thus, for example, a "tour guide" on the web for a given purpose, such as shopping for camping gear, may be shared with, or employed by, others.

The present invention provides, for example, eight categories of improvements for database engine user interfaces.

The first aspect of improvement selects the domain or domains to be searched from a plurality of available domains, based on a characteristic of the user, for example, a role in society, a demographic profile, a socioeconomic status, a past history of the user, or the like. This aspect of the invention is based on the premise that, by understanding the user, the search effort may be focused to those types of sources that are most likely to return useful results, while avoiding those sources that would return less relevant results. By limiting the data domains searched to those likely to be relevant, the cost of the search may be reduced.

The second aspect relates to intelligent assistance of the definition of the database operation to be performed, e.g., search criteria, also known as the set inclusion criteria. Typically, lay public access search engines, for example those commonly accessible to the public through the Internet or which index web pages from the Internet, do not support complex search criteria, and many of those which do provide access to complex search criteria, offer only a limited data set. Even then, the complex search criteria, e.g., Boolean and proximity operators, are complex to use and therefore only suitable for advanced users. The present invention therefore provides a function that assists the user in defining and carefully refining the scope of the search, as well as the resources used in accomplishing it.

After, for example, identifying a role in society or profession of an individual, a template may be retrieved, defined or created for that individual. The template may be customizable, and indeed the customization by the user may be a valuable source of information for the database to improve the performance of the system with respect to the queries propounded by all users having the common role or profession. Ideally, a user registers with the system once, and is subsequently identified with a cookie from the Internet browser (or username/password) that calls up a user-specific file, which controls user-specific performance of the system.

The third aspect relates to a system for defining a presentation of search results to the user, for example, the information content for each record, ordering of presentation, thresholding and elimination of certain records, and ancillary information. It is well known to rank the results of a search query for presentation. However, typical systems provide little or no control over the ranking parameters. It is noted that, while ranking and sorting may be provided in conjunction, typically conflicts between the two schemes are present which force a prioritization thereof.

Figure 21:
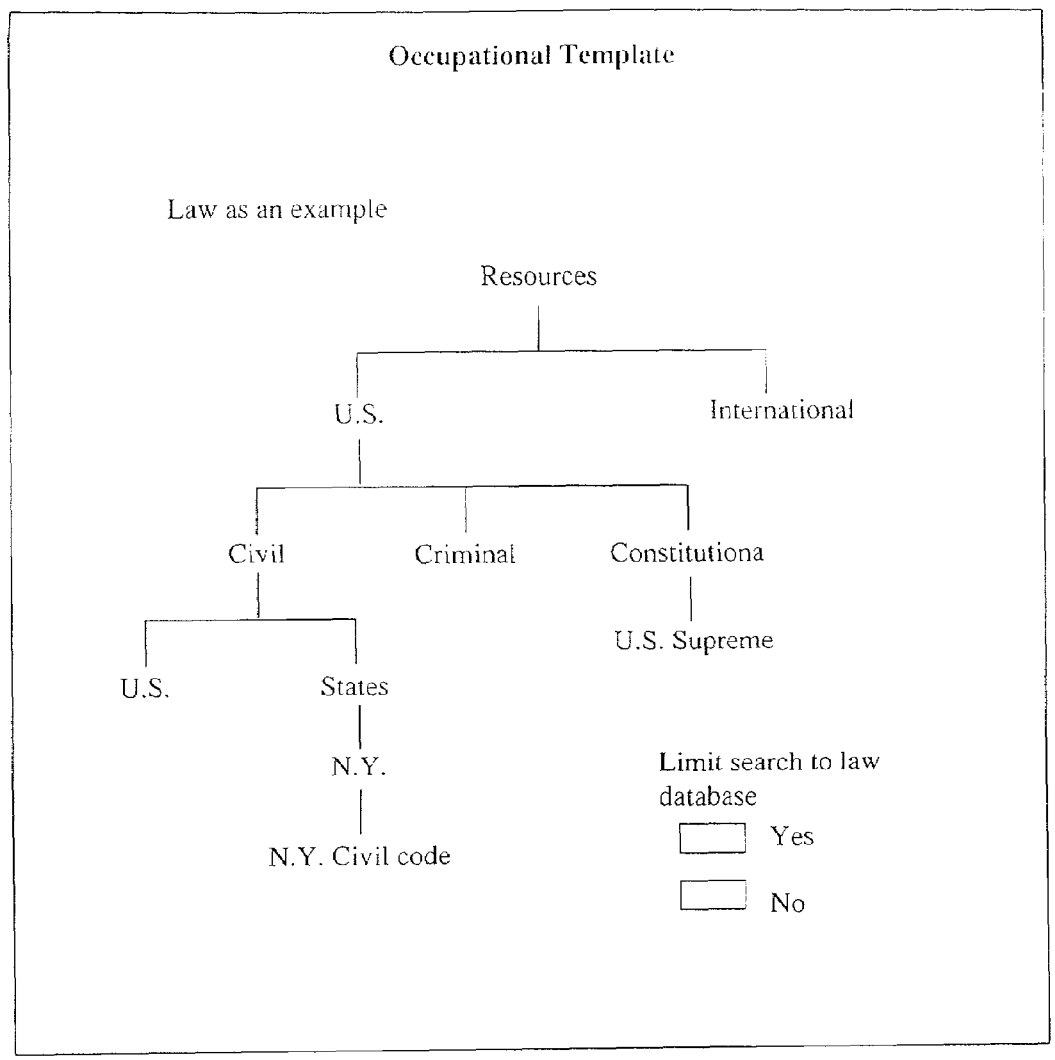
FIG. 21 shows an example legal occupation template.
Figure 22:
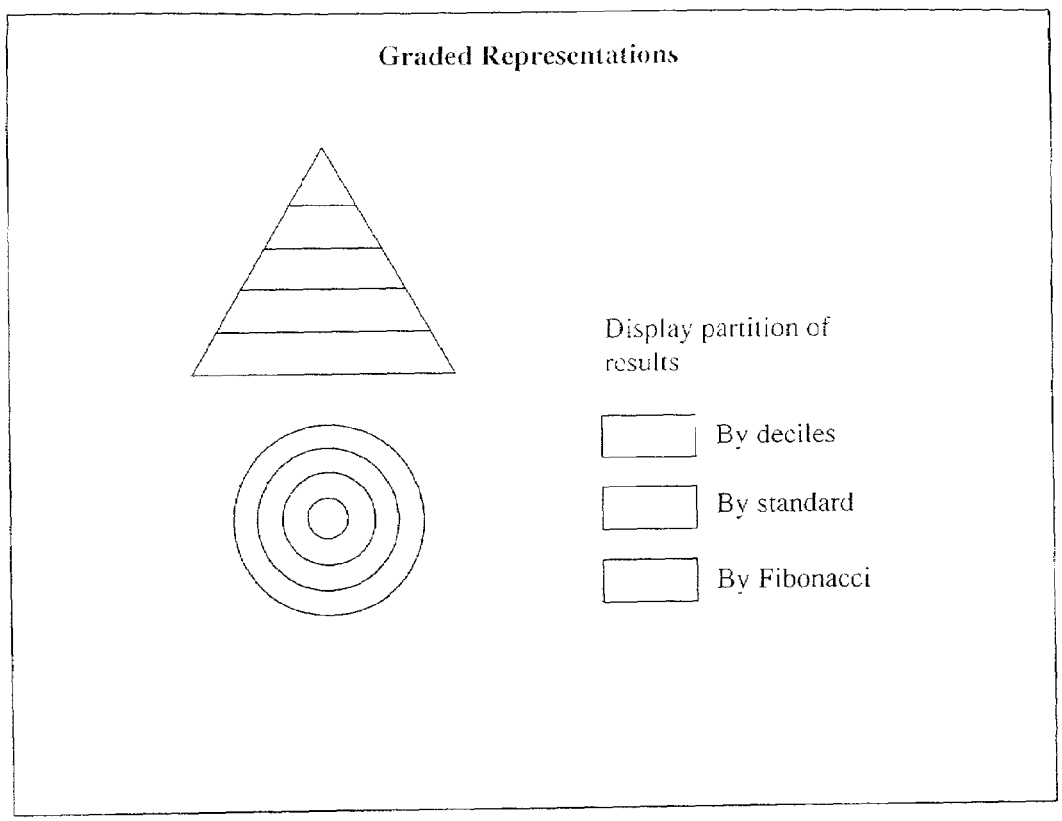
FIG. 22 shows graded representations.
Figure 23:
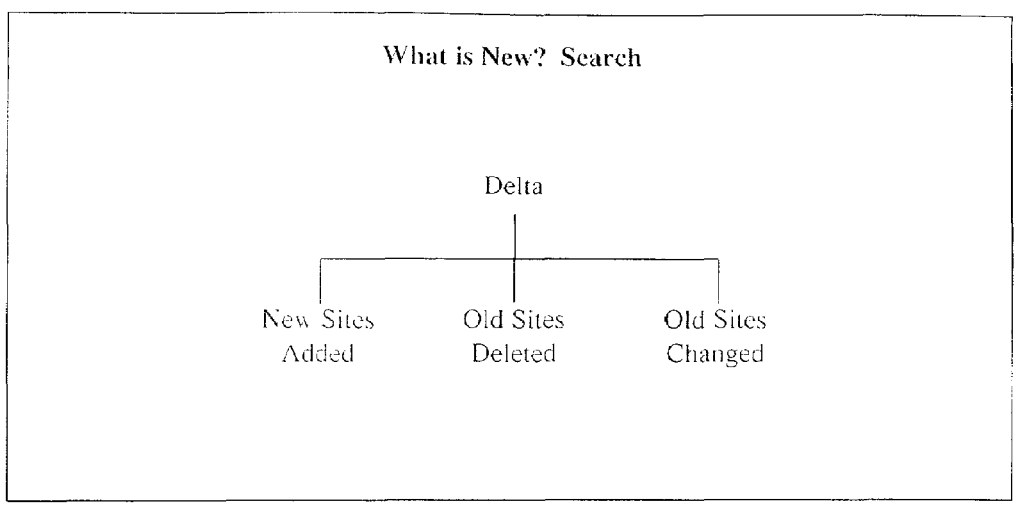
FIG. 23 shows a delta search function.

The fourth aspect of improvements relate to the ability to structure and organize results of the search. This technology presents a substantial improvement over the "list of favorites" approach. This aspect also includes the pre-organization of handy reference materials, preferences, and/or results of past work in a personal home page, or set of home pages. One mode of organization of these pages would include the social roles of the user. These pages, comprising in effect of "templates" for specialized searches, would preferably be organized and displayed in a nested cluster or branched format, including such visualizations as a tree, an outline, hub and spokes, or conceptual clusters. The essence of this idea is that certain materials for such templates—e.g. for law and medicine—may be presented to user, but the user can then customize the template by adding or deleting resources. See FIG. 21. At the server level, such additions and deletions are carefully noted as intelligence that could influence the composition of the pre-formatted templates: For example, if a digest of U.S. Supreme Court cases is not in the pre-formatted template, but is added to the template by many users, then it could be automatically added to the default template for all users having similar characteristics; likewise, for resources deleted by many users. Additions and deletions could also bring to the attention of the server more novel or unknown resources, or the disappearance or relocation of previous resources. Another aspect of the present invention concerns recording of subjective views of users concerning web resources. As a user's choice to record a favorite in the Small Tree™, or to delete a resource from a template, or to open a site and perhaps to leave it open for a duration of time, or rather to close it quickly, imply various favorable or unfavorable views of the user toward web resources, user would have the option to rate the resource according to a scale or to make subjective comments. These evaluations in turn could be used as follows: as feedback into the search engine's relevance model as to particular web resources; as a part of a user's personal record, so that along with a record of past searches, dates, number of hits, etc., a users' own evaluation of the resource could be recalled by user; to create shared resources that could become a common element or activity in creating a "community" of users, organized by occupation or interest or other common characteristics; to be sold as valuable information to other businesses, either as to individuals (and preferably with the consent and knowledge of those individuals) or as to groups. Thus, in contrast to known applications such as www.fast-search.com, where occupational search engines are provided for four fields, the present invention preferably provides a more flexible, customizable system that has important elements of self-correction, learning, and improvement.

The fifth aspect of improvements relate to improvements in the presentation of the underlying web sites themselves, Site Mapping™. This process creates a more or less standardized template across which user can navigate the miscellaneous structures of web sites.

The sixth aspect relates to improvements in the area of personal information management, e.g. the Big Tree™ concept of file organization, the Little Tree™ concept for organization of favorites, the PIM Tree™ concept for organization of contacts, addresses, meetings and appointments, and organization of the client desktop.

The seventh aspect relates to improvements in backtracking and forward tracking of a user's computer usage, including mapping of sequential hyperlinks made, via the so-called Tracktree™ of Session Mapping™ method, for mapping a history of usage. In this method, a user's history of use or related information is stored with respect to a taxonomic tree. As a user traverses the tree, the trail and usage is recorded graphically in a separate graphic representation. Thus, if a user seeks to explore a different branch of the tree, navigation is simplified. Further, by providing a graphic indication of the relation of explored and unexplored branches, the user may be assisted in defining a future exploration. While it is relatively simple to provide a binary indication of whether any given hyperlink has been visited, preferably, a more fine-grained indication is provided. For example, the number of times visited, cumulative or average duration of visits, and/or content-based indicia of the visit may be visually encoded. This representation therefore provides an intelligent alternative to the simple back-arrow function that characterizes most Internet browsers.

An eighth aspect of improvement achieves faster access times for search result hits by caching hits at the server level, because servers typically have much higher data access rates than client machines, and the server may dispatch the requests more readily than the client system. Further, once the hits are retrieved at the server, a further filtering or even ranking may take place, improving the apparent quality of the search. Even where it is more efficient for the client machine to directly access the hit data, by prefetching the hits, the data at the source remains queued, and will therefore likely be delivered faster on a subsequent request. The search server, at the same time, may be organizing textual material into an outline, an index or conceptual clusters.

A ninth aspect of improvement relates to the mapping of backup processes, Backup Mapping™.

EXAMPLE 2

The present invention provides a system to store, render, and relate directories and taxonomies. These data objects might be best represented as a "tree". A representation that is suitable for storing the tree in a database and for rendering it for display and interaction by a user may be implemented using the XML/XSL/Xlink/Xpointer/Xpath standards. XLink/Xpointer may be used for addressing parts of trees, traversing trees and otherwise pointing into trees. This general area of is known as linking and addressing.

XPointers operate on the tree defined by the elements and other markup constructs of an XML document. An XPointer consists of a series of location terms, each of which specifies a location, usually relative to the location specified by the prior location term. Each location term has a keyword (such as id, child, ancestor, and so on) and can have arguments such as an instance number, element type, or attribute. For example, the location term child(2,CHAP) refers to the second child element whose type is CHAP. At the heart of the XPointer is the location term, the basic unit of addressing information. The combination of location terms in an XPointer has the effect of specifying a precise location.

Many XPointers locate individual nodes in an element tree. However, some location terms can locate more complex sets of data. For example, a string match may locate only a portion of a node, and an XPointer containing the span location term (called a spanning XPointer) can reference sub-resources that do not constitute whole elements.

XPath is the result of an effort to provide a common syntax and semantics for functionality shared between XSL Transformations [XSLT] and XPointer [XPointer]. The primary purpose of XPath is to address parts of an XML [XML] document. In support of this primary purpose, it also provides basic facilities for manipulation of strings, numbers and Boolean operators. XPath uses a compact, non-XML syntax to facilitate use of XPath within URIs and XML attribute values. XPath operates on the abstract, logical structure of an XML document, rather than its surface syntax. XPath gets its name from its use of a path notation as in URIs for navigating through the hierarchical structure of an XML document.

Many aspects of the present invention employ known techniques, although employed in different contexts herein. Therefore, it is understood that these known and techniques and those associated with them may be employed in conjunction with the present invention, to the extent consistent therewith.

It is also understood that the various aspects of the invention may be employed together, individually or in subcombination. Further, it is understood that the present techniques are not limited to use on the Internet, as presently known, and may be applied to a large number of human-computer interface systems.

While the above detailed description has shown, described and pointed out the fundamental novel features of the invention as applied to various embodiments, it will be understood that various omissions and substitutions and changes in the form and details of the system and method illustrated may be made by those skilled in the art, without departing from the spirit of the invention. Consequently, the full scope of the invention should be ascertained by the appended claims.

I claim:

1. A method of providing a human-computer user interface, comprising the steps of:
   (a) providing a user with a user interface for defining and retrieving objects based on a resource locator thereof;
   (b) providing access to an object search engine for selecting objects from a set of objects, according to a user-defined information content criteria, and returning at least respective resource locators of selected objects;
   (c) presenting to the user at least three of the selected objects according to a hierarchal organizational structure having at least three hierarchal levels, a respectively lower level falling within a respectively higher level having a generic characteristic, wherein a selected object is automatically placed within the hierarchal organizational structure based on a respective information content of the at least two selected objects, to thereby group objects having an information content relation and classify characteristics of objects within classes;
   (d) inserting objects extrinsic to the selected objects responsive to the user-defined information content criteria, into classes within the hierarchal organizational structure, said extrinsic objects having a contextual relevance to respective information content of a hierarchal level in which they are inserted, wherein at least one of an insertion and a selection by the user of an extrinsic object is selectively associated with a sponsor payment; and
   (e) accounting in a database for said sponsor payments.

2. The method according to claim 1, wherein the extrinsic objects comprise commercial messages.

3. The method according to claim 1, wherein the extrinsic objects comprise objects identified through a collaborative filter process.

4. The method according to claim 1, wherein the extrinsic objects are contextually related to the user-defined information content criteria.

5. The method according to claim 1, wherein the hierarchal organizational structure comprises a tree structure displaying at least three hierarchal levels within a graphic user interface.

6. The method according to claim 1, wherein the hierarchal organizational structure comprises a hyperbolic tree structure.

7. The method according to claim 1, wherein the hierarchal organizational structure comprises a display generated by a hyperbolic tree applet.

8. The method according to claim 2, further comprising the step of charging a commercial message sponsor for delivery of commercial messages based on a semantic context of message delivery.

9. The method according to claim 2, further comprising the step of charging a commercial message sponsor for delivery of commercial messages based on a value of a subsequent commercial transaction with the user.

10. The method according to claim 1, wherein the hierarchal organizational structure comprises a state independent information object.

11. The method according to claim 1, further comprising the step of ranking members of the set of objects within a single hierarchal class based on a correspondence to the user-defined information content criteria.

12. The method according to claim 1, further comprising the step of receiving a ranking preference from the user for a ranking method for ranking members of the set of objects within a single hierarchal class.

13. The method according to claim 1, further comprising the step of graphically representing a history of access to the set of objects.

14. The method according to claim 1, further comprising the steps of manipulating an object within the hierarchal organizational structure through a graphic user interface, and requesting information content corresponding to the manipulated object.

15. The method according to claim 1, wherein at least two distinct predetermined hierarchical organizations of information are provided, each having at least three hierarchal levels for a universe of objects, further comprising the steps of:
   (a) selecting a relevant hierarchy from among the at least two distinct predetermined hierarchical organizations of information;
   (d) displaying links to the selected objects according to the relevant hierarchy; and
   (e) storing at least a subset of the displayed links within the relevant hierarchy as a state independent object.

16. The method according to claim 1, further comprising the step of defining a user profile, for modifying at least one of the selection by the object search engine, and a hierarchy.

17. The method according to claim 1, further comprising the step of presenting the hierarchal organizational structure with an applet, wherein the returned respective resource locators of selected objects are transmitted to the applet, which formats the set of objects in the graphic format hierarchal organizational structure, based on a relationship of a content corresponding to each object.

18. The method according to claim 1, further comprising the step of providing an adaptive user profile applet, comprising a collaborative filter for initial classification, which is subsequently modified based on user observation, wherein the user-defined information content criteria is based on an explicit user input and a function of the adaptive user profile applet.

19. The method according to claim 1, further comprising the step of defining the hierarchal organizational structure as a user taxonomic hierarchy of interests, correlating the user taxonomic hierarchy with a set of reference taxonomic hierarchies, and modifying the user taxonomic hierarchy based on sets of rules associated with a reference taxonomic hierarchies having high correlations.

20. The method according to claim 1, wherein at least one object has an associated digital rights rule, further comprising the step of applying digital rights rules to accesses of objects by the user.

21. The method according to claim 20, wherein at least one digital rights rule provides a positive incentive to the user.

22. A computer readable medium having stored thereon a software program for executing the method according to claim 1.

23. A system for providing a human-computer user interface, comprising:
    (a) a set of navigational tools for defining and retrieving objects based on a resource locator thereof;
    (b) an interface for an object search engine for selecting a set of objects according to a user-defined information content criteria and returning respective resource locators of selected objects; and
    (c) an output, presenting:
        (i) selected objects automatically located within a hierarchal organizational structure based on an information content of respective objects, a respectively lower hierarchal level falling within a respectively higher hierarchal level having a generic characteristic, wherein objects having related information content are grouped together and each group represents an information classification; and
        (ii) objects extrinsic to the set of objects responsive to the user-defined information content criteria, inserted into classes within the hierarchal organizational structure of selected objects, said extrinsic objects having a contextual relevance to respective class in which they are inserted, wherein at least one of an insertion and a selection by the user of an extrinsic object is selectively associated with a sponsor payment; and
    (d) a database for storing accounting information relating to said sponsor payments.

24. The system according to claim 23, wherein the extrinsic objects comprise commercial messages.

25. The method according to claim 23, wherein the extrinsic objects comprise objects identified through a collaborative filter process.

26. The system according to claim 23, wherein the extrinsic objects are contextually related to the user-defined information content criteria.

27. A method of outputting representations of selected objects organized in a taxonomic hierarchy, comprising the steps of:
    (a) receiving a user input for selecting objects from a set of objects having varying relevance to the user input;
    (b) selecting objects from the set of objects according to a correspondence between the user input and an information content associated with respective objects;
    (c) automatically organizing the selected objects within classes of a taxonomic hierarchy according to a respective information content, the taxonomic hierarchy having at least three levels, a class at a respective level meeting a classification generic for a respective class at inferior level classification below it, and objects at a same inferior level within different classes not being generic for each other; and
    (d) outputting perceptual representations of the selected objects organized within the taxonomic hierarchy;
    (e) inserting objects extrinsic to the set of objects responsive to the user-defined information content criteria, into classes within the hierarchal organizational structure of selected objects, said extrinsic objects having a contextual relevance to respective class in which they are inserted, wherein at least one of an insertion and a selection by the user of an extrinsic object is selectively associated with a sponsor Payment; and
    (f) accounting in a database for said sponsor payments.

28. The method according to claim 27, wherein said extrinsic objects comprise at least one hyperlink.

29. The method according to claim 27, further comprising the step of ranking objects within a class based on a sponsor payment consideration.

30. The method according to claim 27, further comprising the step of defining a user profile, for modifying at least one of a selection of objects responsive to the user-defined information content criteria, and a selection of extrinsic objects.

31. A system for providing a human-computer user interface, comprising a processor executing software for defining:
    (a) a set of navigational tools for defining and retrieving objects based on a resource locator thereof;
    (b) an interface for an object search engine for selecting a set of objects according to a user-defined information content criteria and returning respective resource locators of selected objects; and
    (c) an output, presenting:
        (i) selected objects automatically located within a hierarchal organizational structure based on an information content of respective objects, a respectively lower hierarchal level falling within a respectively higher hierarchal level having a generic characteristic, wherein objects having related information content are grouped together and each group represents an information classification; and
        (ii) objects extrinsic to the set of objects responsive to the user-defined information content criteria, into classes within the hierarchal organizational structure of selected objects, said extrinsic objects having a contextual relevance to respective class in which they are inserted, wherein at least one of an insertion and a selection by the user of an extrinsic object is selectively associated with a sponsor payment.

32. The system according to claim 31, further comprising a sponsor payment database, wherein the sponsor payment is accounted for in the sponsor payment database.

33. The method according to claim 31, wherein the extrinsic objects comprise commercial messages.

34. The method according to claim 31, wherein the extrinsic objects comprise objects identified through a collaborative filter process.

35. The system according to claim 31, wherein the extrinsic objects are contextually related to the user-defined information content criteria.

* * * * *

UNITED STATES PATENT AND TRADEMARK OFFICE
CERTIFICATE OF CORRECTION

| | | |
|---|---|---|
| PATENT NO. | : 7,181,438 B1 | Page 1 of 1 |
| APPLICATION NO. | : 09/583048 | |
| DATED | : February 20, 2007 | |
| INVENTOR(S) | : Andrew Szabo | |

It is certified that error appears in the above-identified patent and that said Letters Patent is hereby corrected as shown below:

ON TITLE PAGE, please insert Item (60):

-- Related U.S. Application Data

(60) U.S. Provisional Patent Application No. 60/145,230, filed July 21, 1999, U.S. Provisional Patent Application No. 60/160,241, filed Oct. 18, 1999, U.S. Provisional Patent Application No. 60/179,577, filed Feb. 1, 2000. --

Col. 1, line 3, to include the following before the Field of Invention section:

-- CROSS-REFERENCE TO RELATED APPLICATIONS

This application claims the benefit of U.S. Provisional Patent Application No. 60/145,230, filed July 21, 1999, U.S. Provisional Patent Application No. 60/160,241, filed Oct. 18, 1999, and U.S. Provisional Patent Application No. 60/179,577, filed Feb. 1, 2000. --

Signed and Sealed this
Fourth Day of October, 2011

David J. Kappos
*Director of the United States Patent and Trademark Office*